United States Patent
Wang et al.

(10) Patent No.: US 12,448,365 B2
(45) Date of Patent: Oct. 21, 2025

(54) ARYL AMINOPYRIMIDINES AS DUAL MerTK AND TYRO3 INHIBITORS AND METHODS THEREOF

(71) Applicant: The University of North Carolina at Chapel Hill, Chapel Hill, NC (US)

(72) Inventors: Xiaodong Wang, Chapel Hill, NC (US); Yubai Zhou, Cary, NC (US); Ransheng Ding, Binhai New District (CN); Deyu Kong, Chapel Hill, NC (US); Stephen Frye, Chapel Hill, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 744 days.

(21) Appl. No.: 17/755,908

(22) PCT Filed: Nov. 13, 2020

(86) PCT No.: PCT/US2020/060559
§ 371 (c)(1),
(2) Date: May 11, 2022

(87) PCT Pub. No.: WO2021/097326
PCT Pub. Date: May 20, 2021

(65) Prior Publication Data
US 2022/0411407 A1    Dec. 29, 2022

Related U.S. Application Data

(60) Provisional application No. 62/936,005, filed on Nov. 15, 2019.

(51) Int. Cl.
| | | |
|---|---|---|
| *C07D 405/14* | (2006.01) |
| *A61K 45/06* | (2006.01) |
| *A61P 7/02* | (2006.01) |
| *A61P 31/00* | (2006.01) |
| *A61P 35/00* | (2006.01) |
| *A61P 37/00* | (2006.01) |
| *C07D 401/04* | (2006.01) |
| *C07D 401/14* | (2006.01) |
| *C07D 413/14* | (2006.01) |

(52) U.S. Cl.
CPC ......... *C07D 401/14* (2013.01); *C07D 401/04* (2013.01); *C07D 405/14* (2013.01); *C07D 413/14* (2013.01)

(58) Field of Classification Search
CPC .. C07D 401/14; C07D 401/04; C07D 405/14; C07D 413/14; A61K 45/06; A61P 7/02; A61P 31/00; A61P 35/00; A61P 37/00
See application file for complete search history.

(56) References Cited

U.S. PATENT DOCUMENTS

2018/0297977 A1    10/2018    Wang et al.

FOREIGN PATENT DOCUMENTS

| WO | WO-2015061247 A2 * | 4/2015 | ......... A61K 31/4409 |
| WO | WO 2019/222538 A1 | 11/2019 | |

OTHER PUBLICATIONS

Kim, D. et al., "Design and Synthesis of Novel 2, 4-Diamino-5-pyrazol-4-yl Pyrimidine Derivatives as Selective Tyro3 Kinase Inhibitors", Bulletin of Korean Chemical Society, 39:1101-1104, (2018).
Zhang, W. et al., "Pseudo-cyclization through intramolecular hydrogen bond enables discovery of pyridine substituted pyrimidines as new Mer kinase inhibitors", Journal of Medicinal Chemistry, 56:9683-9692, (2013).
WIPO Application No. PCT/US2020/060559, PCT International Preliminary Report on Patentability mailed May 27, 2022.
WIPO Application No. PCT/US2020/060559, PCT International Search Report mailed Mar. 11, 2021.
WIPO Application No. PCT/US2020/060559, PCT Written Opinion mailed Mar. 11, 2021.

* cited by examiner

*Primary Examiner* — Adam C Milligan
*Assistant Examiner* — Sophia P Hirakis
(74) *Attorney, Agent, or Firm* — Alston & Bird LLP

(57) ABSTRACT

Aminopyrimidine containing compounds that inhibit both Mer tyrosine kinase (MerTK) activity and Tyro3 kinase activity are disclosed herein. Additionally disclosed are methods of synthesis and use of the aminopyrimidine containing compounds as anti-cancer agents, immunostimulatory and immunomodulatory agents, anti-platelet agents, anti-infective agents, and as adjunctive agents.

24 Claims, No Drawings

ARYL AMINOPYRIMIDINES AS DUAL MerTK AND TYRO3 INHIBITORS AND METHODS THEREOF

CROSS REFERENCE TO RELATED APPLICATIONS

This application is a 35 U.S.C. § 371 national stage of International Application No. PCT/US2020/060559, filed Nov. 13, 2020, which claims the benefit of priority to U.S. Provisional Application No. 62/936,005, filed Nov. 15, 2019, which are herein incorporated by reference in their entirety for all purposes.

GOVERNMENT SUPPORT

This invention was made with government support under Grant Number CA249190 awarded by the National Institutes of Health. The government has certain rights in the invention.

FIELD

The presently disclosed subject matter relates generally to aryl aminopyrimidine containing compounds that inhibit both Mer tyrosine kinase (MerTK) activity and Tyro3 tyrosine kinase activity and uses of the compounds as anti-cancer agents, immunostimulatory and immunomodulatory agents, anti-platelet agents, anti-infective agents, and as adjunctive agents, and methods of making the compounds.

BACKGROUND

MerTK is a member of a receptor tyrosine kinase (RTK) family known as TAM, which also includes Axl and Tyro3. Each member of the TAM family contains an extracellular domain, a transmembrane domain, and a conserved intracellular kinase domain. The TAM family members undergo ligand-induced homodimerization, followed by catalytic tyrosine kinase activation and intracellular signaling. Cross-phosphorylation has been demonstrated within this RTK family, suggesting heterodimerization can also occur. These RTKs are widely expressed in many epithelial tissues and in cells of the immune, nervous, and reproductive systems. Specifically, MerTK has been found to be expressed in monocytes and in tissues of epithelial and reproductive tissue.

TAM receptor and ligand overexpression have been shown in a wide range of solid and hematological tumors, and correlate with poor prognosis in a variety of tumor types and their signals and promote survival, chemoresistance, motility and invasion. In addition, their role in diminishing the innate immune response makes their inhibition a novel mechanism for reversing the immunosuppressive tumor microenvironment.

Despite the involvement of Mer, Tyro3, and Axl in a variety of disorders and diseases including, but not limited to cancer, infectious diseases, and thrombosis, potent compounds are needed that target both Mer and Tyro3. There remains a need for compounds and compositions capable of such dual targeting.

BRIEF SUMMARY

In several embodiments, the subject matter disclosed herein is directed to compounds of Formula I:

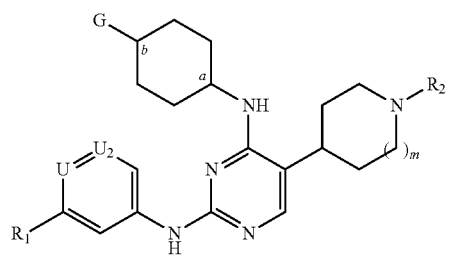

a stereoisomer, geometric isomer, tautomer, or pharmaceutically acceptable salt thereof. The various substituents are as described herein.

In several embodiments, the subject matter described herein is directed to a pharmaceutical composition comprising a compound of Formula I and a pharmaceutically acceptable excipient. The pharmaceutical composition may further comprise one or more additional active agents.

In several embodiments, the subject matter described herein is directed to a method of treating a disease or disorder associated with Mer and/or Tyro3. In some embodiments, the disease or disorder is cancer. In other embodiments, the disease or disorder is an infection. In other embodiments, the disease or disorder is associated with Mer or Tyro3 tyrosine kinase.

In several embodiments, the subject matter described herein is directed to a method of using a compound of Formula I in immunostimmulatory therapy. In other embodiments, the subject matter described herein is directed to a method of using a compound of Formula I in immunomodulatory therapy.

In several embodiments, the subject matter described herein is directed to methods of making the compounds of Formula I.

In several embodiments, the subject matter described herein is directed to a kit for treating a condition mediated by Mer and/or Tyro3 tyrosine kinase, comprising: a) a first pharmaceutical composition comprising a Formula I compound; and b) instructions for use.

In several embodiments, the subject matter described herein is directed to a pharmaceutical composition comprising a compound of Formula II and a pharmaceutically acceptable excipient. The pharmaceutical composition may further comprise one or more additional active agents.

These and other embodiments of the subject matter disclosed herein are discussed in more detail in the descriptions and examples provided below.

DETAILED DESCRIPTION

Disclosed herein, are compounds of Formula I and pharmaceutical compositions thereof that are dual inhibitors of Mer tyrosine kinase (MerTK) and Tyro3 tyrosine kinase. As such, the compounds and compositions disclosed herein are useful in treating diseases and disorders mediated by one or both of Mer tyrosine kinase (MerTK) and Tyro3 tyrosine kinase. An example of a method of treating is in the case of a subject who is suffering from cancer. The compounds can be used not only to combat cancer, but can also advantageously be used as immunostimulatory and immunomodulatory agents, anti-platelet agents, anti-infective agents, and as adjunctive agents.

It has been unexpectedly found that compounds of Formula I can have 10-fold activity as dual inhibitors for Mer and Tyro3 tyrosine kinase. Compounds having a meta-substitution pattern on the aromatic ring are particularly useful.

The presently disclosed subject matter will now be described more fully hereinafter. However, many modifications and other embodiments of the presently disclosed subject matter set forth herein will come to mind to one skilled in the art to which the presently disclosed subject matter pertains having the benefit of the teachings presented in the foregoing descriptions. Therefore, it is to be understood that the presently disclosed subject matter is not to be limited to the specific embodiments disclosed and that modifications and other embodiments are intended to be included within the scope of the appended claims.

A. Definitions

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

As used herein, the term "about," when referring to a measurable value such as an amount of a compound or agent of the current subject matter, dose, time, temperature, and the like, is meant to encompass variations of ±20%, ±10%, ±5%, ±1%, ±0.5%, or even ±0.1% of the specified amount.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic.

Ranges can be expressed herein as from "about" one particular value, and/or to "about" another particular value. When such a range is expressed, some embodiments includes from the one particular value and/or to the other particular value. Similarly, when values are expressed as approximations, by use of the antecedent "about," it will be understood that the particular value forms some embodiments. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the terms "optional" or "optionally" mean that the subsequently described event or circumstance can or cannot occur, and that the description includes instances where said event or circumstance occurs and instances where it does not.

As used herein, the term "subject" can be a vertebrate, such as a mammal, a fish, a bird, a reptile, or an amphibian. Thus, the subject of the herein disclosed methods can be a human, non-human primate, horse, pig, rabbit, dog, sheep, goat, cow, cat, guinea pig, or rodent. The term does not denote a particular age or sex. Thus, adult and newborn subjects, as well as fetuses, whether male or female, are intended to be covered. In one embodiment, the subject is a mammal. In another embodiment, the subject is a human. The term "patient" includes human and veterinary subjects. In some embodiments of the disclosed methods, the subject has been diagnosed with a need for treatment of one or more viral infections prior to the administering step. In various embodiments, the one or more disorders is selected from chikungunya, Venezuelan equine encephalitis, dengue, influenza, and zika.

As used herein, the term "treatment" refers to the medical management of a patient with the intent to cure, ameliorate, stabilize, or prevent a disease, pathological condition, or disorder. This term includes active treatment, that is, treatment directed specifically toward the improvement of a disease, pathological condition, or disorder, and also includes causal treatment, that is, treatment directed toward removal of the cause of the associated disease, pathological condition, or disorder. In addition, this term includes palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder. In various embodiments, the term covers any treatment of a subject, including a mammal (e.g., a human), and includes: (i) preventing the disease from occurring in a subject that can be predisposed to the disease but has not yet been diagnosed as having it; (ii) inhibiting the disease, i.e., arresting its development; or (iii) relieving the disease, i.e., causing regression of the disease. In some embodiments, the subject is a mammal such as a primate, and, in some embodiments, the subject is a human.

As used herein, the term "prevent" or "preventing" refers to precluding, averting, obviating, forestalling, stopping, or hindering something from happening, especially by advance action. It is understood that where reduce, inhibit, or prevent are used herein, unless specifically indicated otherwise, the use of the other two words is also expressly disclosed.

As used herein, the term "diagnosed" means having been subjected to a physical examination by a person of skill, for example, a physician, and found to have a condition that can be diagnosed or treated by the compounds, compositions, or methods disclosed herein. In some embodiments of the disclosed methods, the subject has been diagnosed with a need for treatment of a viral infection prior to the administering step. As used herein, the phrase "identified to be in need of treatment for a disorder," or the like, refers to selection of a subject based upon need for treatment of the disorder. It is contemplated that the identification can, in some embodiments, be performed by a person different from the person making the diagnosis. It is also contemplated, in some embodiments, that the administration can be performed by one who subsequently performed the administration.

As used herein, the terms "administering" and "administration" refer to any method of providing a pharmaceutical preparation to a subject. Such methods are well known to those skilled in the art and include, but are not limited to, oral administration, transdermal administration, administration by inhalation, nasal administration, topical administration, intravaginal administration, ophthalmic administration, intraaural administration, intracerebral administration, rectal administration, and parenteral administration, including injectable such as intravenous administration, intra-arterial administration, intramuscular administration, and subcutaneous administration. Administration can be continuous or intermittent. In various embodiments, a preparation can be administered therapeutically; that is, administered to treat an existing disease or condition. In further various embodiments, a preparation can be administered prophylactically; that is, administered for prevention of a disease or condition.

The term "contacting" as used herein, in a biological context, refers to bringing a disclosed compound and a cell, target receptor, or other biological entity together in such a manner that the compound can affect the activity of the target (e.g., receptor, cell, etc.), either directly; i.e., by interacting with the target itself, or indirectly; i.e., by interacting with another molecule, co-factor, factor, or protein on which the activity of the target is dependent.

As used herein, the term "effective amount" refers to an amount that is sufficient to achieve the desired result or to have an effect on an undesired condition. For example, a "therapeutically effective amount" refers to an amount that is sufficient to achieve the desired therapeutic result or to have an effect on undesired symptoms, but is generally insufficient to cause adverse side effects. The specific therapeutically effective dose level for any particular patient will depend upon a variety of factors including the disorder being treated and the severity of the disorder; the specific composition employed; the age, body weight, general health, sex and diet of the patient; the time of administration; the route of administration; the rate of excretion of the specific compound employed; the duration of the treatment; drugs used in combination or coincidental with the specific compound employed and like factors well known in the medical arts. For example, it is well within the skill of the art to start doses of a compound at levels lower than those required to achieve the desired therapeutic effect and to gradually increase the dosage until the desired effect is achieved. If desired, the effective daily dose can be divided into multiple doses for purposes of administration. Consequently, single dose compositions can contain such amounts or submultiples thereof to make up the daily dose. The dosage can be adjusted by the individual physician in the event of any contraindications. Dosage can vary, and can be administered in one or more dose administrations daily, for one or several days. Guidance can be found in the literature for appropriate dosages for given classes of pharmaceutical products. In further various embodiments, a preparation can be administered in a "prophylactically effective amount"; that is, an effective amount for prevention of a disease or condition.

In some embodiments, such as in the case of oral or parenteral administration to adult humans weighing approximately 70 kg or more, a daily dosage of about 10 mg to about 10,000 mg, preferably from about 200 mg to about 1,000 mg, should be appropriate, although the upper limit may be exceeded. The daily dosage can be administered as a single dose or in divided doses, or for parenteral administration, as a continuous infusion.

Throughout this specification and the claims, the words "comprise," "comprises," and "comprising" are used in a non-exclusive sense, except where the context requires otherwise. It is understood that embodiments described herein include "consisting of" and/or "consisting essentially of" embodiments.

A compound of Formula I can be in the form of a "prodrug," which includes compounds with moieties which can be metabolized in vivo. In other embodiments, a compound of Formula I' can be in the form of a "prodrug." Generally, the prodrugs are metabolized in vivo by esterases or by other mechanisms to active drugs. Examples of prodrugs and their uses are well known in the art (See, e.g., Berge et al. (1977) "Pharmaceutical Salts", J. Pharm. Sci. 66:1-19). Preparations of such prodrug derivatives are discussed in various literature sources (examples are: Alexander et al., J. Med. Chem. 1988, 31, 318; Aligas-Martin et al., PCT WO 2000/041531, p. 30). The prodrugs can be prepared in situ during the final isolation and purification of the compounds, or by separately reacting the purified compound in its free acid form or hydroxyl with a suitable esterifying agent. Hydroxyl groups can be converted into esters via treatment with a carboxylic acid. Examples of prodrug moieties include substituted and unsubstituted, branched or unbranched lower alkyl ester moieties, (e.g., propionoic acid esters), lower alkenyl esters, di-lower alkyl-amino loweralkyl esters (e.g., dimethylaminoethyl ester), acylamino lower alkyl esters (e.g., acetyloxymethyl ester), acyloxy lower alkyl esters (e.g., pivaloyloxymethyl ester), aryl esters (phenyl ester), aryl-lower alkyl esters (e.g., benzyl ester), substituted (e.g., with methyl, halo, or methoxy substituents) aryl and aryl-lower alkyl esters, amides, lower-alkyl amides, di-lower alkyl amides, and hydroxy amides. Prodrugs which are converted to active forms through other mechanisms in vivo are also included. In embodiments, the compounds described herein are prodrugs of any of the formulae herein.

"Derivatives" of the compounds disclosed herein are pharmaceutically acceptable salts, prodrugs, deuterated forms, radio-actively labeled forms, isomers, solvates and combinations thereof.

"Pharmaceutically acceptable salts" refer to derivatives of the disclosed compounds wherein the parent compound is modified by making acid or base salts thereof. The compounds of this disclosure form acid addition salts with a wide variety of organic and inorganic acids and include the physiologically acceptable salts which are often used in pharmaceutical chemistry. Such salts are also part of this disclosure. Typical inorganic acids used to form such salts include hydrochloric, hydrobromic, hydroiodic, nitric, sulfuric, phosphoric, hypophosphoric acid, and the like. Salts derived from organic acids, such as aliphatic mono- and dicarboxylic acids, phenyl substituted alkanoic acids, hydroxyalkanoic and hydroxyalkandioic acids, aromatic acids, aliphatic and aromatic sulfonic acids may also be used. Such pharmaceutically acceptable salts thus include acetate, phenylacetate, trifluoroacetate, acrylate, ascorbate, benzoate, chlorobenzoate, dinitrobenzoate, hydroxybenzoate, methoxybenzoate, methylbenzoate, o-acetoxybenzoate, naphthalene-2-benzoate, bromide, isobutyrate, phenylbutyrate, β-hydroxybutyrate, butyne-1,4-dioate, hexyne-1,4-dioate, caprate, caprylate, chloride, cinnamate, citrate, formate, fumarate, glycollate, heptanoate, hippurate, lactate, malate, maleate, hydroxymaleate, malonate, mandelate, mesylate, nicotinate, isonicotinate, nitrate, oxalate, phthalate, teraphthalate, phosphate, monohydrogenphosphate, dihydrogenphosphate, metaphosphate, pyrophosphate, propiolate, propionate, phenylpropionate, salicylate, sebacate, succinate, suberate, sulfate, bisulfate, pyrosulfate, sulfite, bisulfite, sulfonate, benzene-sulfonate, p-bromobenzenesulfonate, chlorobenzenesulfonate, ethanesulfonate, 2-hydroxyethanesulfonate, methanesulfonate, naphthalene-1-sulfonate, naphthalene-2-sulfonate, p-toleunesulfonate, xylenesulfonate, tartarate, and the like.

As used herein, the term "substituted" is contemplated to include all permissible substituents of organic compounds. In some embodiments, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. It is also contemplated that, in certain embodiments, unless expressly indicated to the contrary, individual substituents can be further optionally substituted (i.e., further substituted or unsubstituted).

In defining various terms, "$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, optionally substituted alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms.

Throughout the specification "alkyl" is generally used to refer to both unsubstituted alkyl groups and substituted alkyl groups; however, substituted alkyl groups are also specifically referred to herein by identifying the specific substituent (s) on the alkyl group. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

"Haloalkyl" refers to an unbranched or branched alkyl group as defined above, wherein one or more (e.g., 1 to 6, or 1 to 3) hydrogen atoms are replaced by a halogen. Where a residue is substituted with more than one halogen, it may be referred to by using a prefix corresponding to the number of halogen moieties attached. Dihaloalkyl and trihaloalkyl refer to alkyl substituted with two ("di") or three ("tri") halo groups, which may be, but are not necessarily, the same halogen. Examples of haloalkyl include, e.g., trifluoromethyl, difluoromethyl, fluoromethyl, trichloromethyl, 2,2,2-trifluoroethyl, 1,2-difluoroethyl, 3-bromo-2-fluoropropyl, 1,2-dibromoethyl and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring, which may be single (monocyclic cycloalkyl) or multi-cyclic (e.g., bicyclic cycloalkyl or spirocyclic cycloalkyl), composed of at least three carbon atoms. Examples of cycloalkyl groups include, but are not limited to, cyclopropyl, cyclobutyl, cyclopentyl, cyclohexyl, norbornyl, and the like. Cycloalkyl can include any number of carbons, non-limiting examples of which are C3-C6, C4-C6, C5-C6, C3-C8, C4-C8, C5-C8, and C6-C8. In some embodiments, cycloalkyl is C3-C8. As mentioned above, spirocycloalkyl groups are also embraced by the term, "cycloalkyl," such as spiro[3.3]heptane.

The term "heterocycloalkyl" as used herein refers to single and multi-cyclic non-aromatic ring systems in which at least one of the ring members is other than carbon. Heterocycloalkyl can include any number of carbons, non-limiting examples of which are C2-C9, C2-C8, C2-C7, C3-C6, C4-C6, C5-C6, C3-C8, C4-C8, C5-C8, and C6-C8. In some embodiments, heterocycloalkyl is C2-C7. Non-limiting examples of heterocycloalkyl groups include piperidine, piperazine, morpholine, azetidine, tetrahydropyran, tetrahydrofuran, dioxane, and the like.

The cycloalkyl group and heterocycloalkyl group can be substituted or unsubstituted. The cycloalkyl group and heterocycloalkyl group can be substituted with one or more groups including, but not limited to, optionally substituted alkyl, cycloalkyl, alkoxy, amino, ether, halide, hydroxy, nitro, silyl, sulfo-oxo, or thiol as described herein.

The term "alkoxy" refers to an —O-alkyl or —O-cycloalkyl radical bonded through an ether linkage. Alkoxy groups may be optionally substituted with one or more substituents.

The term "haloalkoxy" refers to an —O-alkyl group that is substituted by one or more halo substituents. Examples of haloalkoxy groups include trifluoromethoxy, and 2,2,2-trifluoroethoxy.

The term "alkenyl" as used herein is a hydrocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkenyl" as used herein is a non-aromatic carbon-based ring composed of at least three carbon atoms and containing at least one carbon-carbon double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, norbornenyl, and the like. Cycloalkenyl can include any number of carbons, non-limiting examples of which are C3-C6, C4-C6, C5-C6, C3-C8, C4-C8, C5-C8, and C6-C8. In some embodiments, cycloalkenyl is C3-C8.

The term "heterocycloalkenyl" is a non-aromatic carbon-based ring containing at least one carbon-carbon double bound, i.e., C=C, where at least one of the carbon atoms of the ring is replaced with a heteroatom such as, but not limited to, nitrogen, oxygen, sulfur, or phosphorus. Heterocycloalkenyl can include any number of carbons, non-limiting examples of which are C3-C6, C4-C6, C5-C6, C3-C8, C4-C8, C5-C8, and C6-C8. In some embodiments, heterocycloalkenyl is C3-C8.

The cycloalkenyl group and heterocycloalkenyl group can be substituted or unsubstituted. The cycloalkenyl group and heterocycloalkenyl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "alkynyl" as used herein is a hydrocarbon group of 2 to 24 carbon atoms with a structural formula containing at least one carbon-carbon triple bond. The alkynyl group can be unsubstituted or substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "aryl" as used herein is a single or multi-cyclic group that contains any carbon-based aromatic group including, but not limited to, benzene, naphthalene, phenyl, biphenyl, phenoxybenzene, and the like. The term "biaryl" is a specific type of aryl group and is included in the definition of "aryl." Biaryl refers to two aryl groups that are bound together via a fused ring structure, as in naphthalene, or are attached via one or more carbon-carbon bonds, as in biphenyl.

The term "heteroaryl" as used herein is a single or multi-cyclic group that contains any aromatic group that has at least one heteroatom incorporated within the ring of the aromatic group. Examples of heteroatoms include, but are not limited to, nitrogen, oxygen, sulfur, and phosphorus. The heteroaryl can include any number of carbons, non-limiting examples of which are C3-C9, C3-C8, C3-C7, C3-C6, C3-C5, C3-C4, C4-C5, C4-C6, C5-C6, C4-C8, C5-C8, and C6-C8. In some embodiments, heteroaryl is C4-C5. Non-limiting examples of such heteroaryl groups include imidazolyl, quinolyl, isoquinolyl, indolyl, indazolyl, pyridazyl, pyridyl, pyrrolyl, pyrazolyl, pyrazinyl, quinoxolyl, pyranyl, pyrimidinyl, furyl, thienyl, triazolyl, thiazolyl, carbolinyl, tetrazolyl, benzofuranyl, thiamorpholinyl sulfone, oxazolyl, benzoxazolyl, benzimidazolyl, benzthiazolyl, oxopiperidinyl, oxopyrrolidinyl, oxoazepinyl, azepinyl, isoxazolyl, isothiazolyl, furazanyl, thiadiazyl, oxathiolyl, acridinyl, phenanthridinyl, and benzocinnolinyl, and the like.

The aryl or heteroaryl group can be substituted or unsubstituted. The aryl or heteroaryl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "aldehyde" as used herein is represented by the formula —C(O)H. Throughout this specification "C(O)" is a shorthand notation for a carbonyl group, i.e., C=O.

The terms "amine" or "amino" as used herein are represented by the formula $NA^1A^2$, where $A^1$ and $A^2$ can be, independently, hydrogen or alkyl, cycloalkyl, alkenyl, cycloalkenyl, alkynyl, cycloalkynyl, aryl, or heteroaryl group as described herein.

The term "alkylamino" as used herein is represented by the formula —NH(-alkyl) where alkyl is a described herein. Representative examples include, but are not limited to, methylamino group, ethylamino group, propylamino group, isopropylamino group, butylamino group, isobutylamino group, (sec-butyl)amino group, (tert-butyl)amino group, pentylamino group, isopentylamino group, (tert-pentyl) amino group, hexylamino group, and the like.

The term "dialkylamino" as used herein is represented by the formula —N(-alkyl)$_2$ where alkyl is a described herein. Representative examples include, but are not limited to, dimethylamino group, diethylamino group, dipropylamino group, diisopropylamino group, dibutylamino group, diisobutylamino group, di(sec-butyl)amino group, di(tert-butyl)amino group, dipentylamino group, diisopentylamino group, di(tert-pentyl)amino group, dihexylamino group, N-ethyl-N-methylamino group, N-methyl-N-propylamino group, N-ethyl-N-propylamino group and the like.

The term "carboxylic acid" as used herein is represented by the formula —C(O)OH.

The term "ester" as used herein is represented by the formula —OC(O)$A^1$ or —C(O)O$A^1$, where $A^1$ can be an optionally substituted alkyl, cycloalkyl, alkenyl, cycloalkenyl, alkynyl, cycloalkynyl, aryl, or heteroaryl group as described herein. The term "polyester" as used herein is represented by the formula -($A^1$O(O)C-$A^2$-C(O)O)$_a$— or -($A^1$O(O)C-$A^2$-OC(O))$_a$—, where $A^1$ and $A^2$ can be, independently, an optionally substituted alkyl, cycloalkyl, alkenyl, cycloalkenyl, alkynyl, cycloalkynyl, aryl, or heteroaryl group described herein and "a" is an integer from 1 to 500. "Polyester" is as the term used to describe a group that is produced by the reaction between a compound having at least two carboxylic acid groups with a compound having at least two hydroxyl groups.

The term "ether" as used herein is represented by the formula $A^1OA^2$, where $A^1$ and $A^2$ can be, independently, an optionally substituted alkyl, cycloalkyl, alkenyl, cycloalkenyl, alkynyl, cycloalkynyl, aryl, or heteroaryl group described herein. The term "polyether" as used herein is represented by the formula -($A^1$O-$A^2$O)$_a$—, where $A^1$ and $A^2$ can be, independently, an optionally substituted alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The term "halide" or "halogen" as used herein refers to fluorine, chlorine, bromine, and iodine.

The term "hydroxyl" as used herein is represented by the formula —OH.

The term "ketone" as used herein is represented by the formula $A^1C(O)A^2$, where $A^1$ and $A^2$ can be, independently, an optionally substituted alkyl, cycloalkyl, alkenyl, cycloalkenyl, alkynyl, cycloalkynyl, aryl, or heteroaryl group as described herein.

The term "azide" as used herein is represented by the formula —$N_3$.

The term "nitro" as used herein is represented by the formula —$NO_2$.

The term "nitrile" as used herein is represented by the formula —CN.

The term "silyl" as used herein is represented by the formula —$SiA^1A^2A^3$, where $A^1$, $A^2$, and $A^3$ can be, independently, hydrogen or an optionally substituted alkyl, cycloalkyl, alkoxy, alkenyl, cycloalkenyl, alkynyl, cycloalkynyl, aryl, or heteroaryl group as described herein.

The term "sulfo-oxo" as used herein is represented by the formulas —$S(O)A^1$, —$S(O)_2A^1$, —$OS(O)_2A^1$, or —$OS(O)_2OA^1$, where $A^1$ can be hydrogen or an optionally substituted alkyl, cycloalkyl, alkenyl, cycloalkenyl, alkynyl, cycloalkynyl, aryl, or heteroaryl group as described herein. Throughout this specification "S(O)" is a shorthand notation for S=O. The term "sulfonyl" is used herein to refer to the sulfo-oxo group represented by the formula —$S(O)_2A^1$, where $A^1$ can be hydrogen or an optionally substituted alkyl, cycloalkyl, alkenyl, cycloalkenyl, alkynyl, cycloalkynyl, aryl, or heteroaryl group as described herein. The term "sulfone" as used herein is represented by the formula $A^1S(O)_2A^2$, where $A^1$ and $A^2$ can be, independently, an optionally substituted alkyl, cycloalkyl, alkenyl, cycloalkenyl, alkynyl, cycloalkynyl, aryl, or heteroaryl group as described herein. The term "sulfoxide" as used herein is represented by the formula $A^1S(O)A^2$, where $A^1$ and $A^2$ can be, independently, an optionally substituted alkyl, cycloalkyl, alkenyl, cycloalkenyl, alkynyl, cycloalkynyl, aryl, or heteroaryl group as described herein.

The term "thiol" as used herein is represented by the formula —SH.

"$R^1$," "$R^2$," "$R^3$," "$R^n$," where n is an integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

As described herein, compounds of the subject matter described herein may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by the subject matter described herein are those that result in the formation of stable or chemically feasible compounds. In is also contemplated that, in certain embodiments, unless expressly indicated to the contrary, individual substituents can be further optionally substituted (i.e., further substituted or unsubstituted).

The term "stable," as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —$(CH_2)_{0-4}R°$; —$(CH_2)_{0-4}OR°$; —$O(CH_2)_{0-4}R°$, —O—$(CH_2)_{0-4}C(O)OR°$; —$(CH_2)_{0-4}CH(OR°)_2$; —$(CH_2)_{0-4}SR°$; —$(CH_2)_{0-4}Ph$, which may be substituted with R°; —$(CH_2)_{0-4}O(CH_2)_{0-1}Ph$ which may be substituted with R°; —CH=CHPh, which may be substituted with R°; —$(CH_2)_{0-4}O(CH_2)_{0-1}$-pyridyl which may be substituted with R°; —$NO_2$; —CN; —$N_3$; —$(CH_2)_{0-4}N(R°)_2$; —$(CH_2)_{0-1}N(R°)C(O)R°$; —$N(R°)C(S)R°$; —$(CH_2)_{0-4}N(R°)C(O)NR°_2$; —$N(R°)C(S)NR°_2$; —$(CH_2)_{0-4}N(R°C(O)OR°$; —$N(R°)N(R°)C(O)R°$; —$N(R°)N(R°)C(O)NR°_2$; —$N(R°)N(R°)C(O)OR°$; —$(CH_2)_{0-4}C(O)R°$; —$C(S)R°$; —$(CH_2)_{0-4}C(O)OR°$; —$(CH_2)_{0-4}C(O)SR°$; —$(CH_2)_{0-4}C(O)OSiR°_3$; —$(CH_2)_{0-4}OC(O)R°$; —$OC(O)(CH_2)_{0-4}SR$—, $SC(S)SR°$; —$(CH_2)_{0-4}SC(O)R°$; —$(CH_2)_{0-1}C(O)NR°_2$; —$C(S)NR°_2$; —$C(S)SR°$; —$SC(S)SR°$, —$(CH_2)_{0-4}OC(O)NR°_2$; —$C(O)N(OR°)R°$; —$C(O)C(O)R°$; —$C(O)CH_2C(O)R°$; —$C(NOR°)R°$; —$(CH_2)_{0-4}SSR°$; —$(CH_2)_{0-4}S(O)_2R°$; —$(CH_2)_{0-4}S(O)_{20}R°$; —$(CH_2)_{0-4}OS(O)_2R°$; —$S(O)_2NR°_2$; —$(CH_2)_{0-4}S(O)R°$; —$N(R°)S(O)_2NR°_2$; —$N(R°)S(O)_2R°$; —$N(OR°)R°$; —$C(NH)NR°_2$; —$P(O)_2R°$; —$P(O)R°_2$; —$OP(O)R°_2$; —$OP(O)(OR°)_2$; $SiR°_3$; —($C_{1-4}$ straight or branched alkylene)O—$N(R°)_2$; or —($C_{1-4}$ straight or branched alkylene)C(O)O—$N(R°)_2$, wherein each R° may be substituted as defined below and is independently hydrogen, $C_{1-6}$ aliphatic, —$CH_2Ph$, —$O(CH_2)_{0-1}Ph$, —$CH_2$-(5-6 membered heteroaryl ring), or a 5-6-membered saturated, partially unsaturated, or aryl ring having 0-4 heteroatoms independently selected from nitrogen, oxygen, or sulfur, or, notwithstanding the definition above, two independent occurrences of R°, taken together with their intervening atom(s), form a 3-12-membered saturated, partially unsaturated, or aryl mono- or bicyclic ring having 0-4 heteroatoms independently selected from nitrogen, oxygen, or sulfur, which may be substituted as defined below.

Suitable monovalent substituents on R° (or the ring formed by taking two independent occurrences of R° together with their intervening atoms), are independently halogen, —$(CH_2)_{0-2}R^●$, -(haloR$^●$), —$(CH_2)_{0-2}OH$, —$(CH_2)_{0-2}OR^●$, —$(CH_2)_{0-2}CH(OR^●)_2$; —$O(haloR^●)$, —CN, —$N_3$, —$(CH_2)_{0-2}C(O)R^●$, —$(CH_2)_{0-2}C(O)OH$, —$(CH_2)_{0-2}C(O)OR^●$, —$(CH_2)_{0-2}SR^●$, —$(CH_2)_{0-2}SH$, —$(CH_2)_{0-2}NH_2$, —$(CH_2)_{0-2}NHR^●$, —$(CH_2)_{0-2}NR^●_2$, —$NO_2$, —$SiR^●_3$, —$OSiR^●_3$, —$C(O)SR^●$, —($C_{1-4}$ straight or branched alkylene)C(O)OR$^●$, or —$SSR^●$ wherein each R$^●$ is unsubstituted or where preceded by "halo" is substituted only with one or more halogens, and is independently selected from $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur. Suitable divalent substituents on a saturated carbon atom of R° include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R●, -(haloR●), —OH, —OR●, —O(haloR●), —CN, —C(O)OH, —C(O)OR●, —NH$_2$, —NHR●, —NR●$_2$, or —NO$_2$, wherein each R● is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R†, —NR†$_2$, —C(O)R†, —C(O)OR†, —C(O)C(O)R†, —C(O)CH$_2$C(O)R†, —S(O)$_2$R†, —S(O)$_2$NR†$_2$, —C(S)NR†$_2$, —C(NH)NR†$_2$, or —N(R†)S(O)$_2$R†; wherein each R† is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R†, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R† are independently halogen, —R●, -(haloR●), —OH, —OR●, —O(haloR●), —CN, —C(O)OH, —C(O)OR●, —NH$_2$, —NHR●, —NR●$_2$, or —NO$_2$, wherein each R● is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In some embodiments, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms A synonym of the term "residue" is the term "radical," which as used in the specification and concluding claims, refers to a fragment, group, or substructure of a molecule described herein, regardless of how the molecule is prepared. For example, a 2,4-thiazolidinedione radical in a particular compound has the structure:

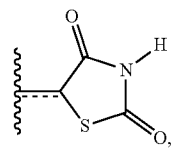

regardless of whether thiazolidinedione is used to prepare the compound. In some embodiments the radical (for example an alkyl) can be further modified (i.e., substituted alkyl) by having bonded thereto one or more "substituent radicals." The number of atoms in a given radical is not critical to the presently described subject matter unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In some embodiments, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5,6,7,8-tetrahydro-2-naphthyl radical. In some embodiments, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkylcarboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

"Inorganic radicals," as the term is defined and used herein, contain no carbon atoms and therefore comprise only atoms other than carbon. Inorganic radicals comprise bonded combinations of atoms selected from hydrogen, nitrogen, oxygen, silicon, phosphorus, sulfur, selenium, and halogens such as fluorine, chlorine, bromine, and iodine, which can be present individually or bonded together in their chemically stable combinations. Inorganic radicals have 10 or fewer, or preferably one to six or one to four inorganic atoms as listed above bonded together. Examples of inorganic radicals include, but not limited to, amino, hydroxy, halogens, nitro, thiol, sulfate, phosphate, and like commonly known inorganic radicals. The inorganic radicals do not have bonded therein the metallic elements of the periodic table (such as the alkali metals, alkaline earth metals, transition metals, lanthanide metals, or actinide metals), although such metal ions can sometimes serve as a pharmaceutically acceptable cation for anionic inorganic radicals such as a sulfate, phosphate, or like anionic inorganic radical. Inorganic radicals do not comprise metalloids elements such as boron, aluminum, gallium, germanium, arsenic, tin, lead, or tellurium, or the noble gas elements, unless otherwise specifically indicated elsewhere herein.

Compounds described herein can contain one or more double bonds and, thus, potentially give rise to cis/trans (E/Z) isomers, as well as other conformational isomers. Unless stated to the contrary, the subject matter described herein includes all such possible isomers, as well as mixtures of such isomers.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the presently described subject matter includes all such possible diastereomers as well as their racemic mixtures, their substantially pure resolved enantiomers, all possible geometric isomers, and pharmaceutically acceptable salts thereof. Mixtures of stereoisomers, as well as isolated specific stereoisomers, are also included. During the course of the synthetic procedures used to prepare such compounds, or in using racemization or epimerization procedures known to those skilled in the art, the products of such procedures can be a mixture of stereoisomers.

Many organic compounds exist in optically active forms having the ability to rotate the plane of plane-polarized light. In describing an optically active compound, the prefixes D and L or R and S are used to denote the absolute configuration of the molecule about its chiral center(s). The prefixes d and l or (+) and (−) are employed to designate the sign of rotation of plane-polarized light by the compound, with (−) or meaning that the compound is levorotatory. A compound prefixed with (+) or d is dextrorotatory. For a given chemical structure, these compounds, called stereoisomers, are identical except that they are non-superimposable mirror images of one another. A specific stereoisomer can also be referred to as an enantiomer, and a mixture of such isomers is often called an enantiomeric mixture. A 50:50 mixture of enantiomers is referred to as a racemic mixture. Many of the compounds described herein can have one or more chiral centers and therefore can exist in different enantiomeric forms. If desired, a chiral carbon can be designated with an asterisk (*). When bonds to the chiral carbon are depicted as straight lines in the disclosed formulas, it is understood that both the (R) and (S) configurations of the chiral carbon, and hence both enantiomers and mixtures thereof, are embraced within the formula. As is used in the art, when it is desired to specify the absolute configuration about a chiral carbon, one of the bonds to the chiral carbon can be depicted as a wedge (bonds to atoms above the plane) and the other can be depicted as a series or wedge of short parallel lines is (bonds to atoms below the plane). The Cahn-Inglod-Prelog system can be used to assign the (R) or (S) configuration to a chiral carbon.

When the disclosed compounds contain one chiral center, the compounds exist in two enantiomeric forms. Unless specifically stated to the contrary, a disclosed compound includes both enantiomers and mixtures of enantiomers, such as the specific 50:50 mixture referred to as a racemic mixture. The enantiomers can be resolved by methods known to those skilled in the art, such as formation of diastereoisomeric salts which may be separated, for example, by crystallization (see, CRC Handbook of Optical Resolutions via Diastereomeric Salt Formation by David Kozma (CRC Press, 2001)); formation of diastereoisomeric derivatives or complexes which may be separated, for example, by crystallization, gas-liquid or liquid chromatography; selective reaction of one enantiomer with an enantiomer-specific reagent, for example enzymatic esterification; or gas-liquid or liquid chromatography in a chiral environment, for example on a chiral support for example silica with a bound chiral ligand or in the presence of a chiral solvent. It will be appreciated that where the desired enantiomer is converted into another chemical entity by one of the separation procedures described above, a further step can liberate the desired enantiomeric form. Alternatively, specific enantiomers can be synthesized by asymmetric synthesis using optically active reagents, substrates, catalysts or solvents, or by converting one enantiomer into the other by asymmetric transformation.

Designation of a specific absolute configuration at a chiral carbon in a disclosed compound is understood to mean that the designated enantiomeric form of the compounds can be provided in enantiomeric excess (e.e.). Enantiomeric excess, as used herein, is the presence of a particular enantiomer at greater than 50%, for example, greater than 60%, greater than 70%, greater than 75%, greater than 80%, greater than 85%, greater than 90%, greater than 95%, greater than 98%, or greater than 99%. In some embodiments, the designated enantiomer is substantially free from the other enantiomer. For example, the "R" forms of the compounds can be substantially free from the "S" forms of the compounds and are, thus, in enantiomeric excess of the "S" forms. Conversely, "S" forms of the compounds can be substantially free of "R" forms of the compounds and are, thus, in enantiomeric excess of the "R" forms.

When a disclosed compound has two or more chiral carbons, it can have more than two optical isomers and can exist in diastereoisomeric forms. For example, when there are two chiral carbons, the compound can have up to four optical isomers and two pairs of enantiomers ((S,S)/(R,R) and (R,S)/(S,R)). The pairs of enantiomers (e.g., (S,S)/(R,R)) are mirror image stereoisomers of one another. The stereoisomers that are not mirror-images (e.g., (S,S) and (R,S)) are diastereomers. The diastereoisomeric pairs can be separated by methods known to those skilled in the art, for example chromatography or crystallization and the individual enantiomers within each pair may be separated as described above. Unless otherwise specifically excluded, a disclosed compound includes each diastereoisomer of such compounds and mixtures thereof.

In some embodiments, a compound may have two chiral carbons on a cycloalkyl ring, such as a cyclohexyl ring. In this case, the substituents on the chiral carbons may be labeled as in the "cis" or "trans" configuration. For example, the substituents on the cyclohexyl may, in some embodiments, labeled as such:

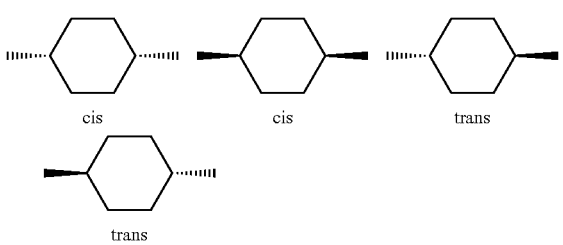

Compounds described herein comprise atoms in both their natural isotopic abundance and in non-natural abundance. The disclosed compounds can be isotopically-labeled or isotopically-substituted compounds identical to those described, but for the fact that one or more atoms are replaced by an atom having an atomic mass or mass number different from the atomic mass or mass number typically found in nature. Examples of isotopes that can be incorporated into compounds of the subject matter described herein include isotopes of hydrogen, carbon, nitrogen, oxygen, phosphorous, fluorine and chlorine, such as $^2$H, $^3$H, $^{13}$C, $^{14}$C, $^{15}$N, $^{18}$O, $^{17}$O, $^{35}$S, $^{18}$F and $^{36}$Cl, respectively. Compounds further comprise prodrugs thereof, and pharmaceutically acceptable salts of said compounds or of said prodrugs which contain the aforementioned isotopes and/or other isotopes of other atoms are within the scope of the subject matter described herein. Certain isotopically-labeled compounds of the presently described subject matter, for example those into which radioactive isotopes such as $^3$H and $^{14}$C are incorporated, are useful in drug and/or substrate tissue distribution assays. Tritiated, i.e., $^3$H, and carbon-14, i.e., $^{14}$C, isotopes are particularly preferred for their ease of preparation and detectability. Further, substitution with heavier isotopes such as deuterium, i.e., $^2$H, can afford certain therapeutic advantages resulting from greater metabolic stability, for example increased in vivo half-life or reduced dosage requirements and, hence, may be preferred in some circumstances. Isotopically labeled compounds of the presently described subject matter and prodrugs thereof can generally be prepared by carrying out the procedures below, by substituting a readily available isotopically labeled reagent for a non-isotopically labeled reagent.

The compounds described herein can be present as a solvate. A "solvate" refers to an association or complex of one or more solvent molecules and a compound of Formula I. In other embodiments, a "solvate" refers to an association or complex of one or more solvent molecules and a compound of Formula I. Examples of solvents that form solvates include, but are not limited to, water, isopropanol, ethanol, methanol, DMSO, ethyl acetate, acetic acid, and ethanolamine. The term "hydrate" refers to the complex where the solvent molecule is water. Unless stated to the contrary, the subject matter described herein includes all such possible solvates.

It is known that chemical substances form solids which are present in different states of order which are termed polymorphic forms or modifications. The different modifications of a polymorphic substance can differ greatly in their physical properties. The compounds according to the subject matter described herein can be present in different polymorphic forms, with it being possible for particular modifications to be metastable. Unless stated to the contrary, the subject matter described herein includes all such possible polymorphic forms.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Other definitions are provided elsewhere herein.

B. Compounds

The compounds disclosed herein are compounds of Formula I or pharmaceutically acceptable salts, prodrugs, metabolites, or derivatives thereof. These compounds are useful dual inhibitors of Mer and Tyro3 tyrosine kinase. In embodiments, Formula I has the following general structure:

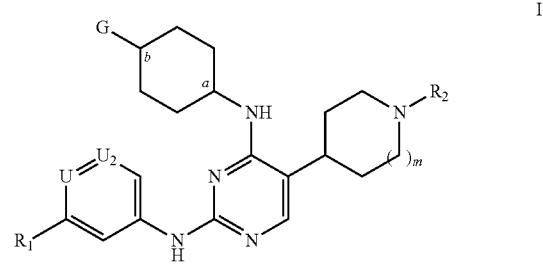

I wherein,
U and $U_2$ are each independently N or CX, provided that only one of U or $U_2$ can be N;
X is H or $C_1$-$C_8$ alkyl;
$R_1$ is selected from the group consisting of C1-C4 alkoxy, halogen, C1-C8 alkyl, C1-C4 haloalkyl, C1-C4 hydroxyalkyl, C1-C4 alkylamino, nitrile, C3-C8 cycloalkyl, C2-C7 heterocycloalkyl, —C(O)$R_{10}$, and (C1-C4)(C1-C4) dialkylamino; wherein said cycloalkyl or heterocycloalkyl is independently substituted with 0, 1, 2, or 3 groups independently selected from the group consisting of halogen, C1-C4 alkyl, C1-C4 haloalkyl, and C1-C4 alkoxy; and
$R_{10}$ is —NH$_2$, hydrogen, or C1-C4 alkyl;
G is —OH or —NR$^e$R$^f$;
wherein R$^e$ and R$^f$ are each independently hydrogen, C1-C4 alkyl, or —C(O)R$_{50}$, and
$R_{50}$ is C1-C4 alkyl or hydrogen;
m is 0 or 1;
and,
$R_2$ is selected from the group consisting of hydrogen, C1-C10 alkyl, C1-C4 haloalkyl, —C(O)$R_{20}$, and —(CH$_2$)$_n$Cy$_3$;
n is 0, 1, 2, 3, or 4;
Cy$_3$ is selected from the group consisting of C3-C8 cycloalkyl, C2-C7 heterocycloalkyl, aryl, and C3-C5 heteroaryl, each independently substituted with 0, 1, 2, or 3 groups independently selected from the group consisting of halogen, C1-C4 alkyl, C1-C4 haloalkyl, C1-C4 alkoxy, C1-C4 hydroxyalkyl, C1-C4 alkylamino, C3-C8 cycloalkyl, and (C1-C4)(C1-C4) dialkylamino; and
$R_{20}$ is selected from the group consisting of C1-C4 alkyl, —(CH$_2$)$_q$OR$_{30}$, and —(CH$_2$)$_w$Cy$_4$;
wherein q is 0, 1, 2, 3, or 4;
w is 0, 1, 2, 3, or 4;
$R_{30}$ is hydrogen or C1-C8 alkyl; and
Cy$_4$ is selected from the group consisting of C3-C8 cycloalkyl, C2-C7 heterocycloalkyl, aryl, and C3-C5 heteroaryl, each independently substituted with 0, 1, 2, or 3 groups independently selected from the group consisting of halogen, —NH$_2$, C1-C4 alkyl, C1-C4 haloalkyl, C1-C4 alkoxy, —C(O)—(C1-C4 alkyl), C1-C4 hydroxyalkyl, C1-C4 alkylamino, and (C1-C4)(C1-C4) dialkylamino;

or a pharmaceutically acceptable salt thereof.

In certain embodiments, compounds include those where G is —OH. In certain embodiments, compound include those where G is —NH$_2$, —NHCH$_3$, or —N(CH$_3$)$_2$—NHC(O)CH$_3$.

In certain embodiments, compounds include those where U is N and U$_2$ is CH. In certain embodiments, compounds include those where U is CH and U$_2$ is CH. In certain embodiments, compounds include those where U is N and U$_2$ is —C—CH$_3$.

In embodiments, compounds include those of Formula I':

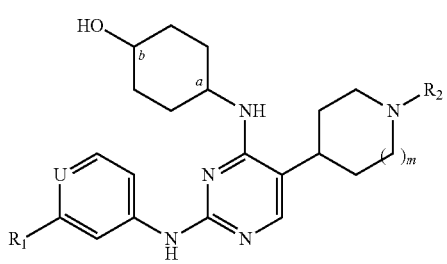

wherein,

U is N or CH;

R$_1$ is selected from the group consisting of C1-C4 alkoxy, halogen, C1-C8 alkyl, C1-C4 haloalkyl, C1-C4 hydroxyalkyl, C1-C4 alkylamino, nitrile, and (C1-C4)(C1-C4) dialkylamino;

m is 0 or 1; and

R$_2$ is selected from the group consisting of hydrogen, C1-C10 alkyl, —C(O)R$_{20}$, and —(CH$_2$)$_n$Cy$_3$; wherein
n is 0, 1, 2, 3, or 4;
Cy$_3$ is selected from the group consisting of C3-C8 cycloalkyl, C2-C7 heterocycloalkyl, aryl, and C3-C5 heteroaryl and substituted with 0, 1, 2, or 3 groups independently selected from the group consisting of halogen, C1-C4 alkyl, C1-C4 haloalkyl, C1-C4 alkoxy, C1-C4 hydroxyalkyl, C1-C4 alkylamino, and (C1-C4)(C1-C4) dialkylamino;
R$_{20}$ is selected from the group consisting of C1-C4 alkyl, —(CH$_2$)$_q$OR$_{30}$, and —(CH$_2$)$_w$Cy$_4$;
wherein q is 0, 1, 2, 3, or 4;
w is 0, 1, 2, 3, or 4;
R$_{30}$ is hydrogen or C1-C8 alkyl; and
Cy$_4$ is selected from the group consisting of C3-C8 cycloalkyl, C2-C7 heterocycloalkyl, aryl, and C3-C5 heteroaryl and substituted with 0, 1, 2, or 3 groups independently selected from the group consisting of halogen, —NH$_2$, C1-C4 alkyl, C1-C4 haloalkyl, C1-C4 alkoxy, —C(O)—(C1-C4 alkyl), C1-C4 hydroxyalkyl, C1-C4 alkylamino, and (C1-C4)(C1-C4) dialkylamino, or a pharmaceutically acceptable salt thereof.

In certain embodiments, compounds include those of Formula I' where U is N. In certain embodiments, compounds include those of Formula I' where U is CH.

In certain embodiments, compounds include those of Formula I or I' where R$_1$ is selected from the group consisting of methoxy, chloro, methyl, ethyl, —C(O)NH$_2$, difluoroethyl, difluoromethyl, fluoromethyl, and trifluoromethyl. In certain embodiments, compounds include those of Formula I or I' where R$_1$ is alkoxy. In certain embodiments, compounds include those of Formula I or I' where R$_1$ is methoxy. In certain embodiments, compounds include those of Formula I or I' where R$_1$ is haloalkyl. In certain embodiments, compounds include those of Formula I or I' where R$_1$ is trifluoromethyl or difluoroethyl. In certain embodiments, compounds include those of Formula I or I' where R$_1$ is unbranched C1-C4 alkyl. In certain embodiments, compounds include those of Formula I or I' where R$_1$ is ethyl. In certain embodiments, compounds include those of Formula I or I' where R$_1$ is dimethylamino. In certain embodiments, compounds include those of Formula I or I' where R$_1$ is halogen. In certain embodiments, compounds include those of Formula I or I' where R$_1$ is bromo. In certain embodiments, compounds include those of Formula I or I' where R$_1$ is trifluoromethyl or chloro. In certain embodiments, compounds include those of Formula I or I' where R$_1$ is pyrrolidinyl, piperazinyl substituted with methyl, or piperidinyl.

In certain embodiments, compounds include those of Formula I or I' where m is 1.

In certain embodiments, compounds include those of Formula I or I' where R$_2$ is linear or branched C1-C5 alkyl. In certain embodiments, compounds include those of Formula I or I' where R$_2$ is selected from the group consisting of hydrogen, methyl, ethyl, n-propyl, isopropyl, n-butyl, isobutyl, s-butyl, t-butyl, n-pentyl, isopentyl, s-pentyl, and neopentyl. In certain embodiments, compounds include those of Formula I or I' where R$_2$ is selected from the group consisting of methyl, isobutyl, and neopentyl. In certain embodiments, compounds include those of Formula I or I' where R$_2$ is hydrogen. In certain embodiments, compounds include those of Formula I or I' where R$_2$ is methyl.

In certain embodiments, compounds include those of Formula I or I' where R$_2$ is —C(O)R$_{20}$, wherein R$_{20}$ is —(CH$_2$)$_w$Cy$_4$, wherein w is 0 and Cy$_4$ is cyclopentyl or cyclohexyl each independently substituted with 0, 1, 2, or 3 groups independently selected from C1-C4 alkyl.

In certain embodiments, compounds include those of Formula I or I' where R$_2$ is —C(O)R$_{20}$, wherein R$_{20}$ is —(CH$_2$)$_q$OR$_{30}$. In certain embodiments, compounds include those of Formula I or I' where q is 0. In certain embodiments, compounds include those of Formula I or I' where R$_{30}$ is C1-C4 alkyl. In certain embodiments, compounds include those of Formula I or I' where R$_{30}$ is t-butyl.

In certain embodiments, compounds include those of Formula I or I' where R$_2$ is —C(O)R$_{20}$, wherein R$_{20}$ is —(CH$_2$)$_w$Cy$_4$. In certain embodiments, compounds include those of Formula I or I' where w is 0. In certain embodiments, compounds include those of Formula I or I' where w is 1. In certain embodiments, compounds include those of Formula I or I' where Cy$_4$ is C3-C8 cycloalkyl optionally substituted with C1-C4 alkyl. In certain embodiments, compounds include those of Formula I or I' where Cy$_4$ is cyclopentyl or cyclohexyl optionally substituted with C1-C4 alkyl. In certain embodiments, compounds include those of Formula I or I' where Cy$_4$ is cyclopentyl. In certain embodiments, compounds include those of Formula I or I' where Cy$_4$ is cyclohexyl substituted with methyl.

In certain embodiments, compounds include those of Formula I or I' where R$_2$ is —(CH$_2$)$_n$Cy$_3$. In certain embodiments, compound include those of Formula I or I' where R$_2$ is —(CH$_2$)$_n$Cy$_3$, wherein Cy$_3$ is selected from the group consisting of C3-C8 cycloalkyl, aryl, and C2-C7 heterocycloalkyl. In certain embodiments, compounds include those of Formula I or I' where $R_2$ is —$(CH_2)_nCy_3$, wherein n is 0 or 1, and $Cy_3$ is selected from the group consisting of cyclopropyl, cyclobutyl, cyclopentyl, cyclohexyl, cycloheptyl, phenyl, oxetanyl, isoxazolyl, piperidinyl, and tetrahydropyranyl, each independently substituted with 0, 1, 2, or 3 groups independently selected from the group consisting of methyl, fluoro, cyclopropyl, chloro, n-propyl, and isopropyl. In certain embodiments, compounds include those of Formula I or I' where $R_2$ is —$(CH_2)_nCy_3$, wherein n is 0. In certain embodiments, compounds include those of Formula I or I' where $R_2$ is —$(CH_2)_nCy_3$, wherein n is 1. In certain embodiments, compounds include those of Formula I or I' where $R_2$ is —$(CH_2)_nCy_3$, wherein $Cy_3$ is C3-C8 cycloalkyl. In certain embodiments, compounds include those of Formula I or I' where $R_2$ is —$(CH_2)_nCy_3$, wherein $Cy_3$ is selected from the group consisting of cyclopentyl, cyclobutyl, and cyclohexyl. In certain embodiments, compounds include those of Formula I or I' where $R_2$ is —$(CH_2)_nCy_3$, wherein $Cy_3$ is aryl. In certain embodiments, compounds include those of Formula I or I' where $R_2$ is —$(CH_2)_nCy_3$, wherein $Cy_3$ is phenyl. In certain embodiments, compounds include those of Formula I or I' where $R_2$ is —$(CH_2)_nCy_3$, wherein $Cy_3$ is C2-C7 heterocycloalkyl. In certain embodiments, compounds include those of Formula I or I' where $R_2$ is —$(CH_2)_nCy_3$, wherein $Cy_3$ is tetrahydropyranyl. In certain embodiments, compounds include those of Formula I or I' where $R_2$ is —$(CH_2)_nCy_3$, wherein n is 1, and $Cy_3$ is selected from the group consisting of cyclobutyl, cyclopentyl, cyclohexyl, phenyl, and tetrahydropyranyl. In certain embodiments, compounds include those of Formula I or I' where $R_2$ is —$(CH_2)_nCy_3$, wherein n is 0 or 1, and $Cy_3$ is selected from the group consisting of 3-methylcyclobutyl, 3,3-dimethylcyclobutyl, 3-cyclopropylcyclobutyl, spiro[3.3]heptyl, and 4-flurorphenyl, 3-5-dichlorophenyl. In certain embodiments, compounds include those of Formula I or I' where $R_2$ is —$(CH_2)_nCy_3$, wherein n is 0 and $Cy_3$ is pentyl. In certain embodiments, compounds include those of Formula I or I' where $R_2$ is —$(CH_2)_nCy_3$, wherein n is 1 and $Cy_3$ is pentyl. In certain embodiments, compounds include those of Formula I or I' where $R_2$ is —$(CH_2)_nCy_3$, wherein n is 1 and $Cy_3$ is piperidinyl, optionally substituted with methyl, ethyl, or isopropyl. In certain embodiments, compounds include those of Formula I or I' where $R_2$ is —$(CH_2)_nCy_3$, wherein n is 0 and $Cy_3$ is cyclohexyl substituted twice with methyl.

In certain embodiments, compounds include those of Formula I or I' where the substituents on the carbons marked "a" and "b" are in a trans configuration.

In certain embodiments, compounds of Formula I or I' include those in Table 1.

C. Pharmaceutical Compositions

In some embodiments, the subject matter described herein relates to pharmaceutical compositions comprising at least one compound of Formula I or Formula I' and a pharmaceutically acceptable carrier. In some embodiments, a pharmaceutical composition can be provided comprising a therapeutically effective amount of at least one disclosed compound. In some embodiments, a pharmaceutical composition can be provided comprising a prophylactically effective amount of at least one disclosed compound. In some embodiments, the subject matter described herein relates to pharmaceutical compositions comprising a pharmaceutically acceptable carrier and a compound, wherein the compound is present in an effective amount.

Pharmaceutically acceptable salts of the compounds are conventional acid-addition salts or base-addition salts that retain the biological effectiveness and properties of the compounds and are formed from suitable non-toxic organic or inorganic acids or organic or inorganic bases. Exemplary acid-addition salts include those derived from inorganic acids such as hydrochloric acid, hydrobromic acid, hydroiodic acid, sulfuric acid, sulfamic acid, phosphoric acid and nitric acid, and those derived from organic acids such as p-toluenesulfonic acid, salicylic acid, methanesulfonic acid, oxalic acid, succinic acid, citric acid, malic acid, lactic acid, fumaric acid, and the like. Example base-addition salts include those derived from ammonium, potassium, sodium and, quaternary ammonium hydroxides, such as for example, tetramethylammonium hydroxide. Chemical modification of a pharmaceutical compound into a salt is a known technique to obtain improved physical and chemical stability, hygroscopicity, flowability and solubility of compounds. See, e.g., H. Ansel et. al., Pharmaceutical Dosage Forms and Drug Delivery Systems (6th Ed. 1995) at pp. 196 and 1456-1457.

The pharmaceutical compositions comprise the compounds in a pharmaceutically acceptable carrier. A pharmaceutically acceptable carrier refers to sterile aqueous or nonaqueous solutions, dispersions, suspensions or emulsions, as well as sterile powders for reconstitution into sterile injectable solutions or dispersions just prior to use. Examples of suitable aqueous and nonaqueous carriers, diluents, solvents or vehicles include water, ethanol, polyols (such as glycerol, propylene glycol, polyethylene glycol and the like), carboxymethylcellulose and suitable mixtures thereof, vegetable oils (such as olive oil) and injectable organic esters such as ethyl oleate. The compounds can be formulated with pharmaceutically acceptable carriers or diluents as well as any other known adjuvants and excipients in accordance with conventional techniques such as those disclosed in Remington: The Science and Practice of Pharmacy, 19th Edition, Gennaro, Ed., Mack Publishing Co., Easton, Pa., 1995.

In various embodiments, the disclosed pharmaceutical compositions comprise the disclosed compounds (including pharmaceutically acceptable salt(s) thereof) as an active ingredient, a pharmaceutically acceptable carrier, and, optionally, other therapeutic ingredients or adjuvants. The instant compositions include those suitable for oral, rectal, topical, and parenteral (including subcutaneous, intramuscular, and intravenous) administration, although the most suitable route in any given case will depend on the particular host, and nature and severity of the conditions for which the active ingredient is being administered. The pharmaceutical compositions can be conveniently presented in unit dosage form and prepared by any of the methods well known in the art of pharmacy.

The choice of carrier will be determined in part by the particular method used to administer the composition. Accordingly, there is a wide variety of suitable formulations of the pharmaceutical composition of the presently described subject matter. The following formulations for oral, aerosol, parenteral, subcutaneous, intravenous, intraarterial, intramuscular, intraperitoneal, intrathecal, rectal, and vaginal administration are merely exemplary and are in no way limiting.

Formulations suitable for oral administration can consist of (a) liquid solutions, such as an effective amount of the compound dissolved in diluents, such as water, saline, or orange juice; (b) capsules, sachets, tablets, lozenges, and troches, each containing a predetermined amount of the active ingredient, as solids or granule; (c) powders; (d) suspensions in an appropriate liquid; and (e) suitable emulsions. Liquid formulations may include diluents, such as water, cyclodextrin, dimethyl sulfoxide and alcohols, for example, ethanol, benzyl alcohol, propylene glycol, glycerin, and the polyethylene alcohols including polyethylene glycol, either with or without the addition of a pharmaceutically acceptable surfactant, suspending agent, or emulsifying agent. Capsule forms can be of the ordinary hard- or soft-shelled gelatin type containing, for example, surfactants, lubricants, and inert fillers, such as lactose, sucrose, calcium phosphate, and corn starch. Tablet forms can include one or more of the following: lactose, sucrose, mannitol, corn starch, potato starch, alginic acid, microcrystalline cellulose, acacia, gelatin, guar gum, colloidal silicon dioxide, croscarmellose sodium, talc, magnesium stearate, calcium stearate, zinc stearate, stearic acid, and other excipients, colorants, diluents, buffering agents, disintegrating agents, moistening agents, preservatives, flavoring agents, and pharmacologically compatible carriers. Lozenge forms can comprise the active ingredient in a flavor, usually sucrose and acacia or tragacanth, as well as pastilles comprising the active ingredient in an inert base, such as gelatin and glycerin, or sucrose and acadia, emulsions, and gels containing, the addition to the active ingredient in an inert base, such as gelatin and glycerin, or sucrose and acadia, emulsions, and gels containing, in addition to the active ingredient, such carriers as are known in the art.

The compounds of the present disclosure alone or in combination with other suitable components, can be made into aerosol formulations to be administered via inhalation. These aerosol formulations can be placed into pressurized acceptable propellants, such as dichlorodifluoromethane, propane, and nitrogen. They also may be formulated as pharmaceuticals for non-pressured preparations, such as in a nebulizer or an atomizer.

Formulations suitable for parenteral administration include aqueous and non-aqueous, isotonic sterile injection solutions, which can contain anti-oxidants, buffers, bacteriostats, and solutes that render the formulation isotonic with the blood of the intended recipient, and aqueous and non-aqueous sterile suspensions that can include suspending agents, solubilizers, thickening agents, stabilizers, and preservatives. The compound can be administered in a physiologically acceptable diluent in a pharmaceutical carrier, such as a sterile liquid or mixture of liquids, including water, saline, aqueous dextrose and related sugar solutions, an alcohol, such as ethanol, isopropanol, or hexadecyl alcohol, glycols, such as propylene glycol or polyethylene glycol such as poly(ethyleneglycol) 400, glycerol ketals, such as 2,2-dimethyl-1,3-dioxolane-4-methanol, ethers, an oil, a fatty acid, a fatty acid ester or glyceride, or an acetylated fatty acid glyceride with or without the addition of a pharmaceutically acceptable surfactant, such as a soap or a detergent, suspending agent, such as pectin, carbomers, methylcellulose, hydroxypropylmethylcellulose, or carboxymethylcelluslose, or emulsifying agents and other pharmaceutical adjuvants.

Oils which can be used in parenteral formulations include petroleum, animal, vegetable, or synthetic oils. Specific examples of oils include peanut, soybean, sesame, cottonseed, corn, olive, petrolatum, and mineral. Suitable fatty acids for use in parenteral formulations include oleic acid, stearic acid, and isostearic acid. Ethyl oleate and isopropyl myristate are examples of suitable fatty acid esters. Suitable soaps for use in parenteral formulations include fatty alkali metal, ammonium, and triethanolamine salts, and suitable detergents include (a) cationic detergents such as, for example. dimethyldialkylammonium halides, and alkylpyridinium halides, (b) anionic detergents such as, for example, alkyl, aryl, and olefin sulfonates, alkyl olefin, ether, and monoglyceride sulfates, and sulfosuccinates, (c) nonionic detergents such as, for example, fatty amine oxides, fatty acid alkanolamides, and polyoxyethylene polypropylene copolymers, (d) amphoteric detergents such as, for example, alkyl β-aminopropionates, and 2-alkylimidazoline quaternary ammonium salts, and (e) mixtures thereof.

The parenteral formulations typically contain from about 0.5% to about 25% by weight of the active ingredient in solution. Suitable preservatives and buffers can be used in such formulations. In order to minimize or eliminate irritation at the site of injection, such compositions may contain one or more nonionic surfactants having a hydrophile-lipophile balance (HLB) of from about 12 to about 17. The quantity of surfactant in such formulations ranges from about 5% to about 15% by weight. Suitable surfactants include polyethylene sorbitan fatty acid esters, such as sorbitan monooleate and the high molecular weight adducts of ethylene oxide with a hydrophobic base, formed by the condensation of propylene oxide with propylene glycol.

Pharmaceutically acceptable excipients are also well-known to those who are skilled in the art. The choice of excipient will be determined in part by the particular compound, as well as by the particular method used to administer the composition. Accordingly, there is a wide variety of suitable formulations of the pharmaceutical composition of the present disclosure. The following methods and excipients are merely exemplary and are in no way limiting. The pharmaceutically acceptable excipients preferably do not interfere with the action of the active ingredients and do not cause adverse side-effects. Suitable carriers and excipients include solvents such as water, alcohol, and propylene glycol, solid absorbents and diluents, surface active agents, suspending agent, tableting binders, lubricants, flavors, and coloring agents.

The formulations can be presented in unit-dose or multi-dose sealed containers, such as ampules and vials, and can be stored in a freeze-dried (lyophilized) condition requiring only the addition of the sterile liquid excipient, for example, water, for injections, immediately prior to use. Extemporaneous injection solutions and suspensions can be prepared from sterile powders, granules, and tablets. The requirements for effective pharmaceutical carriers for injectable compositions are well known to those of ordinary skill in the art. See *Pharmaceutics and Pharmacy Practice*, J. B. Lippincott Co., Philadelphia, Pa., Banker and Chalmers, Eds., 238-250 (1982) and *ASHP Handbook on Injectable Drugs*, Toissel, 4$^{th}$ ed., 622-630 (1986).

Formulations suitable for topical administration include lozenges comprising the active ingredient in a flavor, usually sucrose and acacia or tragacanth; pastilles comprising the active ingredient in an inert base, such as gelatin and glycerin, or sucrose and acacia; and mouthwashes comprising the active ingredient in a suitable liquid carrier; as well as creams, emulsions, and gels containing, in addition to the active ingredient, such carriers as are known in the art.

Additionally, formulations suitable for rectal administration may be presented as suppositories by mixing with a variety of bases such as emulsifying bases or water-soluble bases. Formulations suitable for vaginal administration may be presented as pessaries, tampons, creams, gels, pastes, foams, or spray formulas containing, in addition to the active ingredient, such carriers as are known in the art to be appropriate.

One skilled in the art will appreciate that suitable methods of exogenously administering a compound of the present disclosure to an animal are available, and, although more than one route can be used to administer a particular compound, a particular route can provide a more immediate and more effective reaction than another route.

As regards these applications, the present methods include the administration to an animal, particularly a mammal, and more particularly a human, of a therapeutically effective amount of the compound effective in the inhibition of one or more of Mer and Tyro3 tyrosine kinase. In some embodiments, the compound of Formula I administered to an animal is a Mer tyrosine kinase selective inhibitor. The methods also include the administration of a therapeutically effect amount of the compound for the treatment of patient having a predisposition for being afflicted by a disorder associated with one or more of Mer and Tyro3 tyrosine kinase dysfunction, or an infectious disease. In some embodiments, the patient is afflicted by a disorder associated with Mer tyrosine kinase. The dose administered to an animal, particularly a human, in the context of the presently described subject matter should be sufficient to affect a therapeutic response in the animal over a reasonable time frame. One skilled in the art will recognize that dosage will depend upon a variety of factors including the condition of the animal, the body weight of the animal, as well as the severity and stage of the disorder or infectious disease.

The total amount of the compound of the present disclosure administered in a typical treatment is preferably between about 10 mg/kg and about 1000 mg/kg of body weight for mice, and between about 100 mg/kg and about 500 mg/kg of body weight, and more preferably between 200 mg/kg and about 400 mg/kg of body weight for humans per daily dose. This total amount is typically, but not necessarily, administered as a series of smaller doses over a period of about one time per day to about three times per day for about 24 months, and preferably over a period of twice per day for about 12 months.

In some embodiments, a method is provided to treat a host by administering a daily amount of a Mer TKI including active compounds of the present invention, which may be provided in dosages once or more a day. In one embodiment, the Mer TKI dose is between about 0.5 mg and about 200 mg. In one embodiment, the dose is at least about 1 mg, about 2 mg, about 3 mg, about 4 mg, about 5 mg, about 10 mg, about 12 mg, about 15 mg, about 20 mg, about 25 mg, about 30 mg, about 35 mg, about 40 mg, about 45 mg, about 50 mg, about 55 mg, about 60 mg, about 65 mg, about 70 mg, about 75 mg, about 80 mg, about 85 mg, about 90 mg, about 95 mg, about 100 mg, about 110 mg, about 125 mg, about 140 mg, about 150, about 175, or about 200 mg. In another embodiment, the dose is between about 200 mg and 1250 mg. In one embodiment, the dose is about 200 mg, about 225 mg, about 250 mg, about 275 mg, about 300 mg, about 325 mg, about 350 mg, about 375 mg, about 400 mg, about 425 mg, about 450 mg, about 475 mg, about 500 mg, about 525 mg, about 550 mg, about 575 mg, about 600 mg, about 625 mg, about 650 mg, about 675 mg, about 700 mg, about 725 mg, about 750 mg, about 775 mg, about 800 mg, about 825 mg, about 850 mg, about 875 mg, about 900 mg, about 925 mg, about 950 mg, about 975 mg, about 1000 mg or more.

In some embodiments, the compounds described herein are combined with an additional anti-tumor agent, anti-neoplastic agent, anti-cancer agent, immunomodulatory agent, immunostimulatory agent, anti-infective agents, anti-thrombotic, and/or anti-clotting agent. The dosage administered to the host can be similar to that as administered during monotherapy treatment, or may be lower, for example, between about 0.5 mg and about 150 mg. In one embodiment, the dose is at least about 1 mg, about 2 mg, about 3 mg, about 4 mg, about 5 mg, about 10 mg, about 12 mg, about 15 mg, about 20 mg, about 25 mg, about 30 mg, about 35 mg, about 40 mg, about 45 mg, about 50 mg, about 55 mg, about 60 mg, about 65 mg, about 70 mg, about 75 mg, about 80 mg, about 85 mg, about 90 mg, about 95 mg, about 100 mg, about 110 mg, about 125 mg, about 140 mg, or about 150 mg.

In some embodiments, for the case of the co-administration of an active compound in combination with an additional anti-tumor agent, anti-neoplastic agent, anti-cancer agent, immunomodulatory agent, immunostimulatory agent, anti-infective agents, anti-thrombotic, and/or anti-clotting agent, as otherwise described herein, the amount of the compound of Formula I or Formula I' to be administered ranges from about 0.01 mg/kg of the patient to about 50 mg/kg or more of the patient or considerably more, depending upon the second compound to be co-administered, the condition of the patient, severity of the disease to be treated, and the route of administration. In one embodiment, the additional anti-tumor agent, anti-neoplastic agent, anti-cancer agent, immunomodulatory agent, immunostimulatory agent, anti-infective agents, anti-thrombotic, and/or anti-clotting agent may, for example, be administered in amounts ranging from about 0.01 mg/kg to about 500 mg/kg. In one embodiment, for oral dosing, suitable daily dosages are, for example, between about 0.1-4000 mg administered orally once-daily, twice-daily, or three times-daily, continuous (every day) or intermittently (e.g., 3-5 days a week).

The size of the dose also will be determined by the route, timing and frequency of administration as well as the existence, nature and extent of any adverse side effects that might accompany the administration of the compound and the desired physiological effect. It will be appreciated by one of skill in the art that various conditions or disease states, in particular chronic conditions or disease states, may require prolonged treatment involving multiple administrations.

In some embodiments, the composition further comprises at least one or more of an agent known to treat a viral infection, a bacterial infection, a thrombotic disorder or a clotting disorder, or a disorder of uncontrolled cellular proliferation. The agents are described in detail herein.

D. Methods of Making the Compounds

In some embodiments, disclosed are methods of making a compound of Formula I or Formula I'. Compounds according to the present disclosure can, for example, be prepared by the methods described herein. A practitioner skilled in the art will understand the appropriate use of protecting groups [see: Greene and Wuts, Protective Groups in Organic Synthesis] and the preparation of known compounds found in the literature using the standard methods of organic synthesis. There may come from time to time the need to rearrange the order of the recommended synthetic steps, however this will be apparent to the judgment of a chemist skilled in the art of organic synthesis. The following examples are provided so that the subject matter described herein might be more fully understood, are illustrative only, and should not be construed as limiting.

In some embodiments, the disclosed compounds comprise the products of the synthetic methods described herein. In some embodiments, the disclosed compounds comprise a compound produced by a synthetic method described herein. In some embodiments, the subject matter described herein comprises a pharmaceutical composition comprising a therapeutically effective amount of the product of the disclosed methods and a pharmaceutically acceptable carrier. In some embodiments, the subject matter described herein comprises a method for manufacturing a medicament comprising combining at least one compound of any of disclosed compounds or at least one product of the disclosed methods with a pharmaceutically acceptable carrier or diluent.

E. Methods of Using the Compounds

The compounds and pharmaceutical compositions of the subject matter described herein are useful in treating or controlling a variety of disorders including, but not limited to, disorders of uncontrolled cellular proliferation such as, for example, cancer, infections such as, for example, a viral infection and a bacterial infection, and thrombotic disorders.

As described in more detail herein, ligand-bound MerTK can complex with phosphatidyl serine and bind apoptotic cells, which triggers ingestion and suppression of inflammatory cytokines. It is aberrantly expressed in certain cancers (e.g., acute leukemia (ALL and AML)) and some solid tumors (e.g., breast cancer, colon cancer, non-small cell lung carcinoma, glioblastoma, and others).

The MerTK ligands include growth arrest-specific 6 protein (GAS6; Chen, et al; Oncogene (1997) 14, 2033-2039), protein-S, tubby and tubby-like protein-1 (TULP1), and galectin-3. Several of these ligands are present in serum and expressed locally in a number of tissues. These ligands bind to the extracellular domain of MerTK, resulting in tyrosine kinase activation.

Since the discovery of MerTK in 1994, there has been a growing body of literature that suggest MerTK as a drug target for a number of indications (see, e.g., WO 2013/052417; Frye, S. "Academic Drug Discovery and Chemical Biology," Presentation at Northwestern's 18$^{th}$ Annual Drug Discovery Symposium, November 2013; WO 2011/146313/ WO 2014/062774; Liu et al. (2012) ACS Med Chem. Lett. 3(2): 129-134; Schlegel et al. (2013) J. Clin. Invest. 123(5): 2257-67; Zhang et al. (2013) J. Med. Chem. 56: 9683-9692; Liu et al. (2013) Eur. J. Med. Chem. 65: 83-93; Christoph et al. (2013) Mol. Cancer Ther. 12(11): 2367-77; Linger et al. (2013) Blood 122: 1599-1609; Lee-Sherick et al. (2015) Ocotarget, Advanced Publications 2015). For example, MerTK is ectopically expressed or overexpressed in a number of hematologic and epithelial malignant cells. Expression of MerTK and GAS6 correlates with poor prognosis and/or chemoresistance in these tumor types. The mechanisms by which increased MerTK signaling in tumor cells contributes to tumor malignancy, however, remain unclear.

In 2013 it was determined that MerTK −/− knock-out mice are less susceptible to tumor growth than normal mice (Cook et al. (2013) J. Clin. Invest. 123: 3231-3242). MerTK is normally expressed in myeloid lineage cells where it acts to suppress pro-inflammatory cytokines following ingestion of apoptotic material. It was found that MerTK −/− leukocytes exhibit lower tumor cell-induced expression of wound healing cytokines (IL-10 and GAS6) and enhanced expression of acute inflammatory cytokines (IL-12 and IL-6). Further, intratumoral CD8+ lymphocytes are increased. The loss of MerTK in the tumor microenvironment in Mer−/− mice slowed the establishment, growth, and metastasis of mammary tumors and melanomas in immune competent, syngeneic mice.

Paolino et al. have reported on the treatment of wild-type NK cells with a newly developed small molecule TAM kinase inhibitor, LDC1267, that conferred therapeutic potential and efficiently enhanced anti-metastatic NK cell activity in vivo (Paolino et al. (2014) Nature 507: 508-512). Oral or intraperitoneal administration using this TAM inhibitor markedly reduced murine mammary cancer and melanoma metastases dependent on NK cells.

TAM receptor tyrosine kinases have been investigated for their involvement in certain infectious diseases. For example, Shimojima et al. reported the involvement of members of the Tyro3 receptor tyrosine kinase family, Axl, Dkt and MerTK, in the cell entry of filoviruses Ebola virus and Marburg virus, and concluded that each Tyro3 family member is likely a cell entry factor in the infection (Shimokima et al. (2006) Journal of Virology p. 10109-10116). Additional diseases for which TAM receptor tyrosine kinases have been studied include, but are not limited to, microbial infections (U.S. Pat. No. 8,415,361), Zaire ebolavirus (Brindley et al. (2011) Virology 415: 83-84), vaccinia virus (Morizono et al. (2011) Cell Host & Microbe 9: 286-298; Morizono and Chen (2014) J. Virology 88(8): 4275-4290; Mercer and Helenius (2008) Science 320: 531-535), dengue virus (WO 2013/124324; Bhattacharayya et al. (2013) Cell Host & Microbe 14: 136-147; Meertens et al. (2012) Cell Host Microbe 12: 544-557), Yellow Fever (WO 2013/124324), West Nile (WO 2013/124324), ebola (Bhattacharayya et al. (2013) Cell Host & Microbe 14: 136-147), and HTV (Bhattacharayya et al. (2013) Cell Host & Microbe 14: 136-147).

Further, Bernsmeier et al. found that the number of monocytes and macrophages that expressed MerTK was greatly increased in circulation, livers, and lymph nodes of patients with acute-on-chronic liver failure (ACLF) (Bernsmeier et al. (2015) Gastroenterology 1-13). Addition of a substituted pyrazolopyrimidine (see WO 2011/146313, page 25) restored production of inflammatory cytokines.

TAM (Tyro3-Axl-Mer) receptor tyrosine kinases have also been investigated for their involvement in platelet aggregation. In 2004, Chen et al. observed that MerTK, presumably through activation by its ligand Gash, participates in the regulation of platelet function in vitro and platelet-dependent thrombosis in vivo (Chen et al. (2004) Arterioscler. Thrombosis Vasc. Biol. 1118-1123). Chen reported that PtdSer on aggregating platelets activates MerTK, helping to stabilize clot formation. MerTK knockout mice have decreased platelet aggregation while maintaining normal bleeding times and coagulation parameters. Consequently, these mice appear to be protected from thrombosis without concomitant increased spontaneous bleeding. See also, Angelillo-Scherrer et al. (2005) J. Clin. Invest. 115(2): 237-246).

Particular embodiments include compounds having MerTK and Tyro3 dual inhibition activity. Dual inhibition may be a rational combination strategy that may have clinical utility against many diseases and disorders.

Accordingly, methods for the use of the compounds of Formula I will be discussed further herein.

1. Treatment Methods

The compounds disclosed herein are useful for treating or controlling disorders of uncontrolled cellular proliferation, infections, and/or thrombotic or clotting disorders. Thus, in some embodiments are methods comprising administering a therapeutically effective amount of a disclosed compound or a composition comprising a disclosed compound to a subject.

The compounds disclosed herein are also useful as immunomodulatory or immunostimulatory agents.

As discussed further below and disclosed herein, in some embodiments are provided methods for the treatment of a disorder associated with one or both of Mer tyrosine kinase, and Tyro3 tyrosine kinase, the method comprising the step of administering to the subject an effective amount of at least one compound of Formula I. In some embodiments, the method is treatment of a disorder associated with Mer tyrosine kinase.

As in any embodiment above, a method wherein the disorder is a cancer, an infection, a fibrosis, a thrombotic disorder, a clotting disorder, or a disorder associated with an immunosuppressed microenvironment surrounding diseased tissue.

As in any embodiment above, a method wherein the disorder is a cancer.

As in any embodiment above, a method wherein the cancer is selected from the group consisting of breast cancer, cervical cancer, gastrointestinal cancer, colorectal cancer, brain cancer, skin cancer, prostate cancer, ovarian cancer, thyroid cancer, testicular cancer, pancreatic cancer, endometrial cancer, melanoma, glioma, leukemia, lymphoma, chronic myeloproliferative disorder, myelodysplastic syndrome, myeloproliferative neoplasm, and plasma cell neoplasm (myeloma).

As in any embodiment above, a method wherein the tumor or cancer is MerTK +/+.

As in any embodiment above, a method wherein the tumor or cancer is MerTK −/−.

As in any embodiment above, a method wherein the disorder is an infection.

As in any embodiment above, a method wherein the infection is viral.

As in any embodiment above, a method wherein the infection is bacterial.

As in any embodiment above, a method wherein the disorder is a fibrosis. In further embodiments, the fibrosis is a liver fibrosis.

As in any embodiment above, a method further comprising administering an additional active agent.

In embodiments, a method for inhibiting one or both of Mer tyrosine kinase and Tyro3 tyrosine kinase, in at least one cell, the method comprising the step of contacting the at least one cell with an effective amount of at least one compound of Formula I. In some embodiments, the method is a method for inhibiting Mer tyrosine kinase, in at least one cell, the method comprising the step of contacting the at least one cell with an effective amount of at least one compound of Formula I.

As in any embodiment above, a method wherein the cell has been isolated from a mammal prior to the contacting step.

As in any embodiment above, a method wherein the mammal has been diagnosed with a need for treatment of a disorder related to one or both of Mer tyrosine kinase and Tyro3 tyrosine kinase, prior to the administering step. In a further embodiment, the mammal has been diagnosed with a need for treatment of a disorder related to Mer tyrosine kinase.

a. Use as an Antitumor Agent

In some embodiments, a disclosed compound or composition is capable of direct anti-cancer effects by inhibiting Mer tyrosine kinase within tumor cells. In some embodiments, the cancer treated overexpresses MerTK. In some embodiments, the cancer which overexpresses MerTK is selected from the group consisting of acute myeloid leukemia, T-cell acute lymphoid leukemia, B-cell acute lymphoid leukemia, lung cancer, glioma, melanoma, prostate cancer, schwannoma, mantle cell lymphoma, and rhabdomyosarcoma. In some embodiments, the cancer ectopically expresses MerTK.

In some embodiments, the cancer treated has a mutation in the amino acid sequence of the MerTK extracellular or transmembrane domain selected from P40S (melanoma), S159F (lung), E204K (urinary tract) S428G (gastric), 143 IF (lung), A446G (kidney), N454S (liver), W485S/C (lymphoma), and V486I (melanoma). In some embodiments the cancer treated has a mutation in the amino acid sequence of the MerTK cytosolic domain mutation selected from L586F (urinary tract), G594R (breast), S626C (urinary tract), P672S (lung), L688M (colon), A708S (head and neck), N718Y (lung), R722stop (colon), M790V (lung), P802S (melanoma), V873I Giver), S905F (lung), K923R (melanoma), P958L (kidney), D983N (liver), and D990N (colon).

In some embodiments, a disclosed compound or composition is administered to a host with a cancer in combination with one or more additional chemotherapeutic agents, resulting in a synergistic anti-cancer effect and the prolonged survival of a host compared to treatment with either a compound described herein or chemotherapeutic agent alone. In some embodiments, the use of a Mer TKI compound described herein in combination with a chemotherapeutic agent provides for increased antitumor effects without an increase in the standard of care dosage of the chemotherapeutic agent. In some embodiments, the use of a Mer TKI compound described herein in combination with a chemotherapeutic provides for equivalent or increased antitumor effects utilizing a lower dosage of a chemotherapeutic agent than the standard of care dosage.

In some embodiments, a disclosed compound or composition is provided for use in treating a non-small cell lung carcinoma (NSCLC). In some embodiments, a method is provided to treat a host with non-small cell lung carcinoma (NSCLC) comprising administering to the host an effective amount of a disclosed compound or composition in combination with one or more additional chemotherapeutic agents. In some embodiments of the subject matter described herein, a method is provided to treat a host with cancer comprising administering to the host an effective amount of a Mer TKI including active compounds of the presently described subject matter in combination with another tyrosine kinase inhibitor. In some embodiments, the tyrosine kinase inhibitor is a fibroblast growth factor receptor (FGFR) inhibitor. In some embodiments, the FGFR inhibitor is AZD-4547. In some embodiments, the cancer is non-small cell lung carcinoma (NSCLC). In some embodiments of the subject matter described herein, a method is provided to treat a host with non-small cell lung carcinoma (NSCLC) comprising administering to the host an effective amount of a Mer TKI including active compounds of the presently described subject matter in combination with an additional tyrosine kinase inhibitor, wherein the additional tyrosine kinase inhibitor is selected from the group consisting of gefitinib and crizotinib.

In some embodiments, a disclosed compound or composition is provided for use in treating a melanoma. In some embodiments, the administration of the Mer TKI compound described herein is combined with a chemotherapeutic agent. In some embodiments, the chemotherapeutic agent is an anti-programmed cell death-1 (PD-1) agent. In some embodiments, the chemotherapeutic agent is a B-RAF inhibitor. In some embodiments, the B-RAF inhibitor is vemurafenib. In some embodiments, the host does not have a melanoma with a B-RAF mutation. In some embodiments, the host has a melanoma with a B-RAF mutation. In some embodiments, the host has a melanoma with a RAS mutation. In some embodiments, the melanoma over-expresses MerT. In some embodiments, the melanoma has metastasized.

In some embodiments, a disclosed compound or composition is provided for use in treating Acute Lymphoblastic Leukemia (ALL). In some embodiments, a method is provided to, treat a host with ALL comprising administering to the host an effective amount of a disclosed compound or composition in combination with methotrexate.

In some embodiments, a disclosed compound or composition is provided for use in treating Acute Myeloid Leukemia (AML). In some embodiments, the AML contains a wild type FLT3 protein. In some embodiments, the replication of the AML cells are dependent on FLT3 expression. In some embodiments, the AML contains a FLT3-ITD mutation. In some embodiments, the AML contains a FLT3-TKD mutation. In some embodiments, the AML contains both a FLT3-ITD and FLT3-TKD mutation. In some embodiments, a FLT3 or dual MER/FLT3 inhibitor described herein is administered to a host suffering from AML, wherein the AML contains a mutation within the FLT3-TKD at amino acid F691 or D835.

In some embodiments, a tumor survival-signal inhibiting amount (for example 0.5 to 150 mg dose) of Mer TKI including compounds of the presently described subject matter is administered to a host alone or in combination with a chemotherapeutic agent and/or anti-cancer targeted agent. In some embodiments, a tumor survival-signal inhibiting amount (for example, at least 150 mg/dose, and in some embodiments, at least 200, 250, 300, 350, 400, 450, or 500 mg/dosage or more) of Mer TKI including active compounds of the presently described subject matter is administered to a host alone or in combination with a chemotherapeutic agent and/or anticancer targeted agent. In some embodiments, the Mer TKI and the chemotherapeutic agent act synergistically. In some embodiments, the use of a Mer TKI in combination with a chemotherapeutic agent provides for increased anti-tumor effects without an increase in the standard of care dosage of the chemotherapeutic agent.

In some embodiments, the use of a Mer TKI including compounds of the presently described subject matter in combination with a chemotherapeutic provides for equivalent or increased antitumor effects utilizing a lower dosage of a chemotherapeutic agent than the standard of care dosage.

In some embodiments of the subject matter described herein, the Mer TKI including compounds of the presently described subject matter can be administered to a host with a cancer prior to, during, or after administration with a chemotherapeutic agent or exposure to ionizing radiation. In some embodiments, a host is administered an effective amount of a chemotherapeutic agent or ionizing radiation and subsequently administered a Mer TKI.

In some embodiments, a method is provided to treat a host with cancer comprising administering to the host an effective amount of a disclosed compound or composition in combination with an immunomodulatory agent. In some embodiments, the immunomodulatory agent is selected from the group consisting of a CTLA-4 inhibitor, PD-1 or anti-PD-1 ligand, IFN-alpha, IFN-beta, and a vaccine, for example, a cancer vaccine. In some embodiments, a method is provided to treat a host with cancer comprising administering to the host an effective amount of a Mer TKI including active compounds of the presently described subject matter in combination with Keytruda® (pembrolizumab). In some embodiments, a method is provided to treat a host with cancer comprising administering to the host an effective amount of a Mer TKI including active compounds of the presently described subject matter in combination with Opdivo (nivolumab). In some embodiments, a method is provided to treat a host with cancer comprising administering to the host an effective amount of a Mer TKI including active compounds of the presently described subject matter in combination with Yervoy® (ipilimumab). In some embodiments, a method is provided to treat a host with cancer comprising administering to the host an effective amount of a Mer TKI including active compounds of the presently described subject matter in combination with an immunomodulatory agent selected from the group consisting of pembrolizumab and ipilimumab, wherein the cancer is melanoma. In some embodiments, the Mer TK is useful in the presently described subject matter, including active compounds of the presently described subject matter, are dual MER/Tyro3 TKIs. In some embodiments, the Mer TKIs are dual Mer/Tyro3 TKIs. In some embodiments, the Mer TKIs are MER-specific TKIs. In some embodiments, the Mer TKIs are Tyro3-specific TKIs.

(i) Tumors

The active compounds and methods described herein are useful for the treatment of tumors. As contemplated herein, the cancer treated can be a primary tumor or a metastatic tumor. In some embodiments, the methods described herein are used to treat a solid tumor, for example, melanoma, lung cancer (including lung adenocarcinoma, basal cell carcinoma, squamous cell carcinoma, large cell carcinoma, bronchioloalveolar carcinoma, bronchiogenic carcinoma, non-small-cell carcinoma, small cell carcinoma, mesothelioma); breast cancer (including ductal carcinoma, lobular carcinoma, inflammatory breast cancer, clear cell carcinoma, mucinous carcinoma, serosal cavities breast carcinoma); colorectal cancer (colon cancer, rectal cancer, colorectal adenocarcinoma); anal cancer; pancreatic cancer (including pancreatic adenocarcinoma, islet cell carcinoma, neuroendocrine tumors); prostate cancer; prostate adenocarcinoma; ovarian carcinoma (ovarian epithelial carcinoma or surface epithelial-stromal tumor including serous tumor, endometrioid tumor and mucinous cystadenocarcinoma, sex-cprd-stromal tumor); liver and bile duct carcinoma (including hepatocellular carcinoma, cholangiocarcinoma, hemangioma); esophageal carcinoma (including esophageal adenocarcinoma and squamous cell carcinoma); oral and oropharyngeal squamous cell carcinoma; salivary gland adenoid cystic carcinoma; bladder cancer; gastric cancer; bladder carcinoma; carcinoma of the uterus (including endometrial adenocarcinoma, ocular, uterine papillary serous carcinoma, uterine clear-cell carcinoma, uterine sarcomas and leiomyosarcomas, mixed mullerian tumors); glioma, glioblastoma, medulloblastotna, and other tumors of the brain; kidney cancers (including renal cell carcinoma, clear cell carcinoma, Wilm's tumor); cancer of the head and neck (including squamous cell carcinomas); cancer of the stomach (gastric cancers, stomach adenocarcinoma, gastrointestinal stromal tumor); testicular cancer; germ cell tumor; neuroendocrine tumor; cervical cancer; carcinoids of the gastrointestinal tract, breast, and other organs; signet ring cell carcinoma; mesenchymal tumors including sarcomas, fibrosarcomas, haemangioma, angiomatosis, haemangiopericytoma, pseudoangiomatous stromal hyperplasia, myofibroblastoma, fibromatosis, inflammatory myofibroblastic rumor, lipoma, angiolipoma, granular cell tumor, neurofibroma, schwannoma, angiosarcoma, liposarcoma, rhabdomyosarcoma, osteosarcoma, leiomyoma, leiomysarcoma, skin, including melanoma, cervical, retinoblastoma, head and neck cancer, pancreatic, brain, thyroid, testicular, renal, bladder, soft tissue, adrenal gland, urethra, cancers of the penis, myxosarcoma, chondrosarcoma, osteosarcoma, chordoma, malignant fibrous histiocytoma, lymphangiosarcoma, mesothelioma, squamous cell carcinoma; epidermoid carcinoma, malignant skin adnexal tumors, adenocarcinoma, hepatoma, hepatocellular carcinoma, renal cell carcinoma, hypernephroma, cholangiocarcinoma, transitional cell carcinoma, choriocarcinoma, seminoma, embryonal cell carcinoma, glioma anaplastic; glioblastoma multiforme, neuroblastoma, medulloblastoma, malignant meningioma, malignant schwannoma, neurofibrosarcoma, parathyroid carcinoma, medullary carcinoma of thyroid, bronchial carcinoid, pheochromocytoma, Islet cell carcinoma, malignant carcinoid, malignant paraganglioma, melanoma, Merkel cell neoplasm, cystosarcoma phylloide, salivary cancers, thymic carcinomas, and cancers of the vagina among others.

In some embodiments, a method is provided to treat a host with a glioblastoma comprising administering to the host an effective amount of a Mer TKI including active compounds of the presently described subject matter in combination with temozolomide. In some embodiments, a method is provided to treat a host with a breast cancer comprising administering to the host an effective amount of a Mer TKI including active compounds of the presently described subject matter in combination with trastuzumab.

In some embodiments, the cancer is NSCLC. In some embodiments, the cancer is a melanoma. In some embodiments, the cancer is breast cancer. In some embodiments, the cancer is a glioblastoma. In some embodiments, the cancer is a bone cancer. In some embodiments, the cancer is a brain cancer. In some embodiments, the cancer is a colon cancer. In some embodiments, the cancer is a rectal cancer. In some embodiments, the cancer is an endometrial cancer. In some embodiments, the cancer is an esophageal cancer. In some embodiments, the cancer is a cancer of the gastrointestinal tract. In some embodiments, the cancer is a kidney cancer. In some embodiments, the cancer is a liver cancer. In some embodiments, the cancer is a lung cancer. In some embodiments, the cancer is a mantle cell lymphoma. In some embodiments, the cancer is an ovarian cancer. In some embodiments, the cancer is a pancreatic cancer. In some embodiments, the cancer is a pituitary cancer. In some embodiments, the cancer is a prostate cancer. In some embodiments, the cancer is a skeletal muscle cancer. In some embodiments, the cancer is a skin cancer. In some embodiments, the cancer is a stomach cancer. In some embodiments, the cancer is a thyroid cancer. In some embodiments, the cancer is a neuroendocrine cancer. In some embodiments, the cancer is a gastroesophageal cancer. In some embodiments, the cancer is a renal cell cancer. In some embodiments, the cancer is a head and neck cancer.

In some embodiments, the methods described herein are useful for treating a host suffering from a lymphoma or lymphocytic or myelocytic proliferation disorder or abnormality. For example, the Mer TKIs as described herein can be administered to a subject suffering from a Hodgkin Lymphoma of a Non-Hodgkin Lymphoma. For example, the subject can be suffering from a Non-Hodgkin Lymphoma such as, but not limited to: an AIDS-Related Lymphoma; Anaplastic Large-Cell Lymphoma; Angioimmunoblastic Lymphoma; Blastic NK-Cell Lymphoma; Burkitt's Lymphoma; Burkitt-like Lymphoma (Small Non-Cleaved Cell Lymphoma); Chronic Lymphocytic Leukemia/Small Lymphocytic Lymphoma; Cutaneous T-Cell Lymphoma; Diffuse Large B-Cell Lymphoma; Enteropathy-Type T-Cell Lymphoma; Follicular Lymphoma; Hepatosplenic Gamma-Delta T-Cell Lymphoma; Lymphoblastic Lymphoma; Mantle Cell Lymphoma; Marginal Zone Lymphoma; Nasal T-Cell Lymphoma; Pediatric Lymphoma; Peripheral T-Cell Lymphomas; Primary Central Nervous System Lymphoma; T-Cell Leukemias; Transformed Lymphomas; Treatment-Related T-Cell Lymphomas; or Waldenstrom's Macroglobulinemia.

Alternatively, the subject may be suffering from a Hodgkin Lymphoma, such as, but not limited to: Nodular Sclerosis Classical Hodgkin's Lymphoma (CHL); Mixed Cellularity CHL; Lymphocyte-depletion CHL; Lymphocyte-rich CHL; Lymphocyte Predominant Hodgkin Lymphoma; or Nodular Lymphocyte Predominant HL.

In some embodiments, the methods as described herein may be useful to treat a host suffering from a specific T-cell, a B-cell, or a NK-cell based lymphoma, proliferative disorder, or abnormality. For example, the subject can be suffering from a specific T-cell or NK-cell lymphoma, for example, but not limited to: Peripheral T-cell lymphoma, for example, peripheral T-cell lymphoma and peripheral T-cell lymphoma not otherwise specified (PTCL-NOS); anaplastic large cell lymphoma, for example anaplastic lymphoma kinase (ALK) positive, ALK negative anaplastic large cell lymphoma, or primary cutaneous anaplastic large cell lymphoma; angioimmunoblastic lymphoma; cutaneous T-cell lymphoma, for example mycosis fungoides, Szary syndrome, primary cutaneous anaplastic large cell lymphoma, primary cutaneous CD30+ T-cell lymphoproliferative disorder; primary cutaneous aggressive epidermotropic CD8+ cytotoxic T-cell lymphoma; primary cutaneous gamma-delta T-cell lymphoma; primary cutaneous small/medium CD4+ T-cell lymphoma. and lymphomatoid papulosis; Adult T-cell Leukemia Lymphoma (ATLL); Blastic NK-cell Lymphoma; Enteropathy-type T-cell lymphoma; Hematosplenic gamma-delta T-cell Lymphoma; Lymphoblastic Lymphoma; Nasal NK T-cell Lymphomas; Treatment-related T-cell lymphomas; for example lymphomas that appear after solid organ or bone marrow transplantation; T-cell prolymphocyte leukemia; T-cell large granular lymphocytic leukemia; Chronic lymphoproliferative disorder of NK-cells; Aggressive NK cell leukemia; Systemic EBV+ T-cell lymphoproliferative disease of childhood (associated with chronic active EBV infection); Hydroa vacciniforme-like lymphoma; Adult T-cell leukemia/lymphoma; Enteropathy-associated T-cell lymphoma; Hepatosplenic T-cell lymphoma; or Subcutaneous panniculitis -like T-cell lymphoma.

Alternatively, the subject may be suffering from a specific B-cell lymphoma or proliferative disorder such as, but not limited to: multiple myeloma; Diffuse large B cell lymphoma; Follicular lymphoma; Mucosa-Associated Lymphatic Tissue lymphoma (MALT); Small cell lymphocytic lymphoma; Mantle cell lymphoma (MCL); Burkitt lymphoma; Mediastinal large B cell lymphoma; Waldenstrom macroglobulinemia; Nodal marginal zone B cell lymphoma (NMZL); Splenic marginal zone lymphoma (SMZL); Intravascular large B-cell lymphoma; Primary effusion lymphoma; or Lymphomatoid granulomatosis; Chronic lymphocytic leukemia/small lymphocytic lymphoma; B-cell prolymphocyte leukemia; Hairy cell leukemia Splenic lymphoma/leukemia, unclassifiable; Splenic diffuse red pulp small B-cell lymphoma; Hairy cell leukemia-variant; Lymphoplasmacytic lymphoma; Heavy chain diseases, for example, Alpha heavy chain disease, Gamma heavy chain disease, Mu heavy chain disease; Plasma cell myeloma; Solitary plasmacytoma of bone; Extraosseous plasmacytoma; Primary cutaneous follicle center lymphoma; T cell/histiocyte rich large B-cell lymphoma; DLBCL associated with chronic inflammation; Epstein-Barr virus (EBV)+ DLBCL of the elderly; Primary mediastinal (thymic) large B-cell lymphoma; Primary cutaneous DLBCL, leg type; ALK+ large B-cell lymphoma; Plasmablastic lymphoma; Large B-cell lymphoma arising in HHV8-associated multicentric; Castleman disease; B-cell lymphoma, unclassifiable, with features intermediate between diffuse large B-cell lymphoma and Burkitt lymphoma; B-cell lymphoma, unclassifiable, with features intermediate between diffuse large B-cell lymphoma and classical Hodgkin lymphoma; Nodular sclerosis classical Hodgkin lymphoma; Lymphocyte-rich classical Hodgkin lymphoma; Mixed cellularity classical Hodgkin lymphoma; or Lymphocyte-depleted classical Hodgkin lymphoma. In some embodiments, the methods described herein can be used to a subject suffering from a leukemia. For example, the subject may be suffering from an acute or chronic leukemia of a lymphocytic or myelogenous origin, such as, but not limited to: Acute lymphoblastic leukemia (ALL); Acute myelogenous leukemia (A L); Chronic lymphocytic leukemia (CLL); Chronic myelogenous leukemia (CIVIL); juvenile myelomonocytic leukemia (JMML); hairy cell leukemia (HCL); acute promyelocytic leukemia (a subtype of AML); T-cell prolymphocyte leukemia (TPLL); large granular lymphocytic leukemia; or Adult T-cell chronic leukemia; large granular lymphocytic leukemia (LGL). In some embodiments, the patient suffers from an acute myelogenous leukemia, for example an undifferentiated AML (MO); myeloblastic leukemia (M1; with/without minimal cell maturation); myeloblastic leukemia (M2; with cell maturation); promyelocytic leukemia (M3 or M3 variant [M3V]); myelomonocytic leukemia (M4 or M4 variant with eosinophilia [M4E]); monocytic leukemia (M5); ervthroleukemia (M6); or megakaryoblastic leukemia (M7).

(ii) Acute Myeloid Leukemia

In some embodiments, the methods described herein can be used to treat a host suffering from Acute Myeloid Leukemia (AML). In some embodiments, the AML contains a wild type FLT3 protein. In some embodiments, the replication of the AML cells are dependent on FLT3 expression. In some embodiments, the AML contains a FLT3-ITD mutation. In some embodiments, the AML contains a FLT3-T D mutation. In some embodiments, the AML contains both a FLT3-ITD and FLT3-TKD mutation.

FLT3-ITD mutations are well known in the art. FLT3-TKD mutations are also well known in the art. In some embodiments, a FLT3 or dual MER/FLT3 inhibitor is administered to a host suffering from AML, wherein the AML contains a mutation within the FLT3-TKD at amino acid F691 or D835. In some embodiments, the FLT3-TKD mutation is selected from D835H, D835N, D835Y, D835A, D835V, D835V, D835E, I836F, I836L, I836V, I836D, I836H, I836M, and F691L. In some embodiments, the host is suffering from the FLT3-TKD mutation D835Y. In some embodiments, the host is suffering from the FLT3-TKD mutation F691L.

In some embodiments, the host is suffering from acute promyelocytic leukemia (a subtype of AML); a minimally differentiated AML (MO); myeloblastic leukemia (M1; with/without minimal cell maturation); myeloblastic leukemia (M2; with cell maturation); promyelocytic leukemia (M3 or M3 variant [M3V]); myelomonocytic leukemia (M4 or M4 variant with eosinophilia [M4E]); monocytic leukemia (M5); erythroleukemia (M6); or megakaryocyte leukemia (M7). In some embodiments, the host is suffering from AML that has relapsed or become refractory to previous treatments. In some embodiments, the host has previously been treated with a FLT3 inhibitor or other chemotherapeutic agent.

In some embodiments, the FLT3 inhibitors are efficacious against AML having both FLT3-ITD and FLT3-TKD mutations, wherein resistance to other FLT3 inhibitors, for example, AC220, has been established.

In some embodiments, the host has an Acute Myeloid Leukemia (AML) comprising a FLT3 mutation, wherein the mutation confers resistance to a FLT3 inhibitor other than the FLT3 inhibitors described herein. In some embodiments, the host has an AML comprising a FLT3 mutation, wherein the mutation has conferred resistance to quizartinib (AC220) or other FLT3 inhibitor selected from lestaurtinib, sunitinib, sorafenib, tandutinib, midostaurin, amuvatinib crenolanib, dovitinib, ENMD-2076 (EntreMed), or KW-2449 (Kyowa Hakko Kirin), or a combination thereof.

(iii) Chemotherapeutic Agents

In some embodiments, an active compound or Mer TKI as described herein is used in combination or alternation with a chemotherapeutic agent. Such agents may include, but are not limited to, tamoxifen, midazolam, letrozole, bortezomib, anastrozole, goserelin, an mTOR inhibitor, a PI3 kinase inhibitors, dual mTOR-PBK inhibitors, MEK inhibitors, RAS inhibitors, ALK inhibitors, HSP inhibitors (for example, HSP70 and HSP 90 inhibitors, or a combination thereof). Examples of mTOR inhibitors include but are not limited to rapamycin and its analogs, everolimus (Afinitor), temsirolimus, ridaforolimus, sirolimus, and deforolimus. Examples of P13 kinase inhibitors include but are not limited to Wortmannin, demethoxyviridin, perifosine, idelalisib, PX-866, IPI-145, BAY 80-6946, BEZ235, RP6503, TGR 1202 (RP5264), MLN1117 (FNK1117), Pictilisib, Buparlisib, SAR245408 (XL147), SAR245409 (XL765), Palomid 529, ZSTK474, PWT33597, RP6530, CUDC-907, and AEZS-136. Examples of MEK inhibitors include but are not limited to Trametinib, Selumetinib, MEK162, GDC-0973 (XL518), and PD0325901. Examples of RAS inhibitors include but are not limited to Reolysin and siG12D LODER. Examples of ALK inhibitors include but are not limited to Crizotinib, AP261 13, and LDK378. HSP inhibitors include but are not limited to Geldanamycin or 17-N-Allylamino-17-demethoxygeldanamycin (17AAG), and Radicicol. In some embodiments, the chemotherapeutic agent is an anti-programmed cell death-1 (PD-1) agent, for example, nivolumab, pembrolizumab, BMS936559, lambrolizumab, MPDL3280A, pidilizumab, AMP-244, and MED 14736. In some embodiments, the chemotherapeutic agent is a B-RAF inhibitor, for example, vemurafenib or sorafenib. In some embodiments, the chemotherapeutic agent is a FGFR inhibitor, for example, but not limited to, AZD4547, dovitinib, BGJ398, LY2874455, and ponatinib. In some embodiments, an active compound or Mer TKI as described herein is used in combination with crizotinib.

In certain embodiments, the additional therapeutic agent is an anti-inflammatory agent, a chemotherapeutic agent, a radiotherapeutic, an additional therapeutic agent, or an immunosuppressive agent.

Suitable chemotherapeutic agents include, but are not limited to, radioactive molecules, toxins, also referred to as cytotoxins or cytotoxic agents, which includes any agent that is detrimental to the viability of cells, agents, and liposomes or other vesicles containing chemotherapeutic compounds. General anticancer pharmaceutical agents include: Vincristine (Oncovin®) or liposomal vincristine (Marqibo®), Daunorubicin (daunomycin or Cerubidine®) or doxorubicin (Adriamycin®), Cytarabine (cytosine arabinoside, ara-C, or Cytosar®), L-asparaginase (Elspar®) or PEG-L-asparaginase (pegaspargase or Oncaspar®), Etoposide (VP-16), Teniposide (Vumon®), 6-mercaptopurine (6-MP or Purinethol®), Methotrexate, Cyclophosphamide (Cytoxan®), Prednisone, Dexamethasone (Decadron), imatinib (Gleevec®), dasatinib (Sprycel®), nilotinib (Tasigna®), bosutinib (Bosulif®), and ponatinib (Iclusig™). Examples of additional suitable chemotherapeutic agents include but are not limited to 1-dehydrotestosterone, 5-fluorouracil decarbazine, 6-mercaptopurine, 6-thioguanine, actinomycin D, adriamycin, aldesleukin, alkylating agents, allopurinol sodium, altretamine, amifostine, anastrozole, anthramycin (AMC)), anti-mitotic agents, cis-dichlorodiamine platinum (FF) (DDP) cisplatin), diamino-dichloroplatinum, anthracyclines, antibiotics, antimetabolites, asparaginase, BCG live (intravesical), betamethasone sodium phosphate and betamethasone acetate, bicalutamide, bleomycin sulfate, busulfan, calcium leucovorin, calicheamicin, capecitabine, carboplatin, lomustine (CCNU), carmustine (BSNU), Chlorambucil, Cisplatin, Cladribine, Colchicine, conjugated estrogens, Cyclophosphamide, Cyclophosphamide, Cytarabine, Cytarabine, cytochalasin B, Cytoxan, Dacarbazine, Dactinomycin, dactinomycin (formerly actinomycin), Daunorubicin HC1, Daunorubicin citrate, denileukin diftitox, Dexrazoxane, Dibromomannitol, dihydroxy anthracin dione, Docetaxel, dolasetron mesylate, doxorubicin HC1, dronabinol, *E. coli* L-asparaginase, emetine, epoetin-a, *Erwinia* L-asparaginase, esterified estrogens, estradiol, estramustine phosphate sodium, ethidium bromide, ethinyl estradiol, etidronate, etoposide citrovorum factor, etoposide phosphate, filgrastim, floxuridine, fluconazole, fludarabine phosphate, fluorouracil, fiutamide, folic acid, gemcitabine HC1, glucocorticoids, goserelin acetate, gramicidin D, granisetron HC1, hydroxyurea, idarubicin HC1, ifosfamide, interferon a-2b, irinotecan HC1, letrozole, leucovorin calcium, leuprolide acetate, levamisole HC1, lidocaine, lomustine, maytansinoid, mechlorethamine HC1, medroxyprogesterone acetate, megestrol acetate, melphalan HC1, mercaptopurine, mesna, methotrexate, methyltestosterone, mithramycin, mitomycin C, mitotane, mitoxantrone, nilutamide, octreotide acetate, oligomycin A, ondansetron HC1, paclitaxel, pamidronate disodium, pentostatin, pilocarpine HC1, plimycin, polifeprosan 20 with carmustine implant, porfimer sodium, procaine, procarbazine HC1, propranolol, rituximab, sargramostim, streptozotocin, tamoxifen, taxol, teniposide, tenoposide, testolactone, tetracaine, thioepa chlorambucil, tMoguanine, thiotepa, topotecan HC1, toremifene citrate, trastuzumab, tretinoin, valrubicin, vinblastine sulfate, vincristine sulfate, and vinorelbine tartrate. In some embodiments, an active compound or Mer TKI as described herein is used in combination with oligomycin A.

Additional therapeutic agents that can be administered in combination with a compound disclosed herein can include bevacizumab, sutinib, sorafenib, 2-methoxyestradiol or 2ME2, finasunate, vatalanib, vandetanib, aflibercept, volociximab, etaracizumab (MEDI-522), cilengitide, erlotinib, cetuximab, panitumumab, gefitinib, trastuzumab, dovitinib, figitumumab, atacicept, rituximab, alemtuzumab, aldesleukine, atlizumab, tocilizumab, temsirolimus, everolimus, lucatumumab, dacetuzumab, HLL1, huN901-DM1, atiprimod, natalizumab, bortezomib, carfilzomib, marizomib, tanespimycin, saquinavir mesylate, ritonavir, nelfinavir mesylate, indinavir sulfate, belinostat, panobinostat, mapatumumab, lexatumumab, dulanermin, ABT-737, oblimersen, plitidepsin, talmapimod, P276-00, enzastaurin, tipifarnib, perifosine, imatinib, dasatinib, lenalidomide, thalidomide, simvastatin, ABT-888, temozolomide, erlotinib, lapatinib, sunitinib, FTS, AZD6244, BEZ235, and celecoxib. In some embodiments, an active compound or Mer TKI as described herein is used in combination with gefitinib.

In some embodiments, a dual Mer (Mer/Tyro3) inhibitor described herein is used in combination with a chemotherapeutic agent for the treatment of AML. Such agents may include, but are not limited to, cytarabine (ara-C), anthracycline drugs including but not limited to, daunorubicin, idarubicin; cladribine, fludarabine, Gleevec® (imatinib), Sprycel® (dasatinib), adriamycin, arsenic trioxide, cerubidine, clafen, cyclophosphamide, cytarabine, daunorubicin, doxorubicin, vincristine, and topotecan. Some of the other chemo drugs that may be used to treat AML include: etoposide (VP-16), 6-thioguanine (6-TG), hydroxyurea (Hydrea®), Corticosteroid drugs, such as prednisone or dexamethasone (Decadron®), methotrexate (MTX), 6-mercaptopurine (6-MP), azacitidine (Vidaza®), and decitabine (Dacogen®). In some embodiments, a dual Mer inhibitor described herein is used in combination with cytarabine. In some embodiments, a dual Mer inhibitor described herein is used in combination with an additional inhibitor to treat with a host suffering from AML. Additional inhibitors for use in combination with the dual Mer inhibitors described herein include lestaurtinib, sunitinib, sorafenib, tandutinib, midostaurin, crenolanib, dovitinib, ENMD-2076 (Entremed), amuvatinib, or KW-2449 (Kyowa Hakko Kirin).

In some embodiments, a dual Mer inhibitor described herein is used in combination with a Ras inhibitor. Examples of Ras inhibitors include but are not limited to Reolysin, FusOn-H2, and siG 12D LODER.

In some embodiments, a dual Mer inhibitor described herein is used in combination with a Phosphoinositide 3-kinase inhibitor (PI3K inhibitor). Inhibitors that may be used in the presently described subject matter are well known. Examples of inhibitors include but are not limited to Wortmannin, demethoxyviridin, perifosine, idelalisib, Pictilisib, Palomid 529, ZSTK474, PWT33597, CUDC-907, AEZS-136, PX-866, IPI-145, RP6503, SAR245408 (XL147), duvelisib, GS-9820, GDC-0032 (2-[4-[2-(2-Isopropyl-5-methyl-1,2,4-triazol-3-yl)-5,6-dmydroimidazo[1,2-d][1,4]benzoxazepin-9-yl]pyrazol-1-yl]-2-methylpropanamide), MLN-I 1 17 ((2R)-1-Phenoxy-2-butanyl hydrogen (S)-methylphosphonate; or Methyl(oxo) {[(2R)-1-phenoxy-2-butanyl]oxy}phosphonium)), BYL-719 ((2S)-N1-[4-Methyl-5-[2-(2,2,2-trifluoro-1,1-dimethylethyl)-4-pyridinyl]-2-thiazolyl]-1,2-pyrroUdinedicarboxamide), GSK2126458 (2,4-Difluoro-N-{2-(methyloxy)-5-[4-(4-pyrida5dnyl)-6-quinolinyl]-3-pyridinyl}benzenesulfonamide), TGX-221 ((±)-7-Methyl-2-(moφholm-4-yl)-9-(1-henylan moethyl-pydo[1,2-a]-yrimidin-4-one)) GSK2636771 (2-Memyl-1-(2-memyl-3-(trifluoromemyl)benzycarboxylic acid dihydrochloride), KTN-193 ((R)-2-((1-(7-methyl-2-morpholino-4-oxo-4H-pyrido[1,2-a]pyrimidin-9-yl)ethyl)amino)benzoic acid), TGR-1202/RP5264, GS-9820 ((S)-1-(4-((2-(2-aminopyrimidin-5-yl)-7-methyl-4-mohydroxypropan-1-one), GS-1101 (5-fluoro-3-phenyl-2-([S)]-1-[9H-purin-6-ylammo]-propyl)-3H-quinazolin-4-one), AMG-319, GSK-2269557, SAR245409 (N-(4-(N-(3-((3,5-dimethoxyphenyl) amino)quinoxaUn-2-yl)sulfamoyl)phenyl)-3-methoxy-4 methylbenzamide), BAY80-6946 (2-amino-N-(7-memoxy-8-(3-mo holinopro oxy)-2,3-dihydroi idazo[1,2-c]quinaz), AS 252424 (5-[1-[5-(4-Fluoro-2-hydroxy-phenyl)-furan-2-yl]-meth-(Z)-ylidene]-thiazolidine-2,4-dione), CZ 24832 (5-(2-arnino-8-fluoro-[1,2,4]triazolo[1,5-a]pyridin-6-yl)-N-tert-butylpyridme-3-sulfona Buparlisib (5-[2,6-Di(4-morpholinyl]-4-pyrimidinyl]-4-(txifluoromemyl)-2-pyridmanune), GDC-0941 (2-(1H-Indazol-4-yl)-6-[[4-(methylsulfonyl)-1-piperazinyl]methyl]-4-(4-morpholmyl) thieno[3,2-d]pyrimidine), GDC-0980 ((S)-1-(4 (2-(2-aminopyrirnidin-5-yl)-7-methyl-4-mo holmotrueno[3,2-d] pyrilnidin-6 yl)methyl)piperazin-1-yl)-2-hydroxypropan-1-one (also known as RG7422)), SF1126 ((8S,14S,17S)-14-(carboxymethyl)-8-(3-gnarddinopropyl)-17-(hydroxymethyl)-3,6,9,12,15-pentaoxo-1-(4-(4-oxo-8-phenyl-4H-chromen-2-yl) morpholino-4-ium)-2-oxa-7,10,13,16-tetraazaoctadecan-18-oate), PF-05212384 (N-[4-[[4-(Dimethylamino)-1-piperidinyl]carbonyl]phenyl]-N'-[4-(4,6-di-4-morpholinyl-1,3,5-triazin-2-yl)phenyl]urea), LY3023414, BEZ235 (2-Methyl-2-{4-[3-methyl-2-oxo-8-(quinolin-3-yl)-2,3-dmydro-1H-imidazo[4,5-c]qumolm-1-yl]phenyl}propanem XL-765 (N-(3-(N-(3-(3,5-dimemoxy-phenylammo)quinoxalin-2-yl)sulfamoyl)phenyl)-3-methoxy-4-methylbenzamide), and GSK1059615 (5-[[4-(4-Pyridinyl)-6-quinolinyl]methylene]-2,4-thiazolidenedione), PX886 ([(3aR,6E,9S,9aR,10R,11aS)-6-[[bis^rop-2-enyl) ammo]memylidene]-5-hydxoxy-9-(methoxymelhyl)-9a,11a-ditrioxo-2,3,3a,9,10,11-hexahydroindeno[4,5h]iso-chromen-10-yl] acetate (also known as sonolisib)), and the structure described in WO2014/071109 having the formula:

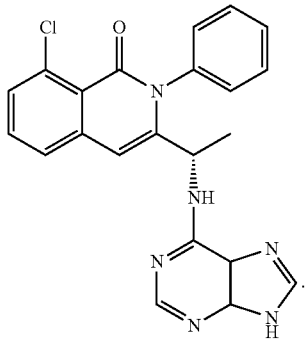 [SMILES: C[C@H](NC1=NC=NC2NC=NC12)c1cc2cccc(Cl)c2c(=O)n1-c1ccccc1]

In some embodiments, a dual Mer inhibitor described herein is used in combination with a modulator of the STATS pathway. Compounds which modulate the Janus Kinase 2 (JAK2)-Signal Transducer and Activator of Transcription 5 (STATS) pathway include but are not limited to Lestaurtinib, Ruxolitinib, SB1518, CYT387, LY3009104, INC424, LY2784544, BMS-91 1543, NS-018, and TG101348.

In some embodiments, a dual Mer inhibitor described herein is used in combination with an AKT inhibitor, including but not limited to, MK-2206, GSK690693, Perifosine, (KRX-0401), GDC-0068, Triciribine, AZD5363, Honokiol, PF-04691502, and Miltefosine.

(IV) Immunomodulatory Combination Agents

Active compounds as described herein used in a dosage for direct effect on the diseased cell can be used in combination with one or more immunotherapy agents for additive or synergistic efficacy against solid tumors. In some embodiments, a tumor associated macrophage MerT inhibiting amount of a Mer T J is used in combination or alternation with the immunomodulatory agent. In some embodiments, a host tumor survival-signal inhibiting, antiviral or antibacterial amount of a Mer T I is used in combination or alternation with the immunomodulatory agent.

Immunomodulators are small molecules or biologic agents that treat a disease by inducing, enhancing or suppressing the host's immune system. In the present application, one or more immunomodulators are selected that induce or enhance the host's immune system. Some immunomodulators boost the host's immune system and others help train the host's immune system to better attack tumor cells. Other immunomodulators target proteins that help cancer grow.

Three general categories of immunotherapies are antibodies, cancer vaccines, and non-specific immunotherapies. Antibodies are typically administered as monoclonals, although that is not required. "Naked monoclonal antibodies" work by attaching to antigens on tumor cells. Some antibodies can act as a marker for the body's immune system to destroy the tumor cells. Others block signaling agents for tumor cells. Antibodies can generally be used to bind to any signaling or metabolic agent that directly or indirectly facilitates tumor growth. Examples are alemtuzumab (Campath) which binds to CD52 antigen, and trastuzumab (Herceptin), which binds to the HER2 protein.

In some embodiments, an antibody can be used that is conjugated to another moiety that increases it delivery or efficacy. For example, the antibody can be connected to a cytotoxic drug or a radiolabel. Conjugated antibodies are sometimes referred to as "tagged, labeled or loaded". Radiolabeled antibodies have small radioactive particles attached to them. Examples are Zevalin, which is an antibody against CD20 used to treat lymphoma. Chemolabeled antibodies are antibodies that have cytotoxic agents attached to them. Examples are Adcetris, which targets CD30, and Kadcyla, which targets HER2. Ontak, while not an antibody, is similar in that it is interleukin-2 attached to a toxin from diphtheria.

Another category of immunotherapy that can be used in the presently described subject matter is a cancer vaccine. Most cancer vaccines are prepared from tumor cells, parts of tumor cells or pure antigens. The vaccine can be used with an adjuvant to help boost the immune response. An example is Provenge, which is the first cancer vaccine approved by the US FDA. The vaccine can for example be a dendritic cell vaccine or a vector-based vaccine Nonspecific tumor immunotherapies and adjuvants include compounds that stimulate the immune system to do a better job at attacking the tumor cells. Such immunotherapies include cytokines, interleukins, interferons (a primarily but can be also β or γ). Specific agents include granulocyte-macrophage colony-stimulating factor (GM-CSF), IL-12, IL-7, IL-21, drugs that target CTLA-4 (such as Yervoy, which is Ipilimumab) and drugs that target PD-1 or PDL-1 (such as for example, nivolumab (BMS), pembrolizumab (Merck), pidilizumab (CureTech/Teva), AMP-244 (Amplimmune/GSK), BMS-936559 (BMS), and MEDI4736 (Roche/Genentech)).

Other drugs that boost the immune system are thalidomide, lenalidomide, pomalidomide, the Bacille Calmette-Gurin bacteria and Irniquimod. Additional therapeutic agents that can be used in combination with the MerTK inhibitor include bispecific antibodies, chimeric antigen receptor (CAR) T-cell therapy and tumor-infiltrating lymphocytes.

In some embodiments of the presently described subject matter, a compound described herein can be combined with at least one immunosuppressive agent. The immunosuppressive agent is preferably selected from the group consisting of a calcineurin inhibitor, e.g. a cyclosporin or an ascomycin, e.g. Cyclosporin A (NEORAL®), FK506 (tacrolimus), pimecrolimus, a mTOR inhibitor, e.g. rapamycin or a derivative thereof, e.g. Sirolimus (RAPAMUNE®), Everolimus (Certican®), temsirolimus, zotarolimus, biolimus-7, biolimus-9, a rapalog, e.g.ridaforolimus, azathioprine, campath 1H, a SIP receptor modulator, e.g. fingolimod or an analogue thereof, an anti IL-8 antibody, mycophenolic acid or a salt thereof, e.g. sodium salt, or a prodrug thereof, e.g. Mycophenolate Mofetil (CELLCEPT®), OKT3 (ORTHOCLONE OKT3®), Prednisone, ATGAM®, THYMOGLOBULIN®, Brequinar Sodium, OKT4, T10B9.A-3A, 33B3.1, 15-deoxyspergualin, tresperimus, Leflunomide ARAVA®, CTLAI-Ig, anti-CD25, anti-IL2R, Basiliximab (SIMULECT®), Daclizumab (ZENAPAX®), mizorbine, methotrexate, dexamethasone, ISAtx-247, SDZ ASM 981 (pimecrolimus, Elidel®), CTLA41g (Abatacept), belatacept, LFA31g, etanercept (sold as Enbrel® by Immunex), adalimumab (Humira®), infliximab (Remicade®), an anti-LFA-1 antibody, natalizumab (Antegren®), Enlimomab, gavilimomab, anti-thymocyte immunoglobulin, siphzumab, Alefacept efalizumab, pentasa, mesalazine, asacol, codeine phosphate, benorylate, fenbufen, naprosyn, diclofenac, etodolac and indomethacin, aspirin and ibuprofen.

b. Use as an Immunomodulatory or Immunostimulatory Agent

In various embodiments, the compounds described herein can be used as immunomodulatory agents that reverse the MerTK-induced suppression of proimflammatory cytokines such as wound healing cytokines (IL-10 and GAS6) and enhance the expression of acute inflammatory cytokines (IL-12 and IL-6). In this way, the aminopyrimidine compounds can "re-normalize" or "re-program" the host microenvironment in the diseased tissue area to attack the diseased cells. This immunostimulatory activity can be used therapeutically to treat a host with a tumor, cancer or other neoplasm, or alternatively, to treat a host with an infection, for example, a viral or bacterial infection.

Taking advantage of the immunomostimulatory activity of the compounds described herein, or a pharmaceutically acceptable composition, salt, isotopic analog, or prodrug thereof, may be used for the treatment of a MERTK-negative (−/−) tumor or cancer. In some embodiments, the cancer is a MERTK-negative (−/−) breast cancer.

Therefore, as part of the subject matter described herein, one or more of the compounds disclosed herein can be used as adjunctive therapy for its immunostimulatory effect as a means to increase the efficacy of the antineoplastic standard of care therapies, such as chemotherapeutic compounds or radiation.

In some embodiments of the subject matter described herein, one or more of the compounds disclosed herein can be used as adjunctive therapy for its immunostimulatory effect as a means to increase the efficacy of the antiviral or antibacterial standard of care therapies.

For example, a disclosed compound or composition is administered to a host in an immunomodulatory effective amount to inhibit Mer tyrosine kinase activity in the host's tumor associated macrophage to suppress tumor immunity. In some embodiments, the dosage of the Mer TKI administered as an immunomodulatory agent to stimulate innate anti-tumor immunity is lower than a dosage of a Mer TKI administered to a host as a direct anti-cancer agent. In some embodiments, the Mer TKI is administered at a dosage which exhibits immunomodulatory but not direct cytotoxic effect.

In some embodiments, the cancer is a MERTK-negative (−/−) cancer.

Without wanting to be bound by any particular theory, it is believed that the administration of a chemotherapeutic agent results in the apoptosis of tumor cells, exposing antigenic tumor proteins. The host's innate immune system is thus stimulated to recognize the antigenic apoptotic components from the tumor cells after chemotherapy or ionizing radiation and mount an immune response. In some embodiments, the administration of a chemotherapeutic agent or ionizing radiation, before, with or subsequently followed by the administration of a Mer TKI is carried out using the normal standard of care chemotherapeutic protocol. In some embodiments, the standard of care protocol of the chemotherapeutic is changed in a manner that causes less toxicity to the host due to the adjunctive or synergistic activity of the Mer TKI.

In some embodiments, a method for the treatment of a tumor is provided that includes administering an effective amount of a Mer TKI to inhibit TK signaling in a tumor associated macrophage, without inhibiting the survival signal in the tumor itself. In this way, the Mer TKI can be used to ramp up the immune response to the tumor by inhibiting macrophage tumorogenic tolerance during normal tumor chemotherapeutic agent. The immunomodulatory dosage of the Mer TKI can be given prior to, with or after chemotherapeutic therapy and can be used simultaneously with or intermittently with the chemotherapeutic therapy. In some embodiments, less chemotherapeutic therapy is needed than the normal standard of care defined for that chemotherapeutic agent, due to the increased efficacy of the immune response in the surrounding tumor microenvironment. In some embodiments, a dose of Mer TKI including active compounds of the presently described subject matter (for example 0.5 to 150 mg/dose) is given as a type of adjunctive therapy with the chemotherapeutic agent.

In some embodiments of the subject matter described herein, a Mer TKI is administered to a host having a cancer as an immunomodulatory agent to inhibit Mer tyrosine kinase activity in a tumor associated macrophage in order to suppress tumor immunity. In some embodiments, the dosage of the Mer TKI administered as an immunomodulatory agent to stimulate innate anti-tumor immunity is lower than a dosage of a Mer TKI administered to a host as a direct anti-cancer agent. In some embodiments, the Mer TKI is administered at a dosage which exhibits immunomodulatory but not direct cytotoxic effects on the cancer.

In some embodiments, the dose associated with the immunomodulatory effect of an active compound of the presently described subject matter is about 2-fold, about 3-fold, about 4-fold, about 5-fold, about 6-fold, about 7-fold, about 8-fold, about 9-fold, about 10-fold or greater lower than the dose associated with a direct survival-signal inhibiting anti-tumor or cytotoxic effect, or the direct antiviral or antibacterial effect. In some embodiments, the dose used to induce an immunomodulatory effect in a host is between about 0.5 mg and about 150 mg. In some embodiments, the dose is about 1 mg, about 2 mg, about 3 mg, about 4 mg, about 5 mg, about 10 mg, about 12 mg, about 15 mg, about 20 mg, about 25 mg, about 30 mg, about 35 mg, about 40 mg, about 45 mg, about 50 mg, about 55 mg, about 60 mg, about 65 mg, about 70 mg, about 75 mg, about 80 mg, about 85 mg, about 90 mg, about 95 mg, about 100 mg, about 110 mg, about 125 mg, about 140 mg, or about 150 mg.

c. Use as an Anti-Infective Agent

In various embodiments, an effective amount of a disclosed compound or composition can be administered as an immunomodulatory agent to stimulate the innate immune system. This immunostimulatory activity can be used therapeutically to treat a host with an infection. In some embodiments, the infection is a viral infection. In some embodiments, the infection is a bacterial infection. In some embodiments, an effective amount of a disclosed compound or composition can be used to treat a host bearing any virus-related infection where the virus has a virion envelope phosphatidyl serine that complexes with MerTK to achieve viral entry or is otherwise facilitated by MerTK in the infectious process or maintenance.

(i) Viral Infections

The virus may be an enveloped virus or a non-enveloped virus. In some embodiments, the host is infected or threatened to become infected with a virus selected from, for example, Flaviviridae viruses, including Flavivirus (such as Yellow Fever, West Nile and Dengue), Hepacivirus (Hepatitis C virus, "HCV"), Pegivirus and Pestivirus (Bovine viral diarrhea virus); Filoviridae viruses, including Ebola viruses; Togaviridae viruses, including Chikungunya virus; Coronaviruses, such as SARS (Severe acute respiratory syndrome) and MERS (Middle East respiratory syndrome); Orthomyxoviridae viruses, for example influenza; Paramyxoviridae viruses, for example Respiratory syncytial virus (RSV), measles and mumps; and Caliciviridae viruses, including Lagovirus, Vesivirus, and Sapovirus and Norovirus (Norwalk-like virus), and Lentiviruses, for example, HIV. In some embodiments, an active compound disclosed herein is administered in combination or alternation with another anti-viral agent for combination therapy.

More broadly, the host to be treated may be infected with an enveloped virus including, but not limited to, viruses of the following families: Bornaviridae, Bunyaviridae, Coronaviridae, Filoviridae, Flaviridae, Hepadnaviridae, Herpesviridae, Nyamiviridae, Orthomyxoviridae, Paramyxoviridae, Poxyiridae, Retroviridae, Rhabdoviridae, and Togaviridae. Examples of viruses form the Bunyaviridae family include, but are not limited to, bunya viruses such as La Crosse virus and Hantaan. Examples of viruses from the Coronaviridae family include, but are not limited to, coronaviruses such as SARS virus or Toroviruses. Examples of viruses from the Filoviradae family include, but are not limited to, Ebola and Marburg. Examples of viruses from the Flaviridae family include, but are not limited to, dengue, encephalitis viruses including West Nile virus, Japanese encephalitis virus and yellow fever virus and Hepatitis C virus. Examples of viruses from the Hepadnaviridae family include, but are not limited to, Hepatitis B. Examples of viruses from the Herpesviridae family include, but are not limited to, cytomegalovirus, herpes simplex viruses 1 and 2, HHV-6, HHV-7, HHV-8, pseudorabies virus, and varicella zoster virus. Examples of viruses from the Orthomyxoviridae family include, but are not limited to, influenza virus. Examples of viruses from the Paramyxoviridae family include, but are not limited to, measles, metapneumovirus, mumps, parainfluenza, respiratory syncytial virus, and sendai. Examples of viruses from the Poxviridae family include, but are not limited to, pox viruses such as smallpox, monkey pox, and Mouuscum contagiosum virus, variola viruses, vaccinia virus, and yatapox viruses such as Tanapox and Yabapox. Examples of viruses from the Retroviridae family include, but are not limited to, Coltiviruses such as CTFV and Banna virus, human immunodeficiency viruses such as HIV-1 and HTV-2, murine leukemia virus, simian immunodeficiency virus, feline immunodeficiency virus, human T-cell leukemia viruses 1 and 2, and XMRV. Examples of viruses from the Rhabdoviridae family include, but are not limited to, vesicular stomatitis and rabies. Examples of viruses from the Togaviridae family include, but are not limited to, rubella viruses or alpha viruses such as Chikungunya virus, Eastern equine encephalitis virus, O'nyong'nyong virus, Ross River virus, Semliki Forest virus, Sindbis, Venezuelan equine encephalitis or Western equine encephalitis virus.

In some embodiments, the host is infected with Chikungunya virus. In some embodiments, the host is infected with Ebola virus. In some embodiments, an active compound or Mer TKI as described herein is used in combination with brincidofovir (CMXOOl).

In some embodiments, the host is infected with a non-enveloped virus, sch as, but not limited to, viruses of the following families: Adenoviridae, Arenaviridae, Birnaviridae, Calciviridae, Iridoviridae, Ophioviridae Parvoviradae, Papillomaviridae, Papovaviridae, Picornaviridae, and Reoviridae. Examples of viruses from the Adenoviridae family include, but are not limited to adenoviruses. Examples of viruses from the Arenaviradae family include, but are not limited to, hemorrhagic fever viruses such as Guanarito, LCMV, Lassa, Junin, and Machupo. Examples of viruses from the Iridoviridae family include, but are not limited to, African swine fever virus. Examples of viruses from the Papillomavirus family include, but are not limited to, papillomaviruses. Examples of viruses from the Papovaviridae family include, but are not limited to, polyoma viruses such as BK virus and JC virus. Examples of viruses from the Parvoviridae family include, but are not limited to, parvoviruses such as human bocavirus and adeno-associated virus. Examples of viruses from the Picornaviridae family include, but are not limited to, aptoviruses, cardioviruses, coxsackieviruses, echoviruses, enteric viruses, enteroviruses, foot and mouth disease virus, hepatitis A virus, hepatoviruses, Poliovirus, and rhinovirus. Examples of viruses from the Reoviradae family include, but are not limited to, orbiviruses, reoviruses and rotaviruses.

In some embodiments, a host is infected with a virus such as an astroviruses, caliciviruses including but not limited to, Norovirus and Norwalk, and Hepeviruses including, but not limited to, Hepatitis E.

As described above, a compound described herein can be administered to a host suffering from a viral infection in combination with another anti-viral or anti-infective compound. Antiviral compounds that can be used in combination with the compounds described herein include, but are not limited to, abacavir, acyclovir, adefovir, amantadine, amprenavir, ampligen, arbitol, atazanavir, balavir, boceprevir, boceprevirertet, cidofovir, dolutegravir, darunavir, delavirdine, didanosine, docosanol, edoxudine, efavirenz, emtricitabine, epivir, enfuvirtide, entecavir, famciclovir, fomivirsen, fosamprenavir, foscarnet, fosfonet, ganciclovir, ibacitabine, imunovir, idoxuridine, imiquimod, indinavir, lamivudine, lopinavir, loviride, maraviroc, moroxydine, nelfinavir, nevirapine, nexavir, oseltamivir, penciclovir, peramivir, pleconaril, podophyllotoxin, raltegravir, ribavirin, rilpivirine, rimantadine, pyramidine, saquinavir, simeprevir, sofosbuvir, stavudine, telaprevir, tenofovir, tipranavir, trifluridine, trizivir, tromantadine, traporved, truvada, valaciclovir, valganciclovir, vicriviroc, vidarabine, viramidine, zalcitabine, zanamivir, and zidovudine.

In some embodiments, a host is infected with a human immunodeficiency virus and is administered a compound described herein in combination with the anti-HIV combination drug, such as Atripla® or other drug that includes emtricitabine. In some embodiments, the patient with the human immunodeficiency virus can be treated with atazanavir, ritonavir, or Truvada® in combination with a compound described herein. In some embodiments, the patient infected with human immunodeficiency virus can be treated with the combination of dolutegravir, Truvada® and a compound described herein. In some embodiments, human immunodeficiency virus can be treated with the combination dolutegravir, Epzicom® and a compound described herein. In some embodiments, a host infected with human immunodeficiency virus can be treated with a combination of raltegravir, Truvada® and a compound described herein. In some embodiments, a host infected with human immunodeficiency virus can be treated with the combination of Complera® and a compound described herein. It will be appreciated by one skilled in the art that a host infected with HIV can be treated with a number of combinations of drugs depending on the mutation pattern of the virus. The patient can be treated with an appropriate combination of drugs in combination with a compound described herein.

In some embodiments, the host is infected with a hepatitis C virus and is treated with an anti-hepatitis C drug in addition to the active compound described herein. For example, the patient can be treated with a combination of Sovaldi™, Harvoni®, ribavirin, and/or a pegylated interferon and a compound described herein. In some embodiments the pegylated interferon is Peglntron®. In some embodiments, the pegylated interferon is Pegasys®. In some embodiments, the host infected with hepatitis C virus is treated with Sovaldi™ ribavirin and a compound described herein. In some embodiments, the host infected with hepatitis C virus is treated with Harvoni®, ribavirin and a compound described herein. In some embodiments, a host infected with hepatitis C virus is treated with a combination of Olysio™, ribavirin, a pegylated interferon and a compound described herein. In some embodiments the pegylated interferon is Peglntron®. In some embodiments, the pegylated interferon is Pegasys®. In some embodiments, the host is infected with a hepatitis C virus and is treated with a combination of ABT-267, ABT-333 and ABT-450/ritonavir, in addition to an active compound described herein. In some embodiments, the host is infected with a hepatitis C virus and is treated with a combination of MK-5172 and MK-8742, in addition to an active compound described herein.

In some embodiments, a host infected with hepatitis C genotype 1 is treated with a combination of Sovaldi™, ribavirin, a pegylated interferon and a compound described herein for 12 weeks. In some embodiments, a host infected with hepatitis C genotype 1 is treated with Sovaldi™ and a compound described herein for 12 weeks followed by ribavirin, pegylated interferon and a compound described herein for 24 weeks. In some embodiments, a host infected with hepatitis C genotype 2 is treated with Sovaldi™, ribavirin, and a compound described herein for 12 weeks. In some embodiments, a host infected with hepatitis C genotype 3 is treated with Sovaldi™, ribavirin, and a compound described herein for 24 weeks. In some embodiments, a host infected with hepatitis C genotype 3 is treated with Sovaldi™, ribavirin, pegylated interferon, and a compound described herein for 12 weeks. In some embodiments, a host infected with hepatitis C genotype 4 is treated with Sovaldi™, ribavirin, pegylated interferon, and a compound described herein for 12 weeks. In some embodiments, a host infected with hepatitis C genotype 4 is treated with a combination of Olysio™, and a compound described herein for 12 weeks followed by ribavirin, pegylated interferon and a compound described herein for 24-28 weeks. In some embodiments, a host infected with hepatitis C genotype 5 is treated with Sovaldi™, ribavirin, pegylated interferon, and a compound described herein for 12 weeks. In some embodiments, a host infected with hepatitis C genotype 5 is treated with ribavirin, pegylated interferon, and a compound described herein for 48 weeks. In some embodiments, a host infected with hepatitis C genotype 6 is treated with Sovaldi™, ribavirin, pegylated interferon, and a compound described herein for 12 weeks. In some embodiments, a host infected with hepatitis C genotype 6 is treated with ribavirin, pegylated interferon, and a compound described herein for 48 weeks.

In some embodiments, a host infected with hepatitis C genotype 1 is treated with Sovaldi, Olysio, ribavirin, and a compound described herein for 12 weeks. In some embodiments, a host infected with hepatitis C genotype 1 is treated with Sovaldi™, ribavirin, and a compound described herein for 24 weeks. In some embodiments, a host infected with hepatitis C genotype 2 is treated with Sovaldi™, ribavirin, and a compound described herein for 12 weeks. In some embodiments, a host infected with hepatitis C genotype 3 is treated with Sovaldi™, ribavirin, and a compound described herein for 24 weeks. In some embodiments, a patient infected with hepatitis C genotype 4 is treated with Sovaldi™ ribavirin, and a compound described herein for 24 weeks.

In some embodiments, a host infected with papilloma virus is treated with imiquimod and a compound described herein. In some embodiments, a host infected with papilloma virus is treated with cryotherapy and a compound described herein. In some embodiments, papilloma virus is surgically removed from a host and the host is treated with a compound described herein. In some embodiments, the host receives a compound described herein prior to, during, and post-surgery. In some embodiments, the patient receives a compound described herein post-surgery.

In some embodiments a host infected with herpes simplex type 2 is treated with Famvir® and a compound described herein. In some embodiments a host infected with herpes simplex type 1 is treated with acyclovir and a compound described herein. In some embodiments, a host infected with herpes simplex type 2 is treated with acyclovir and a compound described herein. In some embodiments, a host infected with herpes simplex type 1 is treated with Valtrex® and a compound described herein. In some embodiments, a host infected with herpes simplex type 2 is treated with Valtrex® and a compound described herein. In some embodiments, a host infected with herpes simplex type 1 virus receives a compound described herein for 7 days prior to treatment with acyclovir. In some embodiments, a host infected with herpes simplex type 2 virus receives a compound described herein for 7 days prior to treatment with acyclovir. In some embodiments, a host infected with herpes simplex type 1 virus receives a compound described herein for 7 days prior to treatment with Valtrex®. In some embodiments, a host infected with herpes simplex type 2 virus receives a compound described herein for 7 days prior to treatment with Valtrex®.

In some embodiments a host infected with varicella zoster virus, VZV, is treated with acyclovir and a compound described herein. In some embodiments a host infected with varicella zoster virus, VZV, is treated with Valtrex® and a compound described herein. In some embodiments a host infected with varicella zoster virus, VZV, is treated with famciclovir and a compound described herein. In some embodiments a host infected with varicella zoster virus, VZV, is treated with foscarnet and a compound described herein. In some embodiments, a host infected with varicella zoster virus is treated with a compound described herein prior to vaccination with Zostavax®. In some embodiments, a host infected with varicella zoster virus is treated with a compound described herein prior to and post vaccination with Zostavax®.

In some embodiments a host infected with influenza virus is treated with Relenza® and a compound described herein. In some embodiments a host infected with influenza virus is treated with Tamiflu® and a compound described herein. In some embodiments a host is infected with influenza virus and is treated with amantadine and a compound described herein. In some embodiments, a host infected with influenza virus is treated with rimantadine and a compound described herein.

In some embodiments, a host infected with cytomegalovirus is treated with valganciclovir and a compound described herein. In some embodiments, a host infected with cytomegalovirus is treated with ganciclovir and a compound described herein. In some embodiments, a host infected with cytomegalovirus is treated with foscarnet and a compound described herein. In some embodiments, a host infected with cytomegalovirus is treated with cidofovir and a compound described herein.

In some embodiments, a host infected with hepatitis B virus is treated with lamivudine and a compound described herein. In some embodiments, a host infected with hepatitis B virus is treated with adefovir and a compound described herein.

In some embodiments, a host infected with hepatitis B virus is treated with tenofovir and a compound described herein. In some embodiments, a host infected with hepatitis B virus is treated with telbivudine and a compound described herein.

(v) Bacterial Infections

In some embodiments, a disclosed compound or composition is used in an effective amount to treat a host infected with a bacterial infection. In some embodiments, the bacteria treated is, for example, a Gram-negative bacilli (GNB), especially *Escherichia coli*, Gram-positive cocci (GPC), *Staphylococcus aureus, Enterococcus faecalis*, or *Streptococcus pneumoniae*. In some embodiments, the bacterial infection may be caused, for example, by a Gram-negative bacteria, including, but not limited to *Escherichia coli, Salmonella*, and other Enterobacteriaceae, *Pseudomonas, Moraxella, Helicobacter, Stenotrophomonas, Bdellovibrio*, acetic acid bacteria, *Legionella, Staphylococcus aureus, Hemophilus influenzae, Klebsiella pneumoniae, Legionella pneumophila, Pseudomonas aeruginosa, Vibrio cholerae, Proteus mirabilis, Enterobacter cloacae, Serratia marcescens, Clostridium tetani, Helicobacter pylori, Salmonella enteritidis, Salmonella typhi, Shigella flexneri*, or *Acinetobacter baumanii*. In some embodiments, the bacterial infection may be caused, for example, by a Gram-positive species from the following genera: *Bacillus, Listeria, Staphylococcus, Enterococcus, Lactobacillus, Lactococcus, Leuconostoc, Pediococcus, Streptococcus, Acetobacterium, Clostridium, Eubacterium, Heliobacterium, Heliospirillum, Megasphaera, Pectinatus, Selenomonas, Zymophilus, Sporomusa, Mycoplasma, Spiroplasma, Ureaplasma*, or *Erysipelothrix*.

In some embodiments, the bacterial infection is associated with liver failure. In some embodiments, an active compound disclosed herein is administered in combination with an antibiotic or another anti-bacterial agent.

In some embodiments, the bacterial infection is associated with liver failure. In some embodiments, an active compound disclosed herein is administered in combination with an antibiotic or another anti-bacterial agent.

In some embodiments, a patient is suffering from acute-on-chronic liver failure (ACLF). In some embodiments, a patient is suffering from acute liver failure. In some embodiments, a patient is suffering from chronic liver failure. In some embodiments, the liver failure is caused by a disease or condition selected from alcoholic liver disease, chronic viral hepatitis type C, chronic viral hepatitis type B, chronic bile duct blockage, Wilson's disease, hemochromatosis, exposure to drug and toxins, autoimmune hepatitis, cystic fibrosis, alpha antitrypsin deficiency, obesity or schistosomiasis. In some embodiments, the fibrosis is a liver fibrosis.

In some embodiments, an active compound disclosed herein is administered in combination with an antibiotic for the prevention or treatment of bacterial infections. Examples of antibiotics include, but are not limited to, cefotaxime (Claforan), ofloxacin (Floxin), norfloxacin (Noroxin) or trimethoprim sulfamethoxazole (Bactrim, Septra).

d. Use as an Anti-Platelet Agent

In some embodiments, a compound described herein is used in the treatment of blot clot (thrombus) formation in a host in need thereof. In some embodiments, the host is suffering from coronary artery disease, peripheral vascular disease, or cerebrovascular disease. In some embodiments, a compound described herein is administered to a host prior to any medical or surgical procedure in which diminished coagulation potential is desirable. In some embodiments, an active compound disclosed herein is administered in combination with another anti-thrombotic or anti-clotting agent.

In some embodiments, a disclosed compound or composition as described herein, is provided for use in treating blot clot (thrombus) formation in a subject in need thereof, comprising administering an active compound as described herein, or a pharmaceutically acceptable composition, salt, isotopic analog, or prodrug thereof.

In some embodiments, the treatment of blood clot formation is in, for example, a subject with coronary artery disease, peripheral vascular disease, or cerebrovascular disease, or the treatment is given prior to any medical or surgical procedure in which diminished coagulation potential is desirable. Coronary artery disease includes, for example, any coronary dysfunction (pathological state) resulting from coronary artherosclerosis, i.e. partial or total occlusion of coronary vessels. The term also includes a range of various acute and chronical pathological states comprising stable and unstable angina pectoris (SAP and UAP, respectively), left ventricular dysfunction LVD, (congestive) heart failure CHF, myocardial death. Peripheral vascular disease includes, for example, occlusive or functional peripheral arterial disease (PAD). Examples of occlusive PAD include peripheral arterial occlusion, which may be acute, and Buerger's disease (thomboangiitis obliterans). Examples of functional PAD include Raynaud's disease, Raynaud's phenomenon, and acrocyanosis. Cerebrovascular disease includes, for example, any abnormality of the brain resulting from a pathologic process of a blood vessel. In some embodiments, the cerebrovascular disease is selected from cerebral ischemia, cerebral hemorrhage, ischemic stroke, hemorrhagic stroke, or ischemic reperfusion injury resulting from reintroduction of blood flow following cerebral ischemia or ischemic stroke. In further embodiments, the medical or surgical procedure is pulmonary vein ablation.

In some embodiments, the treatment of blood clot formation is in a host having thrombi in blood vessels from pathologies or treatments including, for example, myocardial infarction, unstable angina, atrial fibrillation, stroke, renal damage, percutaneous translumenal coronary angioplasty, athreosclerosis, disseminated intravascular coagulation, sepsis, endotoxemia (i.e., the presence of endotoxins in the blood); pulmonary embolism and deep vein thrombosis. In some embodiments, the compounds described herein are administered to a host having blood clots on the surfaces of artificial organs, shunts and prostheses (for example, artificial heart valves that are implanted into a patient), and in patients that have received an intracoronary stent. In some embodiments, a host is administered an effective amount of a compound described herein due to the formation of clots resulting from some pathological conditions (for example, genetic mutation of VWF cleaving protease, ADAMT13), which may cause spontaneous binding of VWF to platelets resulting in formation of microthrombi in blood vessels leading to thrombotic thrombocytopenic purpura and other microangiopathy. Microangiopathy is a disease of blood vessels in which the walls of very small blood vessels (capillaries) become so thick and weak that they bleed, leak protein, and slow the flow of blood. In some embodiments, the treatment is in a patient with hemolytic uremic syndrome.

In some embodiments, an active compound disclosed herein is administered in combination with an additional anti-platelet agent. Examples of anti-platelet agents include, but are not limited to, aspirin, tirofiban (Aggrastat), Aggrenox, Agrylin, triflusal (Disgren), Flolan, eptifibatide (Integrilin), dipyridamole (Presantine), cilostazol (Pletal), abciximab (ReoPro), and Terutroban. In some embodiments, the Mer TKI and the additional anti-platelet agent act synergistically. In some embodiments, the use of a Mer TKI in combination with an additional anti-platelet agent provides for increased anti-thrombotic or anti-clotting effects without an increase in the standard of care dosage.

In some embodiments, the additional anti-platelet agent is an adenosine diphosphate (ADP) receptor inhibitor. Examples of ADP receptor inhibitors include, but are not limited to, clopidogrel (Plavix), prasugrel (Effient), ticagrelor (Brilinta), ticlopidine (Ticlid), N6-methyl-2'-deoxyadenosine-3',5'-bisphosphate (MRS2179; $P_2Y1$ inhibitor), and 2-methylthioadenosine 5'-monophosphate triethylammonium salt (2-Me-SAMP; $P_2Y12$ inhibitor).

In some embodiments, an active compound disclosed herein is administered in combination with multiple anti-platelet agents. In some embodiments, an active compound disclosed herein is administered in combination with N6-methyl-2'-deoxyadenosine-3',5'-bisphosphate and 2-methylthioadenosine 5'-monophosphate triethylammonium salt.

In some embodiments, an active compound disclosed herein is administered in combination with an anti-coagulant. In some embodiments, the anti-coagulant is a heparin composition. In some embodiments, the heparin composition is a low molecular weight heparin composition. Low molecular weight heparin compositions are well known to those of skill in the art and include, but are not limited to, tinzaparin, certoparin, pamaparin, nadroparin, ardeparin, enoxaparin, reviparin, dalteparin, and fraxiparin. Additional examples of anticoagulants include, but are not limited to, warfarin (Coumadin), Fragmin, Hep-Lock, Lovenox, and Miradon.

e. Use as Nanoparticle Compositions or Carriers

In some embodiments, an effective amount of an active compound as described herein is incorporated into nanoparticles, e.g. for convenience of delivery and/or extended release delivery. The use of materials in nanoscale provides one the ability to modify fundamental physical properties such as solubility, diffusivity, blood circulation half-life, drug release characteristics, and immunogenicity. In the last two decades, a number of nanoparticle-based therapeutic and diagnostic agents have been developed for the treatment of cancer, diabetes, pain, asthma, allergy, and infections. These nanoscale agents can provide more effective and/or more convenient routes of administration, lower therapeutic toxicity, extend the product life cycle, and ultimately reduce health-care costs. As therapeutic delivery systems, nanoparticles allow targeted delivery and controlled release.

In addition, nanoparticle-based drug delivery can be used to release drugs at a sustained rate and thus lower the frequency of administration, deliver drugs in a target manner to minimize systemic side effects, or deliver two or more drugs simultaneously for combination therapy to generate a synergistic effect and suppress drug resistance. To date, a number of nanotechnology-based therapeutic products have been approved for clinical use. Among these products, liposomal drugs and polymer-based conjugates account for more than 80% of the products. See, Zhang, L., et al., Nanoparticles in Medicine: Therapeutic Applications and Developments, Clin. Pharm. and Ther., 83(5):761-769, 2008.

Optimal solid lipid nanoparticles (SLN) can be produced in a controlled fashion when a fraction of lipid in the crystalline alpha form can be created and preserved. By doing this, the SLN carrier has a built in trigger mechanism as lipids transform from the alpha to beta form and consequently control drug release. Drug release profiles can be modified according to the composition of the lipid matrix, surfactant concentration and production parameters. See, Muller, R. H., et al., Solid lipid nanoparticles (SLN) for controlled drug delivery—a review of the state of the art, Eur. H. Pharm. Biopharm., 50:161-177, 2000. Consien et al. have recently disclosed lipid nanoparticles having novel amino-lipids that form lipid nanoparticles and their use for the intracellular delivery of biologically active compounds, e.g., nucleic acids. See, U.S. Pat. No. 8,691,750 to Consien et al.

In regard to controlled release, Kanwar has recently disclosed alginate adsorbed chitosan adsorbed lactoferrin adsorbed calcium phosphate nanoparticles and the controlled release of lactoferrin from the nanoparticles. See, WO 2012/145801 to Kanwar. In addition, Armes et al. have recently disclosed polymer-templated core-shell nanoparticles adapted to facilitate controlled release of at least one active agent into a system in response to controlled changes in the pH of the system. See, U.S. Pat. No. 8,580,311 to Armes, S. et al. incorporated by reference herein.

Petros and DeSimone have recently reviewed strategies in the design of nanoparticles. In addition, the authors reviewed their PRINT (particle replication in non-wetting templates) technology for generating microparticles and nanoparticles. See, Petros, R. A. and DeSimone, I. M., Strategies in the design of nanoparticles for therapeutic applications, Nature Reviews/Drug Discovery, vol. 9:615-627, 2010. Importantly, the authors disclosed the production of nanoparticles in which a single parameter (shape or size) can be altered independently of all other particle attributes. The authors concluded their paper by outlining several particle characteristics that have emerged as being central to the function of engineered nanoparticles. These parameters include particle size, particle shape, surface characteristics and the ability to release therapeutics. Additional nanoparticle fabrication methods can also be found in U.S. Pat. Nos. 8,465,775, 8,444,899, 8,420,124, 8,263,129, 8,158,728 and 8,268,446 all hereby incorporated by reference.

Nanoparticles may be prepared using a wide variety of methods known in the art. For example, nanoparticles can be formed by methods as nanoprecipitation, flow focusing fluidic channels, spray drying, single and double emulsion solvent evaporation, solvent extraction, phase separation, milling, microemulsion procedures, microfabrication, nanofabrication, sacrificial layers, simple and complex coacervation, and other methods well known to those of ordinary skill in the art. Alternatively or additionally, aqueous and organic solvent syntheses for monodisperse semiconductor, conductive, magnetic, organic, and other nanomaterials have been described (Pellegrino et al., 2005, Small, 1:48; Murray et al., 2000, Ann. Rev. Mat. Sci., 30:545; and Trindade et al., 2001, Chem. Mat., 13:3843). Additional methods have been described in the literature (see, e.g., Doubrow, Ed., "Microcapsules and Nanoparticles in Medicine and Pharmacy," CRC Press, Boca Raton, 1992; Mathiowitz et al., 1987, J. Control. Release, 5:13; Mathiowitz et al., 1987, Reactive Polymers, 6:275; and Mathiowitz et al., 1988, J. Appl. Polymer Sci., 35:755; U.S. Pat. Nos. 5,578,325 and 6,007, 845; P. Paolicelli et al., "Surface-modified PLGA-based Nanoparticles that can Efficiently Associate and Deliver Virus-like Particles" Nanomedicine. 5(6):843-853 (2010)). In some embodiments, the compounds described herein are associated with a nanoparticle, such as a polymeric nanoparticle. Nanoparticles may comprise natural polymers, including but not limited to chitosan, alginate, dextran, gelatin, and albumin, and synthetic polymers such as, but not limited to, poly(lactide-co-glycolide) (PLGA), (3-hydroxybutyrate-co-3-hydroxyvalerate) (PHBV), poly(sebacic anhydride), poly(e-caprolactone), polystyrene, thermoresponsive (i.e., NIPAAm and CMCTS-g-PDEA) and pH-responsive (i.e., Eudragit LI 00, Eudragit S and AQOAT AS-MG) polymers.

In some embodiments, the polymeric particle is between about 0.1 nm to about 10000 nm, between about 1 nm to about 1000 nm, between about 10 nm and 1000 nm, between about 100 nm and 800 nm, between about 400 nm and 600 nm, or about 500 nm. In some embodiments, the microparticles are about 0.1 nm, 0.5 nm, 1.0 nm, 5.0 nm, 10 nm, 25 nm, 50 nm, 75 nm, 100 nm, 150 nm, 200 nm, 250 nm, 300 nm, 400 nm, 450 nm, 500 nm, 550 nm, 600 nm, 650 nm, 700 nm, 750 nm, 800 nm, 850 nm, 900 nm, 950 nm, 1000 nm, 1250 nm, 1500 nm, 1750 nm, or 2000 nm. In some embodiments, the compounds described herein are covalently coupled to a polystyrene particle, PLGA particle, PLA particle, or other nanoparticle.

In some embodiments, the nanoparticle can be solid or hollow and can comprise one or more layers. In some embodiments, each layer has a unique composition and unique properties relative to the other layer(s). To give but one example, the nanoparticle may have a core/shell structure, wherein the core is one layer (e.g. a polymeric core) and the shell is a second layer (e.g. a lipid bilayer or monolayer). In some embodiments, the nanoparticle may comprise a plurality of different layers. In some embodiments, the compounds described herein can be incorporated into or surrounded by one or more layers.

In some embodiments, the nanoparticles comprising the compounds described herein may optionally comprise one or more lipids. In some embodiments, a nanoparticle may comprise a liposome. In some embodiments, a nanoparticle may comprise a lipid bilayer. In some embodiments, a nanoparticle may comprise a lipid monolayer. In some embodiments, a nanoparticle may comprise a micelle. In some embodiments, a nanoparticle may comprise a core comprising a polymeric matrix surrounded by a lipid layer (e.g., lipid bilayer, lipid monolayer, etc.). In some embodiments, a nanoparticle may comprise a non-polymeric core (e.g., metal particle, quantum dot, ceramic particle, bone particle, viral particle, proteins, nucleic acids, carbohydrates, etc.) surrounded by a lipid layer (e.g., lipid bilayer, lipid monolayer, etc.).

In other embodiments, the nanoparticle may comprise metal particles, quantum dots, ceramic particles, etc. In some embodiments, a non-polymeric nanoparticle is an aggregate of non-polymeric components, such as an aggregate of metal atoms (e.g., gold atoms).

In some embodiments, nanoparticles may optionally comprise one or more amphiphilic entities. In some embodiments, an amphophilic entity can promote the production of nanoparticles with increased stability, improved uniformity, or increased viscosity. In some embodiments, amphiphilic entities can be associated with the interior surface of a lipid membrane (e.g., lipid bilayer, lipid monolayer, etc.). Many amphiphilic entities known in the art are suitable for use in making nanoparticles useful in the presently described subject matter. Such amphiphilic entities include, but are not limited to, phosphoglycerides; phosphatidylcholines; dipalmitoyl phosphatidylcholine (DPPC); dioleylphosphatidyl ethanolamine (DOPE); dioleyloxypropyltriethylammonium (DOTMA); dioleoylphosphatidylcholine; cholesterol; cholesterol ester; diacylglycerol; diacylglycerolsuccinate; diphosphatidyl glycerol (DPPG); hexanedecanol; fatty alcohols such as polyethylene glycol (PEG); polyoxyethylene-9-lauryl ether; a surface active fatty acid, such as palmitic acid or oleic acid; fatty acids; fatty acid monoglycerides; fatty acid diglycerides; fatty acid amides; sorbitan trioleate (Span®85) glycocholate; sorbitan monolaurate (Span®20); polysorbate 20 (Tween®20); polysorbate 60 (Tween®60); polysorbate 65 (Tween®65); polysorbate 80 (Tween®80); polysorbate 85 (Tween®85); polyoxyethylene monostearate; surfactin; a poloxomer; a sorbitan fatty acid ester such as sorbitan trioleate; lecithin; lysolecithin; phosphatidylserine; phosphatidylinositol; sphingomyelin; phosphatidylethanolamine (cephalin); cardiolipin; phosphatide acid; cerebrosides; dicetylphosphate; dipalmitoylphosphatidylglycerol; stearylamine; dodecylamine; hexadecyl-amine; acetyl palmitate; glycerol ricinoleate; hexadecyl sterate; isopropyl myristate; tyloxapol; poly(ethylene glycol)5000-phosphatidylethanolamine; poly(ethylene glycol)400-monostearate; phospholipids; synthetic and/or natural detergents having high surfactant properties; deoxycholates; cyclodextrins; chaotropic salts; ion pairing agents; and combinations thereof. An amphophilic entity component may be a mixture of different amphophilic entities. Those skilled in the art will recognize that this is an exemplary, not comprehensive, list of substances with surfactant activity. Any amphiphilic entity may be used in the production of nanoparticles to be used in accordance with the presently described subject matter.

In some embodiments, a nanoparticle may optionally comprise one or more carbohydrates. Carbohydrates may be natural or synthetic. A carbohydrate may be a derivatized natural carbohydrate. In certain embodiments, a carbohydrate comprises monosaccharide or disaccharide, including but not limited to glucose, fructose, galactose, ribose, lactose, sucrose, maltose, trehalose, cellbiose, mannose, xylose, arabinose, glucoronic acid, galactoronic acid, mannuronic acid, glucosamine, galatosamine, and neuramic acid. In certain embodiments, a carbohydrate is a polysaccharide, including but not limited to pullulan, cellulose, microcrystalline cellulose, hydroxypropyl methylcellulose (HPMC), hydroxycellulose (HC), methylcellulose (C), dextran, cyclodextran, glycogen, hydroxyethyl starch, carageenan, glycon, amylose, chitosan, N,O-carboxylmethylchitosan, algin and alginic acid, starch, chitin, inulin, konjac, glucommannan, pustulan, heparin, hyaluronic acid, curdlan, and xanthan. In some embodiments, the nanoparticle does not comprise (or specifically exclude) carbohydrates, such as a polysaccharide. In certain embodiments, the carbohydrate may comprise a carbohydrate derivative such as a sugar alcohol, including but not limited to mannitol, sorbitol, xylitol, erythritol, maltitol, and -lactitol.

In some embodiments, the associated nanoparticle can comprise one or more polymers. In some embodiments, the nanoparticle comprises one or more polymers that are a non-methoxy-terminated, pluronic polymer. In some embodiments, at least 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, 97%, or 99% (weight/weight) of the polymers that make up the nanoparticles are non-methoxy-terminated, pluronic polymers. In some embodiments, all of the polymers that make up the nanoparticle are non-methoxy-terminated, pluronic polymers. In some embodiments, the nanoparticle comprises one or more polymers that are a non-methoxy-terminated polymer. In some embodiments, at least 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, 97%, or 99% (weight/weight) of the polymers that make up the nanoparticles are non-methoxy-terminated polymers. In some embodiments, all of the polymers that make up the nanoparticle are non-methoxy-terminated polymers. In some embodiments, the nanoparticle comprises one or more polymers that do not comprise pluronic polymer. In some embodiments, at least 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, 97%, or 99% (weight/weight) of the polymers that make up the nanoparticle do not comprise pluronic polymer. In some embodiments, all of the polymers that make up the nanoparticles do not comprise pluronic polymer. In some embodiments, such a polymer can be surrounded by a coating layer (e.g., liposome, lipid monolayer, micelle, etc.). In some embodiments, various elements of the nanoparticle can be coupled with the polymer.

Other examples of polymers include, but are not limited to polyethylenes, polycarbonates (e.g. poly(1,3-dioxan-2one)), polyanhydrides (e.g. poly(sebacic anhydride)), polypropylfumerates, polyamides (e.g. polycaprolactam), polyacetals, polyethers, polyesters (e.g., polylactide, polyglycolide, polylactide-co-glycolide, polycaprolactone, polyhydroxyacid (e.g. poly((P-hydroxyalkanoate))), poly(orthoesters), polycyanoacrylates, polyvinyl alcohols, polyurethanes, polyphosphazenes, polyacrylates, polymethacrylates, polyureas, polystyrenes, and polyamines, polylysine, polylysine-PEG copolymers, and poly(ethyleneimine), poly(ethylene imine)-PEG copolymers.

In some embodiments, nanoparticles include polymers which have been approved for use in humans by the U.S. Food and Drug Administration (FDA) under 21 C.F.R. § 177.2600, including but not limited to polyesters (e.g., polylactic acid, poly(lactic-co-glycolic acid), polycaprolactone, polyvalerolactone, poly(1,3-dioxan-2one)); polyanhydrides (e.g., poly(sebacic anhydride)); polyethers (e.g., polyethylene glycol); polyurethanes; polymethacrylates; polyacrylates; and polycyanoacrylates.

In some embodiments, polymers can be hydrophilic. For example, polymers may comprise anionic groups (e.g., phosphate group, sulphate group, carboxylate group); cationic groups (e.g., quaternary amine group); or polar groups (e.g., hydroxyl group, thiol group, amine group). In some embodiments, a nanoparticles comprising a hydrophilic polymeric matrix generates a hydrophilic environment within the nanoparticle. In some embodiments, polymers can be hydrophobic. In some embodiments, a nanoparticles comprising a hydrophobic polymeric matrix generates a hydrophobic environment within the nanoparticle. Selection of the hydrophilicity or hydrophobicity of the polymer may have an impact on the nature of materials that are incorporated (e.g., coupled) within the nanoparticle.

In some embodiments, polymers may be modified with one or more moieties and/or functional groups. A variety of moieties or functional groups can be used in accordance with the presently described subject matter. In some embodiments, polymers may be modified with polyethylene glycol (PEG), with a carbohydrate, and/or with acyclic polyacetals derived from polysaccharides (Papisov, 2001, ACS Symposium Series, 786:301). Certain embodiments may be made using the general teachings of U.S. Pat. No. 5,543,158 to Gref et al., or WO publication WO2009/051837 by Von Andrian et al.

In some embodiments, polymers may be modified with a lipid or fatty acid group. In some embodiments, a fatty acid group may be one or more of butyric, caproic, caprylic, capric, lauric, myristic, palmitic, stearic, arachidic, behenic, or lignoceric acid. In some embodiments, a fatty acid group may be one or more of palmitoleic, oleic, vaccenic, linoleic, alpha-linoleic, gamma-linoleic, arachidonic, gadoleic, arachidonic, eicosapentaenoic, docosahexaenoic, or erucic acid.

In some embodiments, polymers may be one or more acrylic polymers. In certain embodiments, acrylic polymers include, for example, acrylic acid and methacrylic acid copolymers, methyl methacrylate copolymers, ethoxyethyl methacrylates, cyanoethyl methacrylate, aminoalkyl methacrylate copolymer, poly(acrylic acid), poly(methacrylic acid), methacrylic acid alkylamide copolymer, poly(methyl methacrylate), poly(methacrylic acid anhydride), methyl methacrylate, polymethacrylate, poly(methyl methacrylate) copolymer, polyacrylamide, aminoalkyl methacrylate copolymer, glycidyl methacrylate copolymers, polycyanoacrylates, and combinations comprising one or more of the foregoing polymers. The acrylic polymer may comprise fully-polymerized copolymers of acrylic and methacrylic acid esters with a low content of quaternary ammonium groups.

In some embodiments, polymers can be cationic polymers. In general, cationic polymers are able to condense and/or protect negatively charged strands of nucleic acids (e.g. DNA, or derivatives thereof). Amine-containing polymers such as poly(lysine) (Zauner et al., 1998, Adv. Drug Del. Rev., 30:97; and Kabanov et al., 1995, Bioconjugate Chem., 6:7), polyethylene imine) (PEI; Boussif et al., 1995, Proc. Natl. Acad. Sci., USA, 1995, 92:7297), and poly(amidoamine) dendrimers (Kukowska-Latallo et al., 1996, Proc. Natl. Acad. Sci., USA, 93:4897; Tang et al., 1996, Bioconjugate Chem., 7:703; and Haensler et al., 1993, Bioconjugate Chem., 4:372) are positively-charged at physiological pH, form ion pairs with nucleic acids, and mediate transfection in a variety of cell lines. In embodiments, the nanoparticles may not comprise (or may exclude) cationic polymers.

In some embodiments, polymers can be degradable polyesters bearing cationic side chains (Putnam et al., 1999, acromolecules, 32:3658; Barrera et al., 1993, J. Am. Chem. Soc, 115:11010; Kwon et al., 1989, Macromolecules, 22:3250; Lim et al., 1999, J. Am. Chem. Soc, 121:5633; and Zhou et al., 1990, Macromolecules, 23:3399). Examples of these polyesters include poly(L-lactide-co-L-lysine) (Barrera et al., 1993, J. Am. Chem. Soc, 115:11010), poly(serine ester) (Zhou et al., 1990, Macromolecules, 23:3399), poly (4-hydroxy-L-proline ester) (Putnam et al., 1999, Macromolecules, 32:3658; and Lim et al., 1999, J. Am. Chem. Soc, 121:5633), and poly(4-hydroxy-L-proline ester) (Putnam et al., 1999, Macromolecules, 32:3658; and Lim et al., 1999, J. Am. Chem. Soc, 121:5633).

The properties of these and other polymers and methods for preparing them are well known in the art (see, for example, U.S. Pat. Nos. 6,123,727; 5,804,178; 5,770,417; 5,736,372; 5,716,404; 6,095,148; 5,837,752; 5,902,599; 5,696,175; 5,514,378; 5,512,600; 5,399,665; 5,019,379; 5,010,167; 4,806,621; 4,638,045; and 4,946,929; Wang et al., 2001, J. Am. Chem. Soc, 123:9480; Lim et al., 2001, J. Am. Chem. Soc, 123:2460; Langer, 2000, Acc. Chem. Res., 33:94; Langer, 1999, J. Control. Release, 62:7; and Uhrich et al., 1999, Chem. Rev., 99:3181). More generally, a variety of methods for synthesizing certain suitable polymers are described in Concise Encyclopedia of Polymer Science and Polymeric Amines and Ammonium Salts, Ed. by Goethals, Pergamon Press, 1980; Principles of Polymerization by Odian, John Wiley & Sons, Fourth Edition, 2004; Contemporary Polymer Chemistry by Allcock et al., Prentice-Hall, 1981; Deming et al., 1997, Nature, 390:386; and in U.S. Pat. Nos. 6,506,577, 6,632,922, 6,686,446, and 6,818,732.

Polymers can be linear or branched polymers. In some embodiments, polymers can be dendrimers. In some embodiments, polymers can be substantially cross-linked to one another. In some embodiments, polymers can be substantially free of cross-links. In some embodiments, polymers can be used without undergoing a cross-linking step. It is further to be understood that a nanoparticle may comprise block copolymers, graft copolymers, blends, mixtures, and/or adducts of any of the foregoing and other polymers. Those skilled in the art will recognize that the polymers listed herein represent an exemplary, not comprehensive, list of polymers that can be of use in accordance with the presently described subject matter.

The compounds of the presently described subject matter can be coupled to a nanoparticle by any of a number of methods. Generally, the coupling can be a result of bonding between the compound and the nanoparticle. This bonding can result in the compound being attached to the surface of the nanoparticle and/or contained within (encapsulated) the nanoparticle. In some embodiments, however, the compounds are encapsulated by the nanoparticle as a result of the structure of the nanoparticle rather than bonding to the nanoparticle. In some embodiments, the nanoparticle comprises a polymer as provided herein, and the compounds described herein are coupled to the nanoparticle. The compounds described herein may be encapsulated into nanoparticles as desirable using a variety of methods including but not limited to C. Astete et al., "Synthesis and characterization of PLGA nanoparticles" J. Biomater. Sci. Polymer Edn, Vol. 17, No. 3, pp. 247-289 (2006); K. Avgoustakis "Pegylated Poly(Lactide) and Poly(Lactide-Co-Glycolide) Nanoparticles: Preparation, Properties and Possible Applications in Drug Delivery" Current Drug Delivery 1:321-333 (2004); C. Reis et al., "Nanoencapsulation I. Methods for preparation of drug-loaded polymeric nanoparticles" Nanomedicine 2:8-21 (2006); P. Paolicelli et al., "Surface-modified PLGA-based Nanoparticles that can Efficiently Associate and Deliver Virus-like Particles" Nanomedicine. 5(6):843-853 (2010). Other methods suitable for encapsulating the compounds described herein may be used, including without limitation methods disclosed in U.S. Pat. No. 6,632,671 to Unger Oct. 14, 2003.

In certain embodiments, nanoparticles are prepared by a nanoprecipitation process or spray drying. Conditions used in preparing nanoparticles may be altered to yield particles of a desired size or property (e.g., hydrophobicity, hydrophilicity, external morphology, "stickiness," shape, etc.). The method of preparing the nanoparticles and the conditions (e.g., solvent, temperature, concentration, air flow rate, etc.) used may depend on the materials to be coupled to the nanoparticles and/or the composition of the polymer matrix. If particles prepared by any of the above methods have a size range outside of the desired range, particles can be sized, for example, using a sieve.

In some embodiments of the presently described subject matter, PRINT technology is used to manufacture nanoparticles comprising a compound described herein.

In some embodiments, provided herein are liposome based nanoparticles comprising a compound described herein. In some embodiments, a liposome based nanoparticle comprises a compound described herein formulated for controlled-release.

In some embodiments, provided herein are polymer based nanoparticles comprising a compound described herein. In some embodiments, provided herein are polymer based nanoparticles comprising a compound described herein formulated for controlled-release.

In some embodiments, nanoparticles are comprised of albumin and a compound described herein. In some embodiments, nanoparticles are comprised of a polysaccharide and a compound described herein. In some embodiments, nanoparticles are comprised of a metal and a compound described herein. In some embodiments, nanoparticles are comprised of gold and a compound described herein. In some embodiments, nanoparticles are comprised of iron oxide and a compound described herein. In some embodiments, nanoparticles are comprised of silicon and a compound described herein.

In regard to polymers used for the production of nanoparticles, several reviews are available. See, for example, Soppimath, S., et al., Biodegradable polymeric nanoparticles as drug delivery devices, J. Controlled Release, 70:1-20, 2001, Agnihotri, S. A., et al., Recent advances on chitosan-based micro- and nanoparticle delivery, J. Controlled Release, 100(1):5-28, 2004, Ganta, S, et al., A review of stimuli-responsive nanocarriers for drug and gene delivery, J. Controlled Release, 126(3): 187-204, 2008, Danhier, F. et al., PLGA-based nanoparticles: An overview of biomedical applications, J. Controlled Release, 161(2):505-522, 2012, In some embodiments, nanoparticles are comprised of L-glutamic acid copolymers and a compound described herein. In some embodiments, nanoparticles are comprised of L-alanine copolymers and a compound described herein. In some embodiments, nanoparticles are comprised of L-lysine copolymers and a compound described herein. In some embodiments, nanoparticles are comprised of L-tyrosine copolymers and a compound described herein. In other embodiments, nanoparticles are comprised of poly(lactic-co-glycolic acid) and a compound described herein. In some embodiments, nanoparticles are comprised of methoxy-PEG-poly(D,L-lactide) and a compound described herein. In some embodiments, nanoparticles are comprised of HPMA copolymer and a compound described herein. In some embodiments, nanoparticles are comprised of polycyclodextran and a compound described herein. In some embodiments, nanoparticles are comprised of polyglutamate and a compound described herein. In some embodiments, nanoparticles are comprised of poly(iso-hexyl-cyanoacrylate) and a compound described herein. In some embodiments, nanoparticles are comprised of poly-L-lysine and a compound described herein. In some embodiments, nanoparticles are comprised of PEG and a compound described herein. In some embodiments, nanoparticles are made of combinations of polymers and a compound described herein.

In some embodiments, a compound described herein is released from a nanoparticle over a period of between about 1 and about 90 days. In some embodiments, the compound is released over a period of about 3 to 28 days. In some embodiments, the compound is released over a period of about 5 to 21 days.

2. Methods of Treating a Disorder

In some embodiments, disclosed are methods for the treatment of a disorder associated with one or both of Mer and Tyro3 tyrosine kinase in a subject, the method comprising the step of administering to the subject an effective amount of at least one disclosed compound, thereby treating the disorder. In some embodiments, the disorder is associated with Mer tyrosine kinase.

Also disclosed are methods of treating a tumor in a subject, the method comprising administering to the subject an effective amount of a disclosed compound or composition. In some embodiments, the subject has been diagnosed with a need for treatment of the tumor prior to the administering step. In further embodiments, the method further comprises the step of identifying a subject in need of treatment of the tumor.

In some embodiments, the tumor is MerTK +/+. In other embodiments, the tumor is MerTK −/−.

Also disclosed are methods of treating a cancer in a subject, the method comprising administering to the subject an effective amount of a disclosed compound or composition. In some embodiments, the subject has been diagnosed with a need for treatment of the cancer prior to the administering step. In some embodiments, the method further comprises the step of identifying a subject in need of treatment of the cancer.

In some embodiments, the cancer is MerTK +/+. In some embodiments, the cancer is MerTK −/−.

Also disclosed are methods of treating an immunosuppressed microenvironment surrounding diseased tissue in a subject, the method comprising administering to the subject an effective amount of a disclosed compound or composition. In some embodiments, the subject has been diagnosed with a need for treatment of the immunosuppressed microenvironment prior to the administering step. In some embodiments, the method further comprises the step of identifying a subject in need of treatment of the immunosuppressed microenvironment.

Also disclosed are methods of treating a thrombotic disorder in a subject, the method comprising administering to the subject an effective amount of a disclosed compound or composition. In some embodiments, the subject has been diagnosed with a need for anti-thrombotic therapy prior to the administering step. In some embodiments, the method further comprises the step of identifying a subject in need of anti-thrombotic therapy.

In some embodiments, the subject is a mammal. In some embodiments, the mammal is a human.

In some embodiments, the subject has been diagnosed with a need for treatment of the disorder prior to the administering step. In some embodiments, the method further comprises the step of identifying a subject in need of treatment of the disorder.

In some embodiments, the subject has been diagnosed with a need for treatment of an immunosuppressed microenvironment surrounding diseased tissue. In some embodiments, the method further comprises the step of identifying a subject in need of treatment of an immunosuppressed microenvironment surrounding diseased tissue.

In some embodiments, the effective amount is a therapeutically effective amount. In some embodiments, the effective amount is a prophylactically effective amount.

In some embodiments, the disorder is a cancer, an infection, a fibrosis, a thrombotic disorder, or a clotting disorder.

In some embodiments, the disorder is an infection. In some embodiments, the infection is a bacterial infection. In some embodiments, the infection is a viral infection. In further embodiments, the viral infection has a virion envelope phosphatidyl serine.

In some embodiments, the disorder is associated with an immunosuppressed microenvironment surrounding diseased tissue.

In some embodiments, the disorder is a disorder of uncontrolled cellular proliferation. In some embodiments, the disorder of uncontrolled cellular proliferation is cancer. In some embodiments, the cancer is selected from breast cancer, cervical cancer, gastrointestinal cancer, colorectal cancer, brain cancer, skin cancer, prostate cancer, ovarian cancer, thyroid cancer, testicular cancer, pancreatic cancer, endometrial cancer, melanoma, glioma, leukemia, lymphoma, chronic myeloproliferative disorder, myelodysplastic syndrome, myeloproliferative neoplasm, and plasma cell neoplasm (myeloma). In further embodiments, the cancer is MerTK +/+. In some embodiments, the cancer is MerTK −/−.

In some embodiments, the disorder is a thrombotic disorder or a clotting disorder. Examples of thrombotic disorders include, but are not limited to, myocardial infarction, deep vein thrombosis, pulmonary embolism, and stroke.

In some embodiments, the disorder is a liver disorder. Examples of liver disorders include, but are not limited to, alcohol-related liver diseases, cirrhosis, non-alcoholic fatty liver disease, hepatitis, haemochromatosis, and primary biliary cirrhosis.

In some embodiments, the disorder is associated with Mer and/or Tyro3 tyrosine kinase dysfunction. In further embodiments, the disorder is associated with Mer tyrosine kinase. In further embodiments, the disorder is associated with Tyro3.

3. Methods of Treating an Infection

In some embodiments, disclosed are methods for the treatment of an infection in a subject, the method comprising the step of administering to the subject an effective amount of at least one disclosed compound, or a pharmaceutically acceptable salt thereof, thereby treating the infection.

In some embodiments, the infection is a viral infection or a bacterial infection. In some embodiments, the infection is a bacterial infection. In some embodiments, the infection is a viral infection. In further embodiments, the viral infection has a virion envelope phosphatidyl serine.

In some embodiments, the subject is a mammal. In some embodiments, the mammal is a human.

In some embodiments, the subject has been diagnosed with a need for treatment of the infection prior to the administering step. In some embodiments, the method further comprises the step of identifying a subject in need of treatment of the infection.

In some embodiments, the method further comprises administering an effective amount of an antiviral agent to the subject.

In some embodiments, the effective amount is a therapeutically effective amount. In some embodiments, the effective amount is a prophylactically effective amount.

In some embodiments, the infection is associated with any one or more of Mer, Tyro3, and Axl tyrosine kinase dysfunction. In some embodiments, the infection is associated with Tyro3 and/or Mer tyrosine kinase dysfunction. In some embodiments, the infection is associated with Mer tyrosine kinase dysfunction. In some embodiments, the infection is associated with Tyro3 tyrosine kinase dysfunction.

4. Methods of Inhibiting a Tam Tyrosine Kinase in at Least One Cell

In some embodiments, disclosed are methods for inhibiting a TAM tyrosine kinase (comprising both Mer and Tyro3) in at least one cell, the method comprising the step of contacting the at least one cell with an effective amount of at least one disclosed compound, thereby treating the infection.

In some embodiments, the cell is mammalian. In some embodiments, the cell is human. In some embodiments, the cell has been isolated from a mammal prior to the contacting step.

In some embodiments, contacting is via administration to a mammal. In some embodiments, the mammal has been diagnosed with a need for inhibiting a TAM tyrosine kinase prior to the administering step. In some embodiments, the mammal has been diagnosed with a need for treatment of a disorder related to dysfunction of a TAM tyrosine kinase prior to the administering step.

In some embodiments, dual inhibiting of Mer and Tyro3 tyrosine kinase is associated with treating a cancer. In further embodiments, inhibiting Mer tyrosine kinase is associated with treating a cancer.

In some embodiments, the compound exhibits dual inhibition of Mer and Tyro3 tyrosine kinase with an $IC_{50}$ of less than about 30 µM, less than about 25 µM, less than about 20 µM, less than about 15 µM, less than about 10 µM, less than about 5 µM, less than about 1 µM, or less than about 0.5 µM.

5. Manufacture of a Medicament

In some embodiments, the subject matter described herein relates to a method for the manufacture of a medicament for treating a disorder in a subject, the method comprising combining an effective amount of a disclosed compound or product of a disclosed method with a pharmaceutically acceptable carrier or diluent.

In some embodiments, the subject matter described herein relates to a method for the manufacture of a medicament for treating an infection in a subject, the method comprising combining an effective amount of a disclosed compound or product of a disclosed method with a pharmaceutically acceptable carrier or diluent.

As regards these applications, the present method includes the administration to an animal, particularly a mammal, and more particularly a human, of a therapeutically effective amount of the compound effective in the dual inhibition of Mer and Tyro3 tyrosine kinase. The dose administered to an animal, particularly a human, in the context of the presently described subject matter should be sufficient to affect a therapeutic response in the animal over a reasonable time frame. One skilled in the art will recognize that dosage will depend upon a variety of factors including the condition of the animal and the body weight of the animal.

The total amount of the compound of the present disclosure administered in a typical treatment is preferably between about 10 mg/kg and about 1000 mg/kg of body weight for mice, and between about 100 mg/kg and about 500 mg/kg of body weight, and more preferably between 200 mg/kg and about 400 mg/kg of body weight for humans per daily dose. This total amount is typically, but not necessarily, administered as a series of smaller doses over a period of about one time per day to about three times per day for about 24 months, and preferably over a period of twice per day for about 12 months.

The size of the dose also will be determined by the route, timing and frequency of administration as well as the existence, nature and extent of any adverse side effects that might accompany the administration of the compound and the desired physiological effect. It will be appreciated by one of skill in the art that various conditions or disease states, in particular chronic conditions or disease states, may require prolonged treatment involving multiple administrations.

Thus, in some embodiments, the subject matter described herein relates to the manufacture of a medicament comprising combining a disclosed compound or a product of a disclosed method of making, or a pharmaceutically acceptable salt, solvate, or polymorph thereof, with a pharmaceutically acceptable carrier or diluent.

6. Kits

In certain embodiments, the subject matter described herein is directed to a kit for treating a condition mediated by Mer and/or Tyro3 tyrosine kinase, comprising: a) a first pharmaceutical composition comprising a Formula I compound; and b) instructions for use.

In some embodiments, the at least one compound and the at least one agent are co-formulated. In some embodiments, the at least one compound and the at least one agent are co-packaged.

The kits can also comprise compounds and/or products co-packaged, co-formulated, and/or co-delivered with other components. For example, a drug manufacturer, a drug reseller, a physician, a compounding shop, or a pharmacist can provide a kit comprising a disclosed compound and/or product and another component for delivery to a patient.

It is understood that the disclosed kits can be prepared from the disclosed compounds, products, and pharmaceutical compositions. It is also understood that the disclosed kits can be employed in connection with the disclosed methods of using.

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls. Nothing herein is to be construed as an admission that the presently disclosed subject matter is not entitled to antedate such publication by virtue of prior discovery.

The subject matter disclosed herein is directed to the following embodiments:

1. A compound of Formula I:

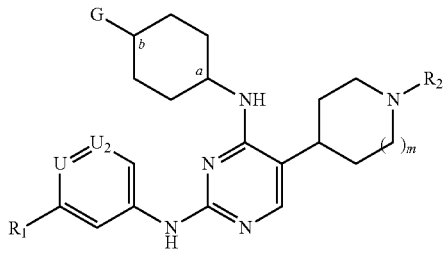

wherein,
U and $U_2$ are each independently N or CX, provided that only one of U or $U_2$ can be N;
X is H or C1-C8 alkyl;
$R_1$ is selected from the group consisting of C1-C4 alkoxy, halogen, C1-C8 alkyl, C1-C4 haloalkyl, C1-C4 hydroxyalkyl, C1-C4 alkylamino, nitrile, C3-C8 cycloalkyl, C2-C7 heterocycloalkyl, —C(O)$R_{10}$, and (C1-C4)(C1-C4) dialkylamino; wherein said cycloalkyl or heterocycloalkyl is independently substituted with 0, 1, 2, or 3 groups independently selected from the group consisting of halogen, C1-C4 alkyl, C1-C4 haloalkyl, and C1-C4 alkoxy; and
$R_{10}$ is —NH$_2$, hydrogen, or C1-C4 alkyl;
G is —OH or —NR$^e$R$^f$;
wherein R$^e$ and R$^f$ are each independently hydrogen, C1-C4 alkyl, or —C(O)$R_{50}$; and
$R_{50}$ is C1-C4 alkyl or hydrogen;
m is 0 or 1;
$R_2$ is selected from the group consisting of hydrogen, C1-C10 alkyl, C1-C4 haloalkyl, —C(O)$R_{20}$, and —(CH$_2$)$_n$Cy$_3$;
n is 0, 1, 2, 3, or 4;
Cy$_3$ is selected from the group consisting of C3-C8 cycloalkyl, C2-C7 heterocycloalkyl, aryl, and C3-C5 heteroaryl, each independently substituted with 0, 1, 2, or 3 groups independently selected from the group consisting of halogen, C1-C4 alkyl, C1-C4 haloalkyl, C1-C4 alkoxy, C1-C4 hydroxyalkyl, C1-C4 alkylamino, C3-C8 cycloalkyl, and (C1-C4)(C1-C4) dialkylamino;
$R_{20}$ is selected from the group consisting of C1-C4 alkyl, —(CH$_2$)$_q$OR$_{30}$, and —(CH$_2$)$_w$Cy$_4$;
wherein q is 0, 1, 2, 3, or 4;
w is 0, 1, 2, 3, or 4;
$R_{30}$ is hydrogen or C1-C8 alkyl; and
Cy$_4$ is selected from the group consisting of C3-C8 cycloalkyl, C2-C7 heterocycloalkyl, aryl, and C3-C5 heteroaryl, each independently substituted with 0, 1, 2, or 3 groups independently selected from the group consisting of halogen, —NH$_2$, C1-C4 alkyl, C1-C4 haloalkyl, C1-C4 alkoxy, —C(O)—(C1-C4 alkyl), C1-C4 hydroxyalkyl, C1-C4 alkylamino, and (C1-C4)(C1-C4) dialkylamino;
or a pharmaceutically acceptable salt thereof.

2. The compound of embodiment 1, wherein m is 1.
3. The compound of embodiment 1 or 2, wherein G is —OH.
4. The compound of any one of embodiments 1-3, wherein U is N and $U_2$ is CH.
5. The compound of any one of embodiments 1-3, wherein U is CH and $U_2$ is CH.
6. The compound of any one of embodiments 1-3, wherein U is N and $U_2$ is —C—CH$_3$.
7. The compound of any one of embodiments 1-6, wherein $R_1$ is selected from the group consisting of methoxy, chloro, methyl, ethyl, cyclopropyl, —C(O)NH$_2$, difluoroethyl, difluoromethyl, fluoromethyl, and trifluoromethyl.
8. The compound of embodiment 7, wherein $R_1$ is chloro or trifluoromethyl.
9. The compound of any one of embodiments 1-8, wherein $R_2$ is selected from the group consisting of hydrogen, methyl, ethyl, n-propyl, isopropyl, n-butyl, isobutyl, s-butyl, t-butyl, n-pentyl, isopentyl, s-pentyl, and neopentyl.
10. The compound of any one of embodiments 1-8, wherein $R_2$ is —C(O)$R_{20}$, wherein $R_{20}$ is —(CH$_2$)$_q$OR$_{30}$, wherein q is 0 and $R_{30}$ is C1-C4 alkyl.
11. The compound of any one of embodiments 1-8, wherein $R_2$ is —C(O)$R_{20}$, wherein $R_{20}$ is —(CH$_2$)$_w$Cy$_4$, wherein w is 0 and Cy$_4$ is cyclopentyl or cyclohexyl each independently substituted with 0, 1, 2, or 3 groups independently selected from C1-C4 alkyl.
12. The compound of any one of embodiments 1-8, wherein $R_2$ is —(CH$_2$)$_n$Cy$_3$, wherein n is 0 or 1, and Cy$_3$ is selected from the group consisting of cyclopropyl, cyclobutyl, cyclopentyl, cyclohexyl, spiro[3.3]heptyl, cycloheptyl, phenyl, oxetanyl, isoxazolyl, piperidinyl, and tetrahydropyranyl, each independently substituted with 0, 1, 2, or 3 groups independently selected from the group consisting of methyl, fluoro, cyclopropyl, chloro, n-propyl, and isopropyl.
13. The compound of embodiment 12, wherein Cy$_3$ is cyclopentyl.
14. The compound of embodiment 1 or 2, wherein G is —NR$^e$R$^f$.
15. The compound of embodiment 14, wherein G is —NH$_2$, —NHCH$_3$, —N(CH$_3$)$_2$, or —NHC(O)CH$_3$.
16. The compound of embodiment 15, wherein U is N and $U_2$ is CH.
17. The compound of embodiment 16, wherein $R_1$ is methoxy.
18. The compound of embodiment 17, wherein $R_2$ is hydrogen or —C(O)$R_{20}$, wherein $R_{20}$ is —(CH$_2$)$_w$Cy$_4$, wherein w is 0 and Cy$_4$ is cyclopentyl.
19. The compound of any one of embodiments 1-18, wherein the substituents on the carbons marked "a" and "b" are in a trans configuration.
20. The compound of embodiment 1, wherein the compound is selected from Table 1.
21. A pharmaceutical composition comprising a therapeutically effective amount of a compound of any one of embodiments 1-20, and a pharmaceutically acceptable carrier.
22. A method for the treatment of a disorder associated with Mer and/or Tyro3 tyrosine kinase, the method comprising the step of administering to the subject an effective amount of a compound of any one of embodiments 1-20.
23. The method of embodiment 22, wherein the disorder is a cancer, an infection, a fibrosis, a thrombotic disorder, a clotting disorder, or a disorder associated with an immunosuppressed microenvironment surrounding diseased tissue.

EXAMPLES

The following preparations and examples are given to enable those skilled in the art to more clearly understand and to practice the presently described subject matter. They should not be considered as limiting the scope of the subject matter described herein, but merely as being illustrative and representative.

1. General Experimental Methods

All solvents were purchased from Sigma-Aldrich (anhydrous grade), VWR International, or Fisher Scientific. All non-aqueous reactions were performed in flame-dried or oven dried round-bottomed flasks under an atmosphere of nitrogen or argon. Reaction temperatures were controlled using a thermocouple thermometer and analog hotplate stirrer. Reactions were conducted at room temperature (r.t., approximately 23° C.) unless otherwise noted. Analytical thin-layer chromatography (TLC) was performed on E. Merck silica gel 60 F254 plates and visualized using UV, ceric ammonium molybdate, potassium permanganate, and anisaldehyde stains. Yields were reported as isolated, spectroscopically pure compounds.

$^1$H NMR spectra were recorded on Varian 400 MHz spectrometers and are reported relative to deuterated solvent signals. Data for $^1$H NMR spectra are reported as follows: chemical shift (δ ppm), multiplicity (s=singlet, d=doublet, t=triplet, dd=double of doublets, dt=doublet of triplets, q=quartet, m=multiplet, br=broad, app=apparent), coupling constants (Hz), and integration. LC/MS was conducted and recorded on an Agilent Technologies 6110 Quadrupole instrument.

Microfluidic Capillary Electrophoresis (MCE) assays were performed in accordance with the procedure set forth in Zhang et al. (*J Med Chem* 2013. 56 (23), 9683-9692), which is herein incorporated by reference in its entirety. Activity assays were performed in a 384 well, polypropylene microplate in a final volume of 50 μL of 50 mM Hepes, Ph 7.4 containing 10 mM MgCl$_2$, 1.0 mM DTT, 0.01% Triton X-100, 0.1% Bovine Serum Albumin (BSA), containing 1.0 μM fluorescent substrate and ATP at the Km for each enzyme. All reactions were terminated by addition of 20 μL of 70 mM EDTA. After a 180 min incubation, phosphorylated and unphosphorylated substrate peptides were separated in buffer supplemented with 1×CR-8 on a LabChip EZ Reader equipped with a 12-sipper chip. Data were analyzed using EZ Reader software. The assay conditions for the MCE assays are shown below in Table 1A.

TABLE 1A

| Kinase | Peptide Substrate | Kinase (nM) | ATP (uM) |
|---|---|---|---|
| Mer | 5-FAM-EFPIYDFLPAKKK-CONH$_2$ | 2.0 | 5.0 |
| Tyro | 5-FAM-EFPIYDFLPAKKK-CONH$_2$ | 10 | 21 |

2. Chemistry Experimentals

Example 1 trans-4-((5-(1-(cyclopentylmethyl)piperidin-4-yl)-2-((3-methoxyphenyl)amino)pyrimidin-4-yl)amino)cyclohexan-1-ol

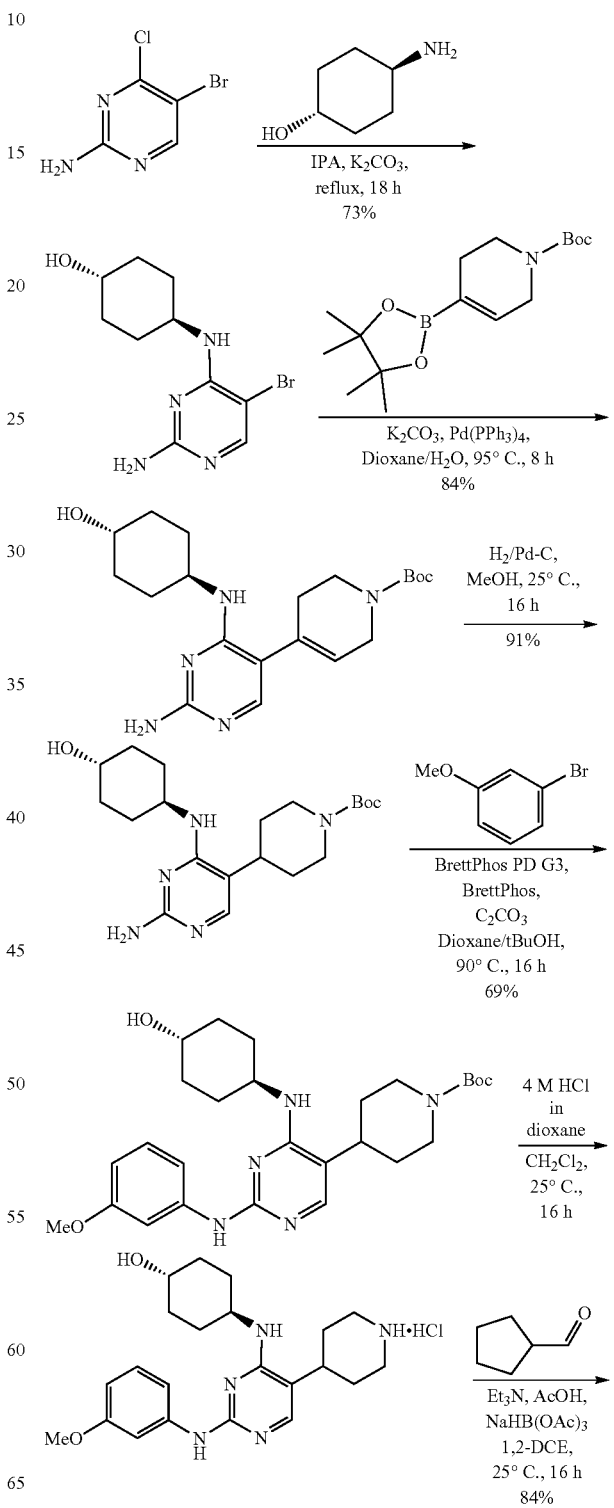

-continued

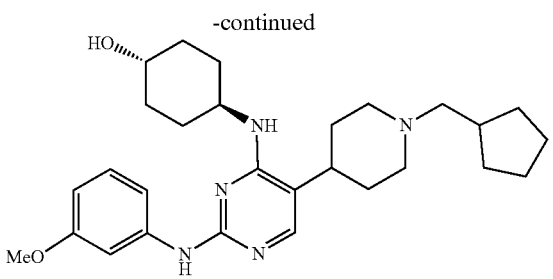

To a mixture of 5-bromo-4-chloropyrimidin-2-amine (1.0 g, 4.80 mmol) and trans-4-aminocyclohexanol (608 mg, 5.28 mmol) in isopropanol (20 mL) was added $K_2CO_3$ (1.33 g, 9.60 mmol). The reaction mixture was stirred under reflux for 18 h and then concentrated under reduced pressure. The residue was purified by column chromatography with pre-packed silica gel disposable column to provide the desired product trans-4-((2-amino-5-bromopyrimidin-4-yl)amino) cyclohexanol (1.0 g, 73%) as a white solid.

To a solution of trans-4-((2-amino-5-bromopyrimidin-4-yl)amino)cyclohexanol (1.0 g, 3.48 mmol) and tert-butyl 4-(4,4,5,5-tetramethyl-1,3,2-dioxaborolan-2-yl)-5,6-dihydropyridine-1(2H)-carboxylate (1.18 g, 3.83 mmol) in 1,4-dioxane (30 mL) was added $K_2CO_3$ (1.44 mg, 10.4 mmol) in water (10.0 mL) and $Pd(PPh_3)_4$ (201 mg, 0.17 mmol). The reaction mixture was heated under nitrogen atmosphere at 90° C. for 8 h, quenched with water, and extracted with EtOAc (3×10 mL). The combined organic layers were dried ($Na_2SO_4$) and concentrated. The residue was purified by column chromatography with pre-packed silica gel disposable column to yield the desired product tert-butyl 4-(2-amino-4-((trans-4-hydroxycyclohexyl)amino)pyrimidin-5-yl)-5,6-dihydropyridine-1(2H)-carboxylate (1.14 mg, 84%) as a yellow solid.

To a solution of tert-butyl 4-(2-amino-4-((trans-4-hydroxycyclohexyl)amino)pyrimidin-5-yl)-5,6-dihydropyridine-1(2H)-carboxylate (1.14 g, 2.93 mmol) in MeOH (40 mL) was added Pd/C (171 mg, 15%). The reaction mixture was stirred under hydrogen atmosphere at room temperature for 16 hours, then filtered through a pad of celite. The filtrate was concentrated under the reduced pressure. The residue was purified by column chromatography with pre-packed silica gel disposable column to yield the desired product tert-butyl 4-(2-amino-4-((trans-4-hydroxycyclohexyl)amino)pyrimidin-5-yl)piperidine-1-carboxylate (1.04 g, 91%) as a white solid.

To a solution of tert-butyl 4-(2-amino-4-((trans-4-hydroxycyclohexyl)amino)pyrimidin-5-yl)piperidine-1-carboxylate (212 mg, 541 μmol) and 3-bromoanisole (132 mg, 704 μmol) in 1,4-dioxane/tBuOH (5:1.18 mL) was added BrettPhos (13.1 mg, 24.4 μmol), BrettPhosPdG3 (22.1 mg, 24.4 μmol) and cesium carbonate (318 mg, 0.98 mmol). Then reaction flask was then sealed, evacuated, and refilled with nitrogen 3 times. The reaction was then stirred and heated at 100° C. for 16 h. Once deemed complete (TLC), the reaction mixture was cooled, poured onto brine (60 mL) and extracted with ethyl acetate (30 mL×3). The organic layers were combined, dried with anhydrous $MgSO_4$, filtered, and concentrated in vacuo. The corresponding residue was purified with pre-packed silica gel disposable column to yield the desired product tert-butyl 4-(4-((trans-4-hydroxycyclohexyl)amino)-2-((3-methoxyphenyl)amino)pyrimidin-5-yl)piperidine-1-carboxylate (187 mg, 69%) as a light-yellow solid.

To a solution of tert-butyl 4-(4-((trans-4-hydroxycyclohexyl)amino)-2-((3-methoxyphenyl)amino)pyrimidin-5-yl)piperidine-1-carboxylate (103.5 mg, 0.21 mmol) in $CH_2Cl_2$ (10 mL) was added a 4.0 M solution of HCl in dioxane (1.0 mL). The reaction mixture was stirred at room temperature for 1 hour, and then concentrated in vacuo to yield trans-4-((2-((3-methoxyphenyl)amino)-5-(piperidin-4-yl)pyrimidin-4-yl)amino)cyclohexan-1-ol hydrogen chloride (90.3 mg, quant.) as a white solid. This compound was directly used for the following transformations without further purification.

To a mixture of trans-4-((2-((3-methoxyphenyl)amino)-5-(piperidin-4-yl)pyrimidin-4-yl)amino)cyclohexan-1-ol hydrogen chloride (45.3 mg, 0.104 mmol), triethylamine (14.5 μL, 0.104 mmol), cyclopentanecarbaldehyde (55.4 mg, 0.209 mmol), and sodium triacetoxyborohydride (48.7 mg, 0.230 mmol) in 1,2-dichloroethane (10 mL) was added acetic acid (8.4 μL, 0.146 mmol). The reaction mixture was stirred at 25° C. for 16 hours. Once deemed complete (TLC), the reaction mixture was added MeOH and filtered through a short pad of celite. The filtrate was concentrated and purified with prep-HPLC (10-99% MeCN/water) to provide trans-4-((5-(1-(cyclopentylmethyl)piperidin-4-yl)-2-((3-methoxyphenyl)amino)pyrimidin-4-yl)amino)cyclohexan-1-ol (42.0 mg, 84%) as a white solid. $^1$H NMR (400 MHz, $CD_3OD$) δ 7.52 (s, 1H), 7.34 (t, J=8.2 Hz, 1H), 7.14 (t, 1H), 7.03 (dd, J=8.2, 1.8 Hz, 1H), 6.85 (dd, J=8.1, 2.4 Hz, 1H), 4.14 (t, J=12.0 Hz, 1H), 3.83 (s, 3H), 3.74 (d, J=12.4 Hz, 2H), 3.64-3.52 (m, 1H), 3.48 (d, J=1.6 Hz, 1H), 3.19 (d, J=7.2 Hz, 2H), 3.17-3.07 (m, 1H), 2.95 (t, J=12.2 Hz, 1H), 2.41-2.29 (m, 1H), 2.11 (d, J=14.2 Hz, 2H), 2.06-1.86 (m, 7H), 1.81-1.62 (m, 4H), 1.57 (t, J=12.4 Hz, 2H), 1.45-1.22 (m, 5H). MS (ESI) for $[M+H]^+$ ($C_{28}H_{42}N_5O_2^+$): calcd. m/z 480.3; found m/z 480.3; LC-MS: >95% purity.

Example 2 cyclopentyl(4-(4-((trans-4-hydroxycyclohexyl) amino)-2-((3-methoxyphenyl)amino)pyrimidin-5-yl) piperidin-1-yl)methanone

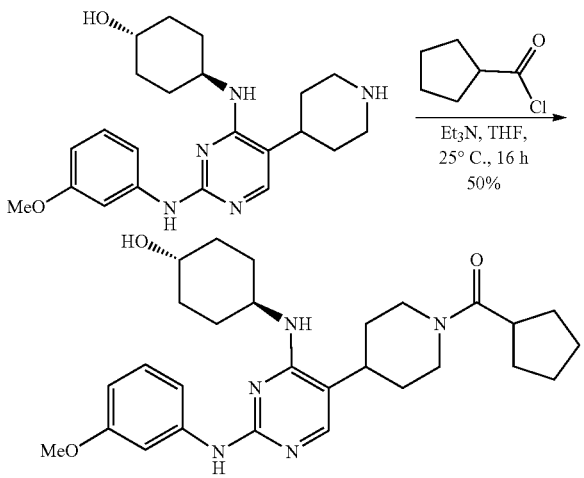

To a mixture of trans-4-((2-((3-methoxyphenyl)amino)-5-(piperidin-4-yl)pyrimidin-4-yl)amino)cyclohexan-1-ol hydrogen chloride (45.0 mg, 0.104 mmol), triethylamine (32 μL, 0.228 mmol) in THF (15 mL) was added cyclopentanecarboxylchloride (19.2 mg, 0.145 mmol) at room temperature. The reaction mixture was stirred overnight at room temperature and concentrated in vacuo. The residue was purified with prep-HPLC (10~99% MeCN/water) to provide the desired product cyclopentyl(4-(4-((trans-4-hydroxycyclohexyl)amino)-2-((3-methoxyphenyl)amino)pyrimidin-5-yl)piperidin-1-yl)methanone (25 mg, 50%) as a white solid. $^1$H NMR (400 MHz, CD$_3$OD) δ 7.45 (s, 1H), 7.34 (t, J=8.2 Hz, 1H), 7.13 (t, J=2.3 Hz, 1H), 7.02 (ddd, J=7.9, 2.0, 0.8 Hz, 1H), 6.84 (ddd, J=8.2, 2.5, 0.8 Hz, 1H), 4.69 (d, J=13.3 Hz, 1H), 4.22 (d, J=13.8 Hz, 1H), 4.20-4.09 (m, 1H), 3.83 (s, 3H), 3.63-3.53 (m, 1H), 3.23 (td, J=13.1, 2.0 Hz, 1H), 3.14-3.02 (m, 1H), 2.87 (tt, J=12.0, 2.9 Hz, 1H), 2.74 (td, J=12.7, 2.2 Hz, 1H), 2.01 (d, J=11.2 Hz, 4H), 1.96-1.81 (m, 4H), 1.81-1.67 (m, 4H), 1.67-1.50 (m, 4H), 1.50-1.23 (m, 5H). MS (ESI) for [M+H]$^+$ (C$_{28}$H$_{40}$N$_5$O$_3^+$): calcd. m/z 494.3; found m/z 494.3; LC-MS: >95% purity.

Example 3 trans-4-((5-(1-cyclopentylpiperidin-4-yl)-2-((2-methylpyridin-4-yl)amino)pyrimidin-4-yl)amino)cyclohexan-1-ol

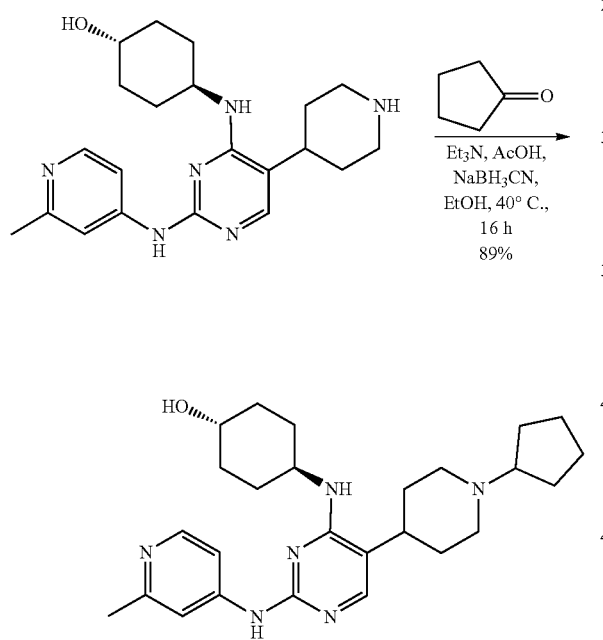

To a mixture of trans-4-((2-((2-methylpyridin-4-yl)amino)-5-(piperidin-4-yl)pyrimidin-4-yl)amino)cyclohexan-1-ol hydrochloride (43.4 mg, 0.100 mmol), triethylamine (19.6 µL, 0.141 mmol), cyclopentanone (20 µL, 0.221 mmol), and sodium cyanoborohydride (13.2 mg, 0.211 mmol) in ethanol (3 mL) was added acetic acid (9.2 µL, 0.161 mmol). The reaction was stirred under 40° C. for 16 hours. Once deemed complete (LCMS), the reaction mixture was poured onto NaHCO$_3$ aqueous solution (50 mL) and extracted with EtOAc (20 mL×3). The combined ethyl acetate layer was dried with MgSO$_4$, filtered, and concentrated under reduced pressure. The residue was purified by an automated reverse phase column chromatography system (15.5 g, HP C18, H$_2$O/ACN gradient) to provide trans-4-((5-(1-cyclopentylpiperidin-4-yl)-2-((2-methylpyridin-4-yl)amino)pyrimidin-4-yl)amino)cyclohexan-1-ol (42.5 mg, 89%) as a white solid. The compound was treated with 4N HCl (22.6 µL) and lyophilized to yield a hydrochloride salt. $^1$H NMR (400 MHz, CD$_3$OD) δ 8.22 (d, J=7.0 Hz, 1H), 7.99 (d, J=17.2 Hz, 2H), 7.90 (s, 1H), 4.11 (td, J=11.2, 3.7 Hz, 1H), 3.72 (d, J=12.3 Hz, 2H), 3.66-3.50 (m, 2H), 3.20-3.05 (m, 2H), 2.96-2.82 (m, 1H), 2.61 (s, 3H), 2.23 (d, J=16.4 Hz, 2H), 2.17-1.99 (m, 6H), 1.90 (d, J=24.3 Hz, 4H), 1.74 (s, 4H), 1.61-1.35 (m, 4H), 1.33-1.26 (m, 1H). MS (ESI) for [M+H]$^+$ (C$_{26}$H$_{39}$N$_6$O±): calcd. m/z 451.32; found m/z 451.30. LC-MS: >95% purity.

Example 4

Cyclopentyl(4-(4-(((trans-4-hydroxycyclohexyl)amino)-2-((2-methoxypyridin-4-yl)amino)pyrimidin-5-yl)piperidin-1-yl)methanone

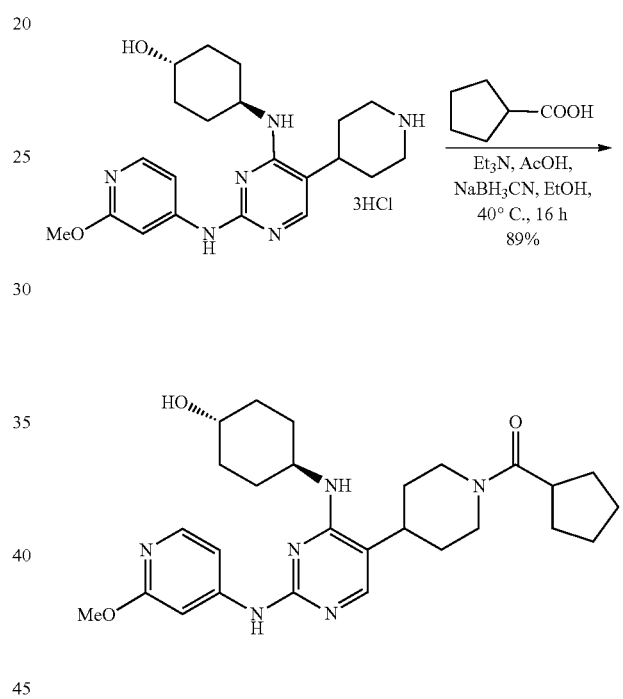

To a solution of cyclopentanecarboxylic acid (9.4 µL, 87 µmol) in DMF (0.39 mL) was added HATU (32.9 mg, 86.6 µmol) and DIPEA (69 µL, 0.39 mmol). The mixture was stirred for 5 min before trans-4-((2-((2-methoxypyridin-4-yl)amino)-5-(piperidin-4-yl)pyrimidin-4-yl)amino)cyclohexan-1-ol trihydrochloride (40.0 mg, 78.8 µmol) was added. The reaction mixture was stirred at room temperature for 3 h. The solvent was evaporated under reduced pressure and the residue was purified with silica gel disposable column (ISCO) (CH$_2$Cl$_2$-MeOH gradient) to afford cyclopentyl(4-(4-((trans-4-hydroxycyclohexyl)amino)-2-((2-methoxypyridin-4-yl)amino)pyrimidin-5-yl)piperidin-1-yl)methanone dihydrohchloride (39.4 mg, 69.4 µmol) in 88% yield as an off-white solid. $^1$H NMR (400 MHz, CD$_3$OD) δ 8.26 (d, J=6.8 Hz, 1H), 7.82-7.73 (m, 2H), 7.58 (s, 1H), 4.68 (d, J=13.3 Hz, 1H), 4.28-4.12 (m, 5H), 3.62 (td, J=10.1, 9.5, 5.1 Hz, 1H), 3.33-3.21 (m, 1H), 3.13-3.97 (m, 2H), 2.83-2.73 (m, 1H), 2.10-1.31 (m, 20H). MS (ESI) for [M+H]$^+$ (C$_{27}$H$_{39}$N$_6$O$_3^+$): calcd. m/z 495.31; found m/z 495.30; LC-MS: >95% purity.

Example 5 trans-4-((2-((2-Chloropyridin-4-yl)amino)-5-(1-phenylpiperidin-4-yl)pyrimidin-4-yl)amino)cyclohexan-1-ol

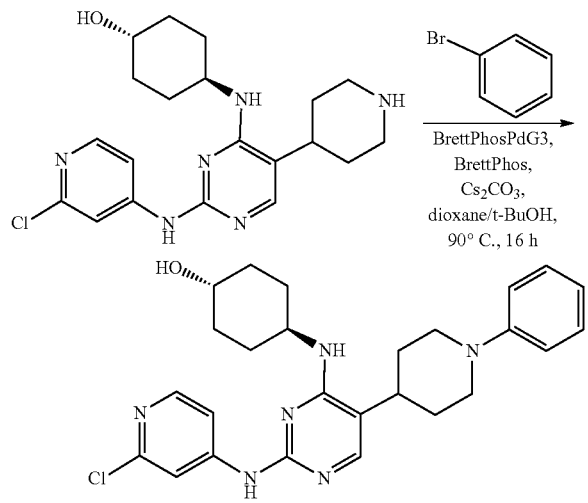

To a solution of trans-4-((2-((2-chloropyridin-4-yl)amino)-5-(piperidin-4-yl)pyrimidin-4-yl)amino)cyclohexan-1-ol (50 mg, 124 μmol) and bromobenzene (23 mg, 148 μmop in a mixture of 1,4-dioxane and tBuOH (5:1, 2 mL) was added BrettPhos (11.1 mg, 12.4 μmol), BrettPhos-PdG3 (10.1 mg, 24.4 μmol), and cesium carbonate (120 mg, 372 μmop. The reaction mixture was degassed (3×) and stirred under nitrogen at 90° C. for 16 h. The reaction mixture was cooled to room temperature, quenched with brine (10 mL), and extracted with ethyl acetate (10 mL, 3×). The organic layers were combined, dried ($Na_2SO_4$), filtered, and concentrated. The residue was purified with silica gel disposable column (ISCO) to yield the desired product tert-butyl 4-(4-((trans-4-hydroxycyclohexyl)amino)-2-((3-methoxyphenyl)amino)pyrimidin-5-yl)piperidine-1-carboxylate (36 mg, 61%) as a white solid. $^1$H NMR (400 MHz, Methanol-$d_4$) δ 8.32 (d, J=5.7 Hz, 1H), 8.04 (d, J=1.7 Hz, 1H), 7.80-7.75 (m, 2H), 7.67-7.59 (m, 4H), 7.45 (dd, J=5.8, 1.9 Hz, 1H), 4.22 (s, 1H), 3.89-3.83 (m, 4H), 2.73-2.56 (m, 1H), 2.28-2.17 (m, 6H), 2.09-2.05 (m, 4H), 1.72 (d, J=17.5 Hz, 2H), 1.52 (d, J=13.6 Hz, 2H). MS (ESI) for $[M+H]^+$ ($C_{26}H_{31}ClN_6O^+$): calcd. m/z 479.22; found m/z 479.20; LC-MS: >95% purity.

Table 1 describes compounds prepared following procedures described in Example 1-5 using appropriate reagents. (Note: IC50: ++++ means <10 nM; +++ means between 10-100 nM, ++ means between 100 nM-1 μM; + means between 1-30 μM; – means inactive.)

TABLE 1

| | Structure | Mer IC$_{50}$ | Tyro3 IC$_{50}$ | Physical Data MS m/z (M + 1) or/and $^1$H NMR |
|---|---|---|---|---|
| 1 | (structure) | ++ | ++ | $^1$H NMR (400 MHz, CD$_3$OD) δ 7.45 (s, 1H), 7.34 (t, J = 8.2 Hz, 1H), 7.13 (t, J = 2.3 Hz, 1H), 7.02 (ddd, J = 7.9, 2.0, 0.8 Hz, 1H), 6.84 (ddd, J = 8.2, 2.5, 0.8 Hz, 1H), 4.69 (d, J = 13.3 Hz, 1H), 4.22 (d, J = 13.8 Hz, 1H), 4.20-4.09 (m, 1H), 3.83 (s, 3H), 3.63-3.53 (m, 1H), 3.23 (td, J = 13.1, 2.0 Hz, 1H), 3.14-3.02 (m, 1H), 2.87 (tt, J = 12.0, 2.9 Hz, 1H), 2.74 (td, J = 12.7, 2.2 Hz, 1H), 2.01 (d, J = 11.2 Hz, 4H), 1.96-1.81 (m, 4H), 1.81-1.67 (m, 4H), 1.67-1.50 (m, 4H), 1.50-1.23 (m, 5H). MS (ESI) for [M + H]$^+$ ($C_{28}H_{40}N_5O_3^+$): calcd. m/z 494.31; found m/z 494.30. |
| 2 | (structure) | +++ | +++ | $^1$H NMR (400 MHz, CD$_3$OD) δ 7.80 (d, J = 6.0 Hz, 1H), 7.66 (s, 1H), 7.40 (d, J = 1.7 Hz, 1H), 7.06 (dd, J = 6.0, 1.9 Hz, 1H), 4.54 (s, 4H), 4.15 (d, J = 13.2 Hz, 2H), 4.09-3.99 (m, 1H), 3.84 (s, 3H), 3.62-3.51 (m, 1H), 3.27 (dt, J = 3.2, 1.6 Hz, 2H), 2.87 (t, J = 12.0 Hz, 2H), 2.70-2.58 (m, 1H), 2.10-1.93 (m, 4H), 1.77 (d, J = 12.3 Hz, 2H), 1.43 (s, 9H). MS (ESI) for [M + H]$^+$ ($C_{26}H_{39}N_6O_4^+$): calcd. m/z 499.30; found m/z 499.25. |

TABLE 1-continued

| | Structure | Mer IC$_{50}$ | Tyro3 IC$_{50}$ | Physical Data MS m/z (M + 1) or/and $^1$H NMR |
|---|---|---|---|---|
| 3 | | +++ | +++ | $^1$H NMR (400 MHz, CD$_3$OD) δ 8.16 (d, J = 7.0 Hz, 1H), 7.80 (s, 1H), 7.58 (d, J = 5.9 Hz, 2H), 4.15 (s, 3H), 3.66-3.57 (m, 1H), 3.52 (d, J = 12.9 Hz, 2H), 3.24-3.14 (m, 2H), 3.08-2.99 (m, 2H), 2.14-1.98 (m, 6H), 1.83 (dd, J = 22.9, 12.6 Hz, 2H), 1.64 (dd, J = 23.5, 12.0 Hz, 2H), 1.45-1.34 (m, 2H). MS (ESI) for [M + H]$^+$ (C$_{21}$H$_{31}$N$_6$O$_2^+$): calcd. m/z 399.24; found m/z 399.20. |
| 4 | | ++++ | +++ | $^1$H NMR (400 MHz, CD$_3$OD) δ 7.52 (s, 1H), 7.34 (t, J = 8.2 Hz, 1H), 7.14 (t, 1H), 7.03 (dd, J = 8.2, 1.8 Hz, 1H), 6.85 (dd, J = 8.1, 2.4 Hz, 1H), 4.14 (t, J = 12.0 Hz, 1H), 3.83 (s, 3H), 3.74 (d, J = 12.4 Hz, 2H), 3.64-3.52 (m, 1H), 3.48 (d, J = 1.6 Hz, 1H), 3.19 (d, J = 7.2 Hz, 2H), 3.17-3.07 (m, 1H), 2.95 (t, J = 12.2 Hz, 1H), 2.41-2.29 (m, 1H), 2.11 (d, J = 14.2 Hz, 2H), 2.06-1.86 (m, 7H), 1.81-1.62 (m, 4H), 1.57 (t, J = 12.4 Hz, 2H), 1.45-1.22 (m, 5H). MS (ESI) for [M + H]$^+$ (C$_{28}$H$_{42}$N$_5$O$_2^+$): calcd. m/z 480.33; found m/z 480.30. |
| 5 | | ++++ | +++ | $^1$H NMR (400 MHz, CD$_3$OD) δ 8.13 (d, J = 6.7 Hz, 1H), 7.80 (s, 1H), 7.61-7.50 (m, 2H), 4.13 (s, 3H), 3.73 (d, J = 12.2 Hz, 2H), 3.66-3.56 (m, 1H), 3.22-3.14 (m, 3H), 3.09-2.99 (m, 1H), 2.35 (dt, J = 15.5, 7.8 Hz, 1H), 2.11 (d, J = 14.2 Hz, 2H), 2.03 (d, J = 11.1 Hz, 6H), 1.99-1.95 (m, 2H), 1.77-1.61 (m, 6H), 1.45-1.25 (m, 6H). MS (ESI) for [M + H]$^+$ (C$_{27}$H$_{41}$N$_6$O$_2^+$): calcd. m/z 481.32; found m/z 481.30. |
| 6 | | +++ | +++ | $^1$H NMR (400 MHz, CD$_3$OD) δ 8.17 (d, J = 6.8 Hz, 1H), 7.81 (s, 1H), 7.59 (d, J = 9.1 Hz, 2H), 4.15 (s, 3H), 3.63 (d, J = 11.4 Hz, 3H), 3.19 (t, J = 11.9 Hz, 2H), 3.08-3.00 (m, 1H), 2.92 (s, 3H), 2.13 (d, J = 14.4 Hz, 2H), 2.00-2.09 (m, 5H), 1.98-1.85 (m, 2H), 1.66 (dd, J = 23.1, 12.0 Hz, 2H), 1.39 (dd, J = 23.5, 10.7 Hz, 2H). MS (ESI) for [M + H]$^+$ (C$_{22}$H$_{33}$N$_6$O$_2^+$): calcd. m/z 413.27; found m/z 413.30. |
| 7 | | ++ | ++ | $^1$H NMR (400 MHz, CD$_3$OD) δ 7.58 (d, J = 16.7 Hz, 1H), 7.34 (q, J = 8.7 Hz, 1H), 7.21 (d, J = 12.7 Hz, 1H), 7.02 (d, J = 7.3 Hz, 1H), 6.85 (t, J = 7.4 Hz, 1H), 4.62 (t, J = 11.5 Hz, 1H), 4.21 (s, 1H), 3.82 (s, 3H), 3.64 (d, J = 12.2 Hz, 2H), 3.18 (q, J = 12.8 Hz, 2H), 3.09-2.97 (m, J = 16.6 Hz, 1H), 2.92 (s, 3H), 2.56 (td, J = 14.4, 5.8 Hz, 1H), 2.40 (d, J = 15.0 Hz, 1H), 2.31 (d, J = 12.3 Hz, 1H), 2.11 (d, J = 12.0 Hz, 2H), 2.06-1.81 (m, 4H), 1.80-1.64 (m, 1H), 1.56 (td, J = 13.4, 3.9 Hz, 1H), 1.38-1.27 (m, 1H), 0.95-0.80 (m, 1H). MS (ESI) for [M + H]$^+$ (C$_{23}$H$_{34}$N$_5$O$_2^+$): calcd. m/z 412.27; found m/z 412.00. |

TABLE 1-continued

| | Structure | Mer IC$_{50}$ | Tyro3 IC$_{50}$ | Physical Data MS m/z (M + 1) or/and $^1$H NMR |
|---|---|---|---|---|
| 8 | | +++ | +++ | $^1$H NMR (400 MHz, CD$_3$OD) δ 8.53 (d, J = 6.8 Hz, 1H), 8.08 (s, 1H), 8.01 (d, J = 7.2 Hz, 1H), 7.86 (s, 1H), 4.19 (t, J = 11.7 Hz, 1H), 3.70-3.60 (m, 1H), 3.55 (d, J = 12.9 Hz, 2H), 3.22 (t, J = 12.8 Hz, 2H), 3.15-3.03 (m, 1H), 2.75 (s, 3H), 2.08 (q, J = 13.1, 11.5 Hz, 4H), 1.92-1.78 (m, 2H), 1.70 (q, J = 12.3 Hz, 2H), 1.43 (q, J = 11.6 Hz, 2H), 1.31 (d, J = 17.6 Hz, 2H). MS (ESI) for [M + H]$^+$ (C$_{21}$H$_{31}$N$_6$O$^+$): calcd. m/z 383.25; found m/z 383.30. |
| 9 | | +++ | +++ | $^1$H NMR (400 MHz, CD$_3$OD) δ 8.38 (s, 1H), 8.14 (d, J = 2.0 Hz, 1H), 7.76 (s, 1H), 7.53 (dd, J = 5.9, 2.0 Hz, 1H), 4.21 (t, J = 11.7 Hz, 1H), 3.70-3.61 (m, 1H), 3.54 (d, J = 13.1 Hz, 2H), 3.27-3.16 (m, 2H), 3.14-3.03 (m, 1H), 2.09 (t, J = 13.3 Hz, 4H), 1.92-1.78 (m, 2H), 1.71 (q, J = 12.4, 11.9 Hz, 2H), 1.51 (q, J = 11.5 Hz, 2H), 1.31 (d, J = 14.3 Hz, 2H). MS (ESI) for [M + H]$^+$ (C$_{20}$H$_{28}$ClN$_6$O$^+$): calcd. m/z 403.20; found m/z 403.20. |
| 10 | | + | +++ | $^1$H NMR (400 MHz, CD$_3$OD) δ 7.85 (s, 2H), 4.21 (t, J = 11.8 Hz, 1H), 3.66 (dq, J = 10.7, 5.7, 5.1 Hz, 2H), 3.54 (d, J = 12.6 Hz, 2H), 3.23 (t, J = 12.8 Hz, 2H), 3.12 (t, J = 11.9 Hz, 1H), 2.72 (s, 6H), 2.15-2.01 (m, 4H), 1.93-1.80 (m, 2H), 1.73 (q, J = 13.6, 12.6 Hz, 2H), 1.40 (q, J = 11.6, 11.0 Hz, 2H), 1.34-1.24 (m, 2H). MS (ESI) for [M + H]$^+$ (C$_{22}$H$_{33}$N$_6$O$^+$): calcd. m/z 397.27; found m/z 397.30. |
| 11 | | ++++ | +++ | $^1$H NMR (400 MHz, CD$_3$OD) δ 8.22 (d, J = 7.0 Hz, 1H), 7.99 (d, J = 17.2 Hz, 2H), 7.90 (s, 1H), 4.11 (td, J = 11.2, 3.7 Hz, 1H), 3.72 (d, J = 12.3 Hz, 2H), 3.66-3.50 (m, 2H), 3.20-3.05 (m, 2H), 2.96-2.82 (m, 1H), 2.61 (s, 3H), 2.23 (d, J = 16.4 Hz, 2H), 2.17-1.99 (m, 6H), 1.90 (d, J = 24.3 Hz, 4H), 1.74 (s, 4H), 1.61-1.35 (m, 4H), 1.33-1.26 (m, 1H). MS (ESI) for [M + H]$^+$ (C$_{26}$H$_{39}$N$_6$O$^+$): calcd. m/z 451.32; found m/z 451.30. |
| 12 | | ++++ | ++++ | $^1$H NMR (400 MHz, CD$_3$OD) δ 8.29 (d, J = 5.8 Hz, 1H), 8.02 (d, J = 1.9 Hz, 1H), 7.71 (s, 1H), 7.42 (dd, J = 5.7, 2.0 Hz, 1H), 4.19 (t, J = 11.6 Hz, 1H), 3.76 (d, J = 12.5 Hz, 2H), 3.67-3.54 (m, 2H), 3.19-3.09 (m, 2H), 3.01 (t, J = 12.2 Hz, 1H), 2.26-2.11 (m, 4H), 2.07 (d, J = 11.3 Hz, 3H), 1.92 (dd, J = 26.0, 11.9 Hz, 3H), 1.84-1.58 (m, 6H), 1.51 (q, J = 12.6, 12.1 Hz, 2H), 1.35-1.25 (m, 2H). MS (ESI) for [M + H]$^+$ (C$_{25}$H$_{36}$ClN$_6$O$^+$): calcd. m/z 471.26; found m/z 471.25. |

TABLE 1-continued

| | Structure | Mer IC$_{50}$ | Tyro3 IC$_{50}$ | Physical Data MS m/z (M + 1) or/and $^1$H NMR |
|---|---|---|---|---|
| 13 | | ++++ | +++ | $^1$H NMR (400 MHz, CD$_3$OD) δ 8.62 (d, J = 5.6 Hz, 1H), 8.21 (d, J = 2.0 Hz, 1H), 7.78 (dd, J = 5.5, 1.9 Hz, 1H), 7.74 (s, 1H), 4.19 (t, J = 11.8 Hz, 1H), 3.76 (d, J = 12.4 Hz, 2H), 3.60 (dd, J = 15.3, 8.8 Hz, 2H), 3.20-3.08 (m, 2H), 3.01 (t, J = 12.0 Hz, 1H), 2.28-2.10 (m, 4H), 2.09-1.99 (m, 3H), 1.99-1.82 (m, 3H), 1.82-1.52 (m, 6H), 1.48-1.37 (m, 2H), 1.35-1.24 (m, 2H). MS (ESI) for [M + H]$^+$ (C$_{26}$H$_{36}$F$_3$N$_6$O$^+$): calcd. m/z 505.29; found m/z 505.30. |
| 14 | | +++ | +++ | $^1$H NMR (400 MHz, CD$_3$OD) δ 8.53-8.42 (m, 2H), 7.82 (dd, J = 5.8, 2.3 Hz, 1H), 7.77 (s, 1H), 4.23 (td, J = 11.2, 5.6 Hz, 1H), 3.75 (d, J = 12.3 Hz, 2H), 3.60 (ddt, J = 9.7, 6.1, 3.6 Hz, 2H), 3.17 (t, J = 12.1 Hz, 2H), 2.99 (t, J = 12.0 Hz, 1H), 2.30-2.11 (m, 4H), 2.10-1.98 (m, 4H), 1.98-1.67 (m, 7H), 1.66-1.42 (m, 4H), 1.36-1.26 (m, 1H). MS (ESI) for [M + H]$^+$ (C$_{26}$H$_{38}$N$_7$O$_2^+$): calcd. m/z 480.31; found m/z 480.30. |
| 15 | | ++++ | +++ | $^1$H NMR (400 MHz, CD$_3$OD) δ 8.48 (d, J = 6.9 Hz, 1H), 8.08 (d, J = 2.1 Hz, 1H), 8.02 (dd, J = 6.8, 2.2 Hz, 1H), 7.86 (s, 1H), 4.17 (t, J = 11.8 Hz, 1H), 3.75 (d, J = 12.4 Hz, 2H), 3.70-3.60 (m, 1H), 3.56-3.44 (m, 1H), 3.25-3.12 (m, 3H), 3.07 (t, J = 12.2 Hz, 1H), 2.74 (s, 3H), 2.35 (q, J = 8.0 Hz, 1H), 2.09 (dt, J = 21.6, 12.0 Hz, 5H), 1.98 (s, 3H), 1.69 (q, J = 17.0, 11.1 Hz, 6H), 1.44 (t, J = 12.0 Hz, 2H), 1.39-1.29 (m, 4H). MS (ESI) for [M + H]$^+$ (C$_{27}$H$_{41}$N$_6$O$^+$): calcd. m/z 465.33; found m/z 465.30. |
| 16 | | ++++ | ++++ | $^1$H NMR (400 MHz, CD$_3$OD) δ 8.32 (d, J = 5.8 Hz, 1H), 8.05 (d, J = 1.9 Hz, 1H), 7.74 (d, J = 0.8 Hz, 1H), 7.45 (dd, J = 5.8, 2.0 Hz, 1H), 4.21 (t, J = 12.1 Hz, 1H), 3.75 (d, J = 12.3 Hz, 2H), 3.66-3.59 (m, 1H), 3.54-3.46 (m, 1H), 3.25-3.12 (m, 3H), 3.15-3.08 (m, 1H), 2.37 (p, J = 7.9 Hz, 1H), 2.10 (dd, J = 27.2, 13.1 Hz, 6H), 2.00 (d, J = 14.4 Hz, 3H), 1.80-1.62 (m, 6H), 1.57-1.44 (m, 3H), 1.41-1.32 (m, 2H). MS (ESI) for [M + H]$^+$ (C$_{26}$H$_{38}$ClN$_6$O$^+$): calcd. m/z 485.28; found m/z 485.30. |
| 17 | | +++ | +++ | $^1$H NMR (400 MHz, CD$_3$OD) δ 8.52 (d, J = 5.7 Hz, 1H), 8.26 (d, J = 2.1 Hz, 1H), 7.82 (dd, J = 5.7, 2.1 Hz, 1H), 7.78 (s, 1H), 4.22-4.12 (m, 1H), 3.76 (d, J = 12.5 Hz, 2H), 3.64-3.56 (m, 1H), 3.54-3.43 (m, 1H), 3.20 (d, J = 7.3 Hz, 1H), 3.13 (t, J = 12.7 Hz, 2H), 2.92 (d, J = 12.1 Hz, 1H), 2.36 (p, J = 7.8 Hz, 2H), 2.14 (d, J = 14.1 Hz, 2H), 2.09-1.93 (m, 6H), 1.78-1.51 (m, 6H), 1.45 (t, J = 11.4 Hz, 2H), 1.40-1.24 (m, 3H). MS (ESI) for [M + H]$^+$ (C$_{27}$H$_{38}$F$_3$N$_6$O$^+$): calcd. m/z 519.30; found m/z 519.30. |

TABLE 1-continued

| | Structure | Mer IC$_{50}$ | Tyro3 IC$_{50}$ | Physical Data MS m/z (M + 1) or/and $^1$H NMR |
|---|---|---|---|---|
| 18 | | ++++ | ++++ | $^1$H NMR (400 MHz, CD$_3$OD) δ 8.30 (d, J = 5.7 Hz, 1H), 8.14 (d, J = 2.1 Hz, 1H), 7.79 (s, 1H), 7.76 (dd, J = 5.8, 2.2 Hz, 1H), 4.14 (dd, J = 10.4, 5.2 Hz, 1H), 3.65-3.54 (m, 1H), 3.07 (dt, J = 11.9, 3.1 Hz, 2H), 2.52 (tt, J = 11.6, 4.0 Hz, 1H), 2.38 (d, J = 7.0 Hz, 2H), 2.22-2.09 (m, 3H), 2.09-1.98 (m, 5H), 1.96 (t, J = 18.6 Hz, 3H), 1.88-1.76 (m, 4H), 1.72 (dd, J = 12.6, 3.4 Hz, 2H), 1.69-1.53 (m, 4H), 1.48 (td, J = 9.0, 3.0 Hz, 4H), 1.28-1.16 (m, 2H). MS (ESI) for [M + H]$^+$ (C$_{28}$H$_{41}$F$_2$N$_6$O$^+$): calcd. m/z 515.33; found m/z 515.30. |
| 19 | | ++ | +++ | $^1$H NMR (400 MHz, CD$_3$OD) δ 7.89-7.81 (m, 3H), 4.18 (t, J = 11.5 Hz, 1H), 3.75 (d, J = 12.3 Hz, 2H), 3.69-3.59 (m, 1H), 3.55-3.46 (m, 1H), 3.24-3.13 (m, 3H), 3.06 (t, J = 12.2 Hz, 1H), 2.68 (s, 6H), 2.37 (p, J = 7.9 Hz, 1H), 2.18-2.02 (m, 6H), 1.99 (d, J = 11.3 Hz, 3H), 1.79-1.71 (m, 2H), 1.68 (d, J = 9.9 Hz, 3H), 1.42 (t, J = 12.7 Hz, 2H), 1.35 (d, J = 14.3 Hz, 4H). MS (ESI) for [M + H]$^+$ (C$_{28}$H$_{43}$N$_6$O$^+$): calcd. m/z 479.35; found m/z 479.30. |
| 20 | | ++++ | +++ | $^1$H NMR (400 MHz, CD$_3$OD) δ 8.43 (d, J = 2.2 Hz, 1H), 8.35 (d, J = 5.6 Hz, 1H), 7.88 (dd, J = 5.7, 2.3 Hz, 1H), 7.80 (s, 1H), 4.59 (s, 2H), 4.19 (td, J = 10.8, 4.1 Hz, 1H), 3.64-3.54 (m, 1H), 3.49 (dd, J = 12.6, 4.4 Hz, 2H), 2.90 (s, 2H), 2.85-2.67 (m, 3H), 2.27 (p, J = 7.8 Hz, 2H), 2.08 (d, J = 11.8 Hz, 2H), 2.03-1.81 (m, 6H), 1.71 (ddd, J = 10.4, 8.1, 5.4 Hz, 2H), 1.63 (td, J = 8.7, 8.1, 3.9 Hz, 2H), 1.57-1.43 (m, 3H), 1.29 (dq, J = 13.8, 7.4 Hz, 2H). MS (ESI) for [M + H]$^+$ (C$_{27}$H$_{40}$N$_7$O$_2^+$): calcd. m/z 494.32; found m/z 494.30. |
| 21 | | +++ | +++ | $^1$H NMR (400 MHz, D$_2$O) δ 8.16 (d, J = 7.1 Hz, 1H), 7.73 (s, 1H), 7.71 (dd, J = 7.1, 2.0 Hz, 2H), 7.49 (d, J = 2.0 Hz, 1H), 4.24-4.14 (m, 1H), 4.19 (s, 3H), 3.68-3.60 (m, 1H), 3.61-3.53 (m, 2H), 3.26-3.16 (m, 2H), 3.06-2.97 (m, 1H), 2.28-1.98 (m, 6H), 1.97 (s, 3H), 1.87-1.74 (m, 2H), 1.70-1.57 (m, 2H), 1.41-1.28 (m, 2H). MS (ESI) for [M + H]$^+$ (C$_{23}$H$_{34}$N$_7$O$_2^+$): calcd. m/z 440.28; found m/z 440.30. |
| 22 | | ++ | + | $^1$H NMR (400 MHz, CD$_3$OD) δ 8.24 (d, J = 6.8 Hz, 1H), 7.85 (s, 1H), 7.67 (dd, J = 6.8, 1.9 Hz, 1H), 7.55 (d, J = 1.9 Hz, 1H), 4.24-4.15 (m, 4H), 3.80-3.56 (m, 4H), 3.27-3.08 (m, 3H), 2.27-1.98 (m, 8H), 1.95 (s, 3H), 1.93-1.64 (m, 8H), 1.51-1.36 (m, 2H). MS (ESI) for [M + H]$^+$ (C$_{28}$H$_{42}$N$_7$O$_2^+$): calcd. m/z 508.34; found m/z 508.30. |

TABLE 1-continued

| | Structure | Mer IC$_{50}$ | Tyro3 IC$_{50}$ | Physical Data MS m/z (M + 1) or/and $^1$H NMR |
|---|---|---|---|---|
| 23 | | ++++ | +++ | $^1$H NMR (400 MHz, CD$_3$OD) δ 8.34 (d, J = 6.9 Hz, 1H), 7.86 (s, 1H), 7.77 (s, 1H), 7.50 (s, 1H), 4.31-4.18 (m, 1H), 4.21 (s, 3H), 3.74 (d, J = 13.3 Hz, 2H), 3.60 (t, J = 7.9 Hz, 1H), 3.28-3.16 (m, 3H), 2.19 (dd, J = 17.2, 10.8 Hz, 8H), 2.06-1.96 (m, 2H), 1.92-1.62 (m, 11H). MS (ESI) for [M + H]$^+$ (C$_{26}$H$_{40}$N$_7$O$^+$): calcd. m/z 466.33; found m/z 466.35. |
| 24 | | +++ | ++ | $^1$H NMR (400 MHz, CD$_3$OD) δ 8.46 (d, J = 6.8 Hz, 1H), 7.95-7.89 (m, 1H), 7.88 (d, J = 1.9 Hz, 1H), 7.47 (d, J = 1.7 Hz, 1H), 4.34-4.19 (m, 4H), 3.74 (d, J = 12.3 Hz, 2H), 3.66-3.56 (m, 1H), 3.39-3.18 (m, 3H), 2.91 (s, 5H), 2.33-2.10 (m, 8H), 2.09-1.62 (m, 12H). MS (ESI) for [M + H]$^+$ (C$_{28}$H$_{44}$N$_7$O$^+$): calcd. m/z 494.36; found m/z 494.25. |
| 25 | | ++++ | +++ | $^1$H NMR (400 MHz, CD$_3$OD) δ 8.15 (d, J = 6.6 Hz, 1H), 7.82 (s, 1H), 7.60-7.49 (m, 2H), 4.23-4.15 (m, 1H), 4.13 (s, 3H), 3.78-3.70 (m, 2H), 3.67-3.56 (m, 2H), 3.27-3.16 (m, 3H), 3.16-3.07 (m, 1H), 2.26-1.95 (m, 9H), 1.91-1.63 (m, 8H), 1.52-1.37 (m, 2H). MS (ESI) for [M + H]$^+$ (C$_{26}$H$_{39}$N$_4$O$_2$$^+$): calcd. m/z 467.31; found m/z 467.30. |
| 26 | | +++ | +++ | $^1$H NMR (400 MHz, CD$_3$OD) δ 8.26 (d, J = 6.8 Hz, 1H), 7.82-7.73 (m, 2H), 7.58 (s, 1H), 4.68 (d, J = 13.3 Hz, 1H), 4.28-4.12 (m, 5H), 3.62 (td, J = 10.1, 9.5, 5.1 Hz, 1H), 3.33-3.21 (m, 1H), 3.13-3.97 (m, 2H), 2.83-2.73 (m, 1H), 2.10-1.31 (m, 20H). MS (ESI) for [M + H]$^+$ (C$_{27}$H$_{39}$N$_6$O$_3$$^+$): calcd. m/z 495.31; found m/z 495.30. |
| 27 | | ++++ | ++++ | $^1$H NMR (400 MHz, D$_2$O) δ 8.53 (d, J = 5.7 Hz, 1H), 8.24 (d, J = 2.1 Hz, 1H), 7.70-7.63 (m, 2H), 4.04 (t, J = 12.0 Hz, 1H), 3.75-3.64 (m, 1H), 3.64-3.54 (m, 2H), 3.21 (td, J = 13.1, 2.8 Hz, 2H), 3.04-2.93 (m, 1H), 2.16 (dt, J = 14.4, 2.7 Hz, 2H), 2.05-1.90 (m, 4H), 1.81 (qd, J = 13.8, 13.4, 3.9 Hz, 2H), 1.64-1.50 (m, 2H), 1.42-1.29 (m, 2H). MS (ESI) for [M + H]$^+$ (C$_{21}$H$_{28}$F$_3$N$_6$O$^+$): calcd. m/z 437.23; found m/z 437.20. |

TABLE 1-continued

| | Structure | Mer IC$_{50}$ | Tyro3 IC$_{50}$ | Physical Data MS m/z (M + 1) or/and $^1$H NMR |
|---|---|---|---|---|
| 28 | | +++ | +++ | $^1$H NMR (400 MHz, Methanol-d$_4$) δ 8.26 (d, J = 5.7 Hz, 1H), 8.03 (d, J = 1.8 Hz, 1H), 7.76 (s, 1H), 7.44 (dd, J = 5.7, 1.9 Hz, 1H), 4.18 (t, J = 11.8 Hz, 1H), 3.85 (d, J = 12.2 Hz, 1H), 3.74 (dd, J = 10.8, 4.8 Hz, 2H), 3.66-3.50 (m, 4H), 3.34-3.32 (m, 3H), 3.19 (t, J = 12.4 Hz, 2H), 3.11-3.03 (m, 1H), 2.41-2.32 (m, 1H), 2.19-1.79 (m, 8H), 1.74-1.61 (m, 2H), 1.59-1.45 (m, 2H). MS (ESI) for [M + H]$^+$ (C$_{24}$H$_{33}$ClN$_6$O$_2$$^+$): calcd. m/z 473.23; found m/z 472.30. |
| 29 | | +++ | +++ | $^1$H NMR (400 MHz, Methanol-d$_4$) δ 8.27 (d, J = 5.7 Hz, 1H), 8.05 (d, J = 1.9 Hz, 1H), 7.72 (s, 1H), 7.45 (dd, J = 5.8, 1.9 Hz, 1H), 4.24-4.14 (m, 1H), 3.77 (d, J = 11.1 Hz, 2H), 3.66-3.54 (m, 3H), 3.23-3.13 (m, 3H), 3.12-3.00 (m, 3H), 2.88 (s, 3H), 2.32-2.23 (m, 1H), 2.21-2.00 (m, 11H), 1.74-1.42 (m, 6H). MS (ESI) for [M + H]$^+$ (C$_{27}$H$_{40}$ClN$_7$O$^+$): calcd. m/z 514.30; found m/z 514.30. |
| 30 | | ++++ | ++++ | $^1$H NMR (400 MHz, Methanol-d$_4$) δ 8.26 (d, J = 5.8 Hz, 1H), 8.05 (d, J = 2.0 Hz, 1H), 7.73 (s, 1H), 7.46 (dd, J = 5.7, 2.0 Hz, 1H), 4.18 (t, J = 11.4 Hz, 1H), 3.76 (d, J = 11.8 Hz, 2H), 3.62 (td, J = 10.9, 5.4 Hz, 1H), 3.23-3.08 (m, 3H), 3.04 (t, J = 11.9 Hz, 1H), 2.24-1.74 (m, 15H), 1.73-1.23 (m, 7H). MS (ESI) for [M + H]$^+$ (C$_{27}$H$_{37}$F$_2$ClN$_6$O$^+$): calcd. m/z 535.37; found m/z 535.40. |
| 31 | | ++++ | +++ | $^1$H NMR (400 MHz, Methanol-d$_4$) δ 8.27 (d, J = 5.4 Hz, 1H), 8.04 (s, 1H), 7.76 (s, 1H), 7.45 (d, J = 5.7 Hz, 1H), 6.46 (s, 1H), 4.52 (s, 2H), 4.24-4.15 (m, 2H), 3.73 (d, J = 12.7 Hz, 2H), 3.68-3.62 (m, 1H), 3.07-3.01 (m, 1H), 2.10 (dd, J = 30.3, 11.1 Hz, 8H), 1.66 (q, J = 12.0 Hz, 3H), 1.52 (q, J = 13.9, 12.8 Hz, 3H). MS (ESI) for [M + H]$^+$ (C$_{25}$H$_{32}$ClN$_7$O$_2$$^+$): calcd. m/z 498.23; found m/z 498.20. |
| 32 | | ++++ | +++ | $^1$H NMR (400 MHz, Methanol-d$_4$) δ 8.26 (dd, J = 5.7, 3.2 Hz, 1H), 8.03 (t, J = 2.5 Hz, 1H), 7.67 (d, J = 12.1 Hz, 1H), 7.57 (dd, J = 6.7, 3.0 Hz, 2H), 7.55-7.47 (m, 3H), 7.44 (d, J = 5.9 Hz, 1H), 4.40 (s, 2H), 4.23-4.12 (m, 1H), 3.61 (dd, J = 12.9, 8.9 Hz, 2H), 3.18 (t, J = 12.5 Hz, 2H), 2.98 (t, J = 11.7 Hz, 1H), 2.17-2.00 (m, 6H), 1.91 (d, J = 12.7 Hz, 2H), 1.72-1.42 (m, 6H). MS (ESI) for [M + H]$^+$ (C$_{27}$H$_{33}$ClN$_6$O$^+$): calcd. m/z 493.24; found m/z 493.20. |

TABLE 1-continued

| | Structure | Mer IC$_{50}$ | Tyro3 IC$_{50}$ | Physical Data MS m/z (M + 1) or/and $^1$H NMR |
|---|---|---|---|---|
| 33 | 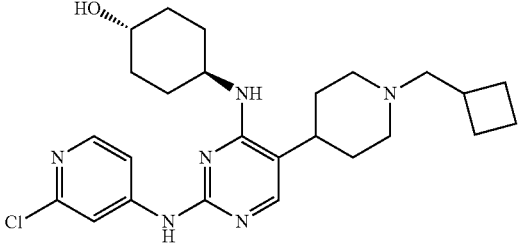 [SMILES: O[C@H]1CC[C@H](Nc2nc(Nc3ccnc(Cl)c3)ncc2C2CCN(CC3CCC3)CC2)CC1] | ++++ | ++++ | $^1$H NMR (400 MHz, Methanol-d$_4$) δ 8.20 (d, J = 5.7 Hz, 1H), 8.00 (d, J = 1.9 Hz, 1H), 7.66 (s, 1H), 7.41 (dd, J = 5.7, 1.9 Hz, 1H), 4.12 (tt, J = 11.6, 3.5 Hz, 1H), 3.59 (d, J = 11.2 Hz, 3H), 3.19 (d, J = 7.1 Hz, 2H), 3.08 (t, J = 11.7 Hz, 2H), 2.98 (t, J = 12.2 Hz, 1H), 2.86-2.73 (m, 2H), 2.24-2.14 (m, 2H), 2.13-1.95 (m, 7H), 1.95-1.78 (m, 5H), 1.68-1.55 (m, 2H), 1.55-1.41 (m, 2H). MS (ESI) for [M + H]$^+$ (C$_{25}$H$_{35}$ClN$_6$O$^+$): calcd. m/z 471.26; found m/z 471.30. |
| 34 | 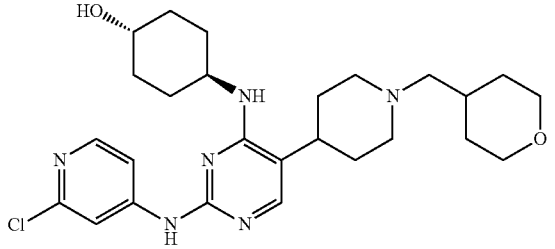 [SMILES: O[C@H]1CC[C@H](Nc2nc(Nc3ccnc(Cl)c3)ncc2C2CCN(CC3CCOCC3)CC2)CC1] | ++++ | +++ | $^1$H NMR (400 MHz, Methanol-d$_4$) δ 8.29 (d, J = 5.7 Hz, 1H), 8.05 (d, J = 1.9 Hz, 1H), 7.76 (s, 1H), 7.46 (dd, J = 5.8, 1.9 Hz, 1H), 4.26-4.16 (m, 1H), 3.99 (dd, J = 11.5, 4.3 Hz, 2H), 3.77 (d, J = 12.4 Hz, 2H), 3.70-3.59 (m, 1H), 3.49 (td, J = 11.9, 1.9 Hz, 2H), 3.21 (t, J = 12.2 Hz, 2H), 3.15-3.06 (m, 3H), 2.30-1.98 (m, 8H), 1.86-1.64 (m, 5H), 1.61-1.36 (m, 5H). MS (ESI) for [M + H]$^+$ (C$_{26}$H$_{37}$ClN$_6$O$_2^+$): calcd. m/z 501.27; found m/z 501.20. |
| 35 | 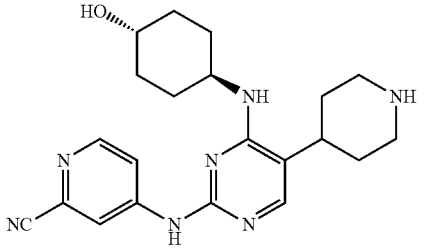 [SMILES: N#Cc1cc(Nc2ncc(C3CCNCC3)c(N[C@H]3CC[C@H](O)CC3)n2)ccn1] | +++ | +++ | $^1$H NMR (400 MHz, Methanol-d$_4$) δ 8.64 (d, J = 5.7 Hz, 1H), 8.27 (d, J = 2.1 Hz, 1H), 7.83 (dd, J = 5.8, 2.2 Hz, 1H), 7.76 (s, 1H), 4.20-4.10 (m, 1H), 3.53 (d, J = 13.8 Hz, 2H), 3.23 (td, J = 12.9, 2.8 Hz, 2H), 3.11 (tt, J = 12.0, 3.3 Hz, 1H), 2.15-1.99 (m, 6H), 1.86 (qd, J = 13.2, 3.9 Hz, 3H), 1.78-1.66 (m, 3H), 1.54-1.39 (m, 3H). MS (ESI) for [M + H]$^+$ (C$_{21}$H$_{27}$N$_7$O$^+$): calcd. m/z 394.23; found m/z 394.20. |
| 36 | 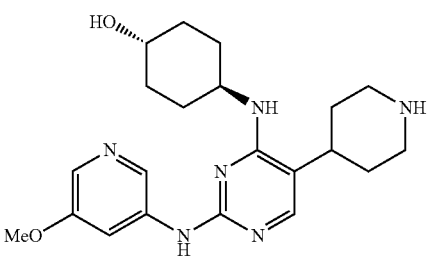 [SMILES: COc1cncc(Nc2ncc(C3CCNCC3)c(N[C@H]3CC[C@H](O)CC3)n2)c1] | + | ++ | H NMR (400 MHz, Methanol-d$_4$) δ 8.74 (d, J = 1.8 Hz, 1H), 8.44 (d, J = 2.4 Hz, 1H), 8.40 (t, J = 2.1 Hz, 1H), 7.75 (s, 1H), 4.09 (s, 3H), 3.67-3.57 (m, 1H), 3.53 (d, J = 12.6 Hz, 2H), 3.27-3.18 (m, 2H), 3.15-3.06 (m, 1H), 2.14-1.95 (m, 6H), 1.93-1.78 (m, 2H), 1.76-1.62 (m, 2H), 1.45-1.32 (m, 2H). MS (ESI) for [M + H]$^+$ (C$_{21}$H$_{30}$N$_6$O$_2^+$): calcd. m/z 399.24; found m/z 399.20. |
| 37 | 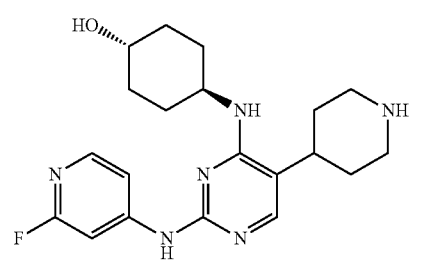 [SMILES: O[C@H]1CC[C@H](Nc2nc(Nc3ccnc(F)c3)ncc2C2CCNCC2)CC1] | ++++ | +++ | $^1$H NMR (400 MHz, Methanol-d$_4$) δ 8.15 (d, J = 5.8 Hz, 1H), 7.74 (d, J = 0.7 Hz, 1H), 7.60 (t, J = 1.9 Hz, 1H), 7.40 (dt, J = 5.8, 1.5 Hz, 1H), 4.21-4.11 (m, 1H), 3.62 (ddd, J = 11.0, 7.6, 3.9 Hz, 1H), 3.53 (d, J = 13.1 Hz, 3H), 3.27-3.16 (m, 2H), 2.15-2.00 (m, 8H), 1.92-1.81 (m, 2H), 1.77-1.64 (m, 2H), 1.50-1.35 (m, 2H). MS (ESI) for [M + H]$^+$ (C$_{20}$H$_{27}$FN$_6$O$_2^+$): calcd. m/z 387.22; found m/z 387.20. |

TABLE 1-continued

| | Structure | Mer IC$_{50}$ | Tyro3 IC$_{50}$ | Physical Data MS m/z (M + 1) or/and $^1$H NMR |
|---|---|---|---|---|
| 38 | | +++ | +++ | $^1$H NMR (400 MHz, Methanol-d$_4$) δ 8.50 (d, J = 6.0 Hz, 1H), 8.13-8.03 (m, 2H), 7.88 (s, 1H), 4.25-4.14 (m, 1H), 3.63 (d, J = 11.4 Hz, 1H), 3.53 (d, J = 12.2 Hz, 2H), 3.25 (t, J = 12.5 Hz, 2H), 3.19-3.09 (m, 1H), 3.03 (q, J = 7.4 Hz, 2H), 2.15-2.00 (m, 6H), 1.95-1.81 (m, 2H), 1.72 (dd, J = 23.6, 11.8 Hz, 2H), 1.41 (dt, J = 23.6, 6.7 Hz, 2H). MS (ESI) for [M + H]$^+$ (C$_{22}$H$_{32}$N$_6$O$^+$): calcd. m/z 397.26; found m/z 397.30. |
| 39 | | +++ | +++ | $^1$H NMR (400 MHz, Methanol-d$_4$) δ 7.95 (s, 1H), 7.74 (d, J = 9.0 Hz, 1H), 7.66-7.60 (m, 2H), 7.54 (d, J = 7.8 Hz, 1H), 4.15-4.07 (m, 1H), 3.53 (d, J = 13.1 Hz, 3H), 3.24-3.15 (m, 3H), 3.00 (t, J = 12.0 Hz, 1H), 2.08 (d, J = 14.0 Hz, 2H), 1.97 (t, J = 12.4 Hz, 5H), 1.88-1.72 (m, 2H), 1.66-1.52 (m, 2H), 1.40-1.21 (m, 2H). MS (ESI) for [M + H]$^+$ (C$_{22}$H$_{28}$F$_3$N$_5$O$^+$): calcd. m/z 436.22; found m/z 436.20. |
| 40 | | +++ | +++ | $^1$H NMR (400 MHz, Methanol-d$_4$) δ 7.54 (s, 1H), 7.38-7.28 (m, 3H), 7.15-7.09 (m, 1H), 4.19-4.07 (m, 1H), 3.62-3.55 (m, 1H), 3.51 (d, J = 12.7 Hz, 2H), 3.26-3.13 (m, 2H), 3.04-2.96 (m, 1H), 2.70 (q, J = 7.6 Hz, 2H), 2.14-1.92 (m, 7H), 1.88-1.72 (m, 2H), 1.69-1.53 (m, 2H), 1.40-1.30 (m, 2H), 1.27 (t, J = 7.6 Hz, 3H). MS (ESI) for [M + H]$^+$ (C$_{22}$H$_{33}$N$_5$O$^+$): calcd. m/z 396.27; found m/z 397.30. |
| 41 | | +++ | +++ | $^1$H NMR (400 MHz, Methanol-d$_4$) δ 8.46 (d, J = 6.9 Hz, 1H), 8.01 (dd, J = 7.0, 2.3 Hz, 1H), 7.85 (d, J = 0.7 Hz, 1H), 7.79 (d, J = 2.3 Hz, 1H), 4.25-4.13 (m, 1H), 3.64 (qd, J = 7.8, 3.0 Hz, 2H), 3.53 (d, J = 12.9 Hz, 4H), 3.28-3.18 (m, 2H), 3.18-3.08 (m, 1H), 2.34 (tt, J = 8.4, 5.0 Hz, 1H), 2.08 (dd, J = 18.6, 12.8 Hz, 6H), 1.86 (qd, J = 14.0, 4.0 Hz, 3H), 1.78-1.65 (m, 2H), 1.52-1.36 (m, 7H), 1.21 (dt, J = 7.2, 4.9 Hz, 4H). MS (ESI) for [M + H]$^+$ (C$_{22}$H$_{32}$N$_6$O$^+$): calcd. m/z 409.26; found m/z 409.10. |
| 42 | | ++ | ++ | MS (ESI) for [M + H]$^+$ (C$_{23}$H$_{34}$N$_6$O$^+$): calcd. m/z 411.28; found m/z 411.30. |

| | Structure | Mer IC$_{50}$ | Tyro3 IC$_{50}$ | Physical Data MS m/z (M + 1) or/and $^1$H NMR |
|---|---|---|---|---|
| 43 | | ++ | + | $^1$H NMR (400 MHz, Methanol-d$_4$) δ 7.96 (d, J = 13 Hz, 1H), 7.82 (s, 1H), 6.71 (dd, J = 7.3, 2.6 Hz, 1H), 6.52 (s, 1H), 4.13-4.00 (m, 1H), 3.59-3.49 (m, 4H), 3.21 (t, J = 12.9 Hz, 2H), 3.09-2.97 (m, 1H), 2.13 (q, J = 6.5 Hz, 6H), 2.05-1.95 (m, 5H), 1.92-1.78 (m, 3H), 1.60 (q, J = 12.7 Hz, 3H), 1.30 (q, J = 12.0 Hz, 3H). MS (ESI) for [M + H]$^+$ (C$_{24}$H$_{36}$N$_7$O$^+$): calcd. m/z 438.29; found m/z 438.00. |
| 44 | | +++ | ++ | $^1$H NMR (400 MHz, Methanol-d$_4$) δ 8.10 (d, J = 7.2 Hz, 1H), 7.81 (s, 1H), 7.67 (dd, J = 7.1, 1.9 Hz, 1H), 7.33 (d, J = 2.0 Hz, 1H), 4.19-4.11 (m, 1H), 3.80-3.60 (m, 6H), 3.53 (d, J = 12.7 Hz, 2H), 3.23 (t, J = 13.5 Hz, 2H), 3.18-3.09 (m, 1H), 3.01 (s, 3H), 2.07 (q, J = 14.0, 12.8 Hz, 6H), 1.85 (q, J = 14.4, 13.6 Hz, 2H), 1.77-1.64 (m, 4H), 1.44-1.25 (m, 4H). MS (ESI) for [M + H]$^+$ (C$_{25}$H$_{38}$N$_8$O$^+$): calcd. m/z 467.32; found m/z 467.10. |
| 45 | | + | + | $^1$H NMR (400 MHz, Methanol-d$_4$) δ 8.00 (d, J = 7.6 Hz, 1H), 7.79 (s, 1H), 7.04 (dd, J = 7.5, 2.6 Hz, 1H), 6.94 (d, J = 2.6 Hz, 1H), 4.01 (ddd, J = 11.7, 7.9, 3.8 Hz, 1H), 3.71 (t, J = 5.4 Hz, 4H), 3.52 (d, J = 13.0 Hz, 2H), 3.23 (td, J = 13.0, 2.8 Hz, 2H), 3.11 (ddd, J = 11.9, 8.6, 3.2 Hz, 1H), 2.12-1.89 (m, 7H), 1.89-1.67 (m, 9H), 1.67-1.57 (m, 2H), 1.33-1.19 (m, 3H). MS (ESI) for [M + H]$^+$ (C$_{25}$H$_{37}$N$_7$O$^+$): calcd. m/z 452.31; found m/z 452.30. |
| 46 | | ++++ | ++++ | $^1$H NMR (400 MHz, Methanol-d$_4$) δ 8.32 (d, J = 5.7 Hz, 1H), 8.06-8.00 (m, 1H), 7.74 (s, 1H), 7.44 (dd, J = 5.7, 2.0 Hz, 1H), 4.25-4.16 (m, 1H), 3.81 (d, J = 12.5 Hz, 2H), 3.65-3.58 (m, 1H), 3.20 (t, J = 12.5 Hz, 2H), 3.11 (d, J = 7.4 Hz, 2H), 3.07-3.01 (m, 1H), 2.16 (d, J = 14.0 Hz, 2H), 2.11-1.91 (m, 7H), 1.69 (q, J = 12.3 Hz, 2H), 1.52 (q, J = 11.7 Hz, 2H), 1.19 (ddd, J = 12.5, 8.2, 4.7 Hz, 1H), 0.85-0.75 (m, 2H), 0.49 (dt, J = 6.3, 4.7 Hz, 2H). MS (ESI) for [M + H]$^+$ (C$_{24}$H$_{33}$ClN$_6$O$^+$): calcd. m/z 457.24; found m/z 457.30. |
| 47 | | +++ | +++ | $^1$H NMR (400 MHz, Methanol-d$_4$) δ 8.32 (d, J = 5.7 Hz, 1H), 8.04 (d, J = 1.7 Hz, 1H), 7.80-7.75 (m, 2H), 7.67-7.59 (m, 4H), 7.45 (dd, J = 5.8, 1.9 Hz, 1H), 4.22 (s, 1H), 3.89-3.83 (m, 4H), 2.73-2.56 (m, 1H), 2.28-2.17 (m, 6H), 2.09-2.05 (m, 4H), 1.72 (d, J = 17.5 Hz, 2H), 1.52 (d, J = 13.6 Hz, 2H). MS (ESI) for [M + H]$^+$ (C$_{26}$H$_{31}$ClN$_6$O$^+$): calcd. m/z 479.22; found m/z 479.20. |

TABLE 1-continued

| | Structure | Mer IC$_{50}$ | Tyro3 IC$_{50}$ | Physical Data MS m/z (M + 1) or/and $^1$H NMR |
|---|---|---|---|---|
| 48 | 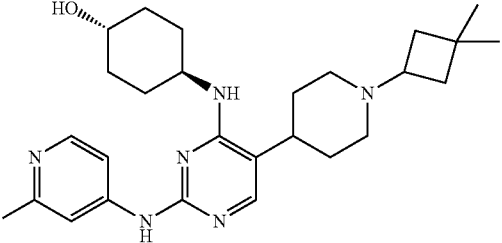 | ++++ | ++++ | $^1$H NMR (400 MHz, Methanol-d$_4$) δ 8.11 (d, J = 1.9 Hz, 1H), 8.02 (d, J = 5.9 Hz, 1H), 7.79 (s, 1H), 7.42 (dd, J = 5.9, 2.0 Hz, 1H), 4.12-4.04 (m, 1H), 3.69-3.55 (m, 1H), 3.50 (d, J = 12.3 Hz, 2H), 2.92-2.78 (m, 3H), 2.21-2.13 (m, 3H), 2.08-2.00 (m, 9H), 1.93-1.81 (m, 2H), 1.50 (t, J = 10.2 Hz, 4H), 1.20 (d, J = 4.5 Hz, 6H). MS (ESI) for [M + H]$^+$ (C$_{26}$H$_{37}$ClN$_6$O$^+$): calcd. m/z 485.27; found m/z 485.20. |
| 49 | 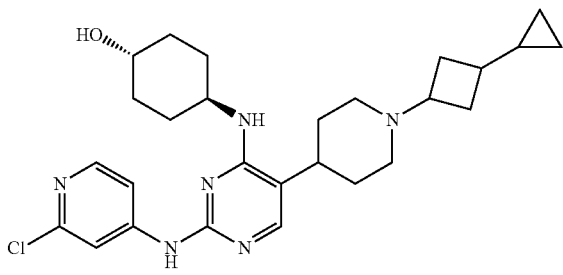 [SMILES: O[C@H]1CC[C@H](Nc2nc(Nc3ccnc(Cl)c3)ncc2C2CCN(C3CC(C4CC4)C3)CC2)CC1] | ++++ | ++++ | $^1$H NMR (400 MHz, Methanol-d$_4$) δ 8.33-8.27 (m, 1H), 8.02 (d, J = 2.0 Hz, 1H), 7.73 (d, J = 0.7 Hz, 1H), 7.43 (dd, J = 5.8, 2.0 Hz, 1H), 4.24-4.13 (m, 1H), 3.69-3.54 (m, 3H), 3.53-3.42 (m, 1H), 3.13-2.89 (m, 3H), 2.56-2.35 (m, 2H), 2.19-1.92 (m, 10H), 1.85-1.61 (m, 4H), 1.50 (q, J = 11.8 Hz, 2H), 0.93-0.78 (m, 1H), 0.48-0.39 (m, 2H), 0.26-0.04 (m, 2H). MS (ESI) for [M + H]$^+$ (C$_{27}$H$_{37}$ClN$_6$O$^+$): calcd. m/z 497.28; found m/z 497.20. |
| 50 | 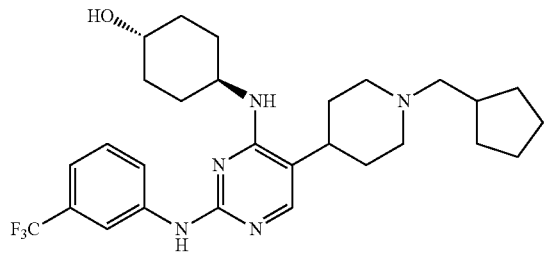 [SMILES: O[C@H]1CC[C@H](Nc2nc(Nc3cccc(C(F)(F)F)c3)ncc2C2CCN(CC3CCCC3)CC2)CC1] | ++++ | +++ | $^1$H NMR (400 MHz, Methanol-d$_4$) δ 7.94 (s, 1H), 7.73 (d, J = 8.1 Hz, 1H), 7.67-7.58 (m, 2H), 7.54 (d, J = 7.7 Hz, 1H), 4.17-4.04 (m, 1H), 3.74 (d, J = 12.3 Hz, 2H), 3.62-3.44 (m, 1H), 3.25-3.10 (m, 6H), 3.00 (t, J = 12.2 Hz, 1H), 2.35 (p, J = 7.9 Hz, 1H), 2.11 (d, J = 14.1 Hz, 2H), 2.04-1.89 (m, 9H), 1.79-1.53 (m, 6H), 1.31 (t, J = 1.3 Hz, 2H). MS (ESI) for [M + H]$^+$ (C$_{28}$H$_{38}$F$_3$N$_5$O$^+$): calcd. m/z 518.30; found m/z 518.30. |
| 51 | 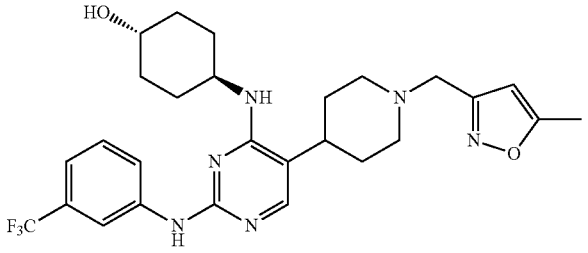 [SMILES: Cc1cc(CN2CCC(c3cnc(Nc4cccc(C(F)(F)F)c4)nc3N[C@H]3CC[C@H](O)CC3)CC2)no1] | +++ | +++ | $^1$H NMR (400 MHz, Methanol-d$_4$) δ 7.96 (s, 1H), 7.73 (d, J = 8.8 Hz, 1H), 7.65-7.55 (m, 2H), 7.49 (d, J = 7.8 Hz, 1H), 6.39 (s, 1H), 4.36 (s, 2H), 4.15-4.05 (m, 1H), 3.63-3.50 (m, 3H), 3.12 (t, J = 12.4 Hz, 2H), 2.90 (t, J = 12.0 Hz, 1H), 2.48 (s, 3H), 2.07 (d, J = 14.0 Hz, 2H), 2.01-1.82 (m, 7H), 1.64-1.50 (m, 2H), 1.35-1.26 (m, 2H). MS (ESI) for [M + H]$^+$ (C$_{27}$H$_{33}$F$_3$N$_6$O$_2^+$): calcd. m/z 531.26; found m/z 531.20. |
| 52 | 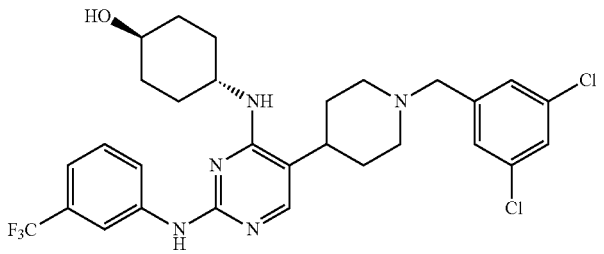 [SMILES: O[C@H]1CC[C@H](Nc2nc(Nc3cccc(C(F)(F)F)c3)ncc2C2CCN(Cc3cc(Cl)cc(Cl)c3)CC2)CC1] | +++ | +++ | $^1$H NMR (400 MHz, Methanol-d$_4$) δ 7.93 (s, 1H), 7.72 (d, J = 9.4 Hz, 1H), 7.66-7.62 (m, 4H), 7.59 (d, J = 6.4 Hz, 1H), 7.55-7.51 (m, 1H), 4.39 (s, 2H), 4.15-4.03 (m, 1H), 3.65-3.51 (m, 3H), 3.14 (d, J = 13.3 Hz, 2H), 2.98-2.84 (m, 1H), 2.11 (d, J = 15.4 Hz, 2H), 2.03-1.87 (m, 6H), 1.64-1.48 (m, 2H), 1.31 (d, J = 14.0 Hz, 2H). MS (ESI) for [M + H]$^+$ (C$_{29}$H$_{32}$Cl$_2$F$_3$N$_5$O$^+$): calcd. m/z 594.19; found m/z 594.20. |
| 53 | 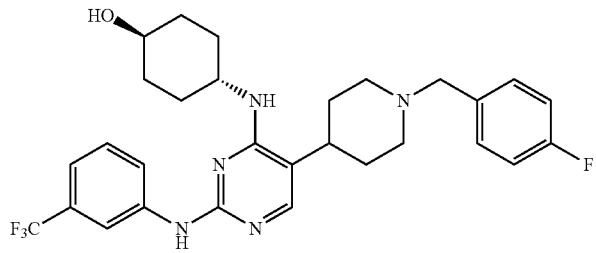 [SMILES: O[C@H]1CC[C@H](Nc2nc(Nc3cccc(C(F)(F)F)c3)ncc2C2CCN(Cc3ccc(F)cc3)CC2)CC1] | ++++ | +++ | $^1$H NMR (400 MHz, Methanol-d$_4$) δ 7.94 (s, 1H), 7.75-7.71 (m, 1H), 7.67-7.59 (m, 4H), 7.54 (d, J = 6.9 Hz, 1H), 7.29-7.22 (m, 2H), 4.40 (s, 2H), 4.14-4.06 (m, 1H), 3.61 (d, J = 12.2 Hz, 2H), 3.19 (t, J = 13.0 Hz, 2H), 3.03-2.88 (m, 1H), 2.11 (d, J = 15.1 Hz, 2H), 2.02-1.90 (m, 8H), 1.65-1.55 (m, 2H), 1.37-1.28 (m, 2H). MS (ESI) for [M + H]$^+$ (C$_{29}$H$_{33}$F$_4$N$_5$O$^+$): calcd. m/z 544.26; found m/z 544.30. |

TABLE 1-continued

| | Structure | Mer IC$_{50}$ | Tyro3 IC$_{50}$ | Physical Data MS m/z (M + 1) or/and $^1$H NMR |
|---|---|---|---|---|
| 54 | 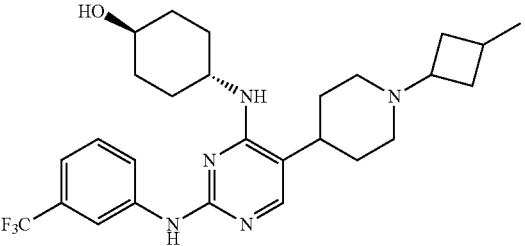 [SMILES: CC1CC(N2CCC(c3cnc(Nc4cccc(C(F)(F)F)c4)nc3N[C@H]3CC[C@H](O)CC3)CC2)C1] | ++++ | ++++ | $^1$H NMR (400 MHz, Methanol-d$_4$) δ 8.13 (s, 1H), 7.79 (d, J = 9.7 Hz, 1H), 7.71 (s, 1H), 7.42 (t, J = 8.2 Hz, 1H), 7.19 (d, 1H), 4.17-4.07 (m, 1H), 3.64-3.54 (m, 1H), 3.42 (d, J = 12.2 Hz, 2H), 2.67 (q, J = 10.3, 8.4 Hz, 4H), 2.48 (d, J = 9.6 Hz, 2H), 2.39-2.29 (m, 1H), 2.16 (d, J = 7.0 Hz, 1H), 2.02 (d, J = 16.3 Hz, 5H), 1.83-1.67 (m, 4H), 1.44 (t, J = 9.2 Hz, 4H), 1.15 (d, J = 6.6 Hz, 3H). MS (ESI) for [M + H]$^+$ (C$_{28}$H$_{37}$F$_3$N$_7$O$^+$): calcd. m/z 504.29; found m/z 504.25. |
| 55 | 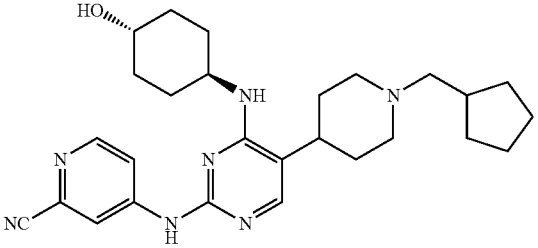 [SMILES: N#Cc1cc(Nc2ncc(C3CCN(CC4CCCC4)CC3)c(N[C@H]3CC[C@H](O)CC3)n2)ccn1] | ++++ | +++ | $^1$H NMR (400 MHz, Methanol-d$_4$) δ 8.61 (d, J = 5.7 Hz, 1H), 8.23 (d, J = 2.1 Hz, 1H), 7.79 (dd, J = 5.7, 2.2 Hz, 1H), 7.74 (s, 1H), 4.19-4.11 (m, 1H), 3.73 (d, J = 12.3 Hz, 2H), 3.65-3.55 (m, 1H), 3.23-3.14 (m, 2H), 2.35 (p, J = 7.9 Hz, 1H), 2.16-1.92 (m, 12H), 1.80-1.59 (m, 8H), 1.52-1.40 (m, 2H), 1.38-1.26 (m, 2H). MS (ESI) for [M + H]$^+$ (C$_{27}$H$_{37}$N7O$^+$): calcd. m/z 476.31; found m/z 476.20. |
| 56 | 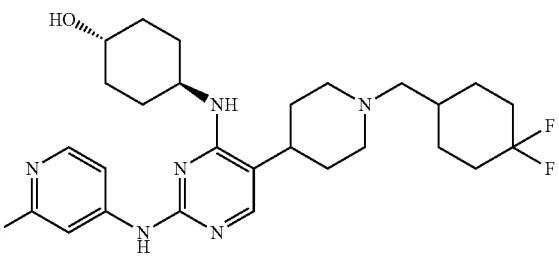 | ++++ | +++ | $^1$H NMR (400 MHz, Methanol-d$_4$) δ 8.63 (d, J = 5.7 Hz, 1H), 8.24 (dd, J = 2.3, 0.7 Hz, 1H), 7.80 (dd, J = 5.7, 2.3 Hz, 1H), 7.75 (s, 1H), 4.22-4.12 (m, 1H), 3.75 (d, J = 12.4 Hz, 2H), 3.67-3.57 (m, 1H), 3.26-3.09 (m, 5H), 2.17-1.92 (m, 15H), 1.87-1.65 (m, 3H), 1.55-1.34 (m, 4H). MS (ESI) for [M + H]$^+$ (C$_{28}$H$_{37}$F$_3$N7O$^+$): calcd. m/z 526.30; found m/z 526.10. |
| 57 | 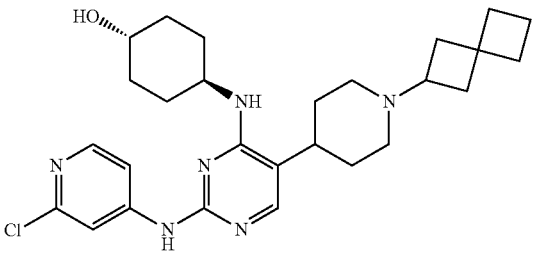 [SMILES: O[C@H]1CC[C@H](Nc2nc(Nc3ccnc(Cl)c3)ncc2C2CCN(C3CC4(CCC4)C3)CC2)CC1] | | | MS (ESI) for [M + H]$^+$ (C$_{27}$H$_{38}$ClN$_6$O$^+$): calcd. m/z 497.27; found m/z 497.30. |
| 58 | 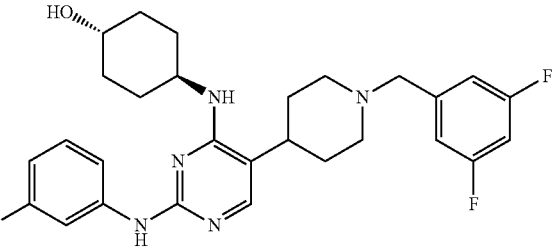 | | | MS (ESI) for [M + H]$^+$ (C$_{29}$H$_{33}$F$_5$N$_5$O$^+$): calcd. m/z 562.25; found m/z 562.30. |
| 59 | 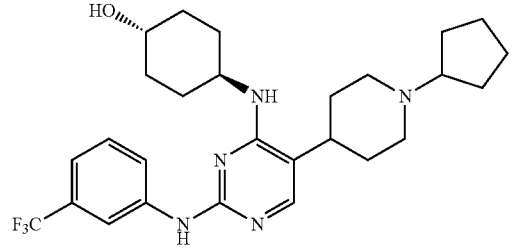 [SMILES: O[C@H]1CC[C@H](Nc2nc(Nc3cccc(C(F)(F)F)c3)ncc2C2CCN(C3CCCC3)CC2)CC1] | | | MS (ESI) for [M + H]$^+$ (C$_{27}$H$_{37}$F$_3$N$_5$O$^+$): calcd. m/z 504.29; found m/z 504.30. |

TABLE 1-continued

| Structure | Mer IC$_{50}$ | Tyro3 IC$_{50}$ | Physical Data MS m/z (M + 1) or/and $^1$H NMR |
|---|---|---|---|
| 60 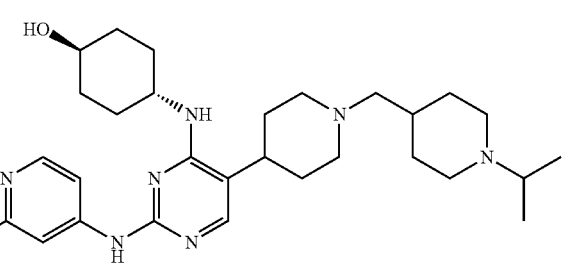 | | | MS (ESI) for [M + H]$^+$ (C$_{29}$H$_{45}$ClN$_7$O$^+$): calcd. m/z 542.33; found m/z 542.30. |
| 61 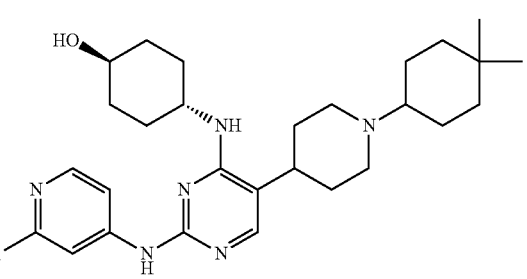 | | | MS (ESI) for [M + H]$^+$ (C$_{28}$H$_{42}$ClN$_6$O$^+$): calcd. m/z 513.30; found m/z 513.30. |
| 62 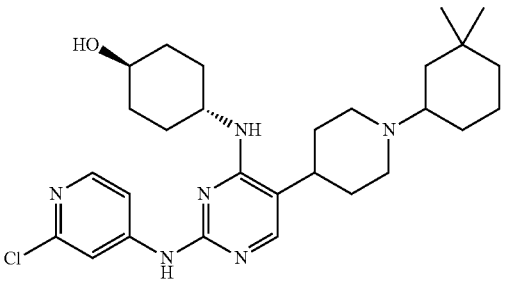 [SMILES: CC1(C)CCCC(N2CCC(c3cnc(Nc4ccnc(Cl)c4)nc3N[C@H]3CC[C@H](O)CC3)CC2)C1] | | | MS (ESI) for [M + H]$^+$ (C$_{28}$H$_{42}$ClN$_6$O$^+$): calcd. m/z 513.30; found m/z 513.30. |
| 63 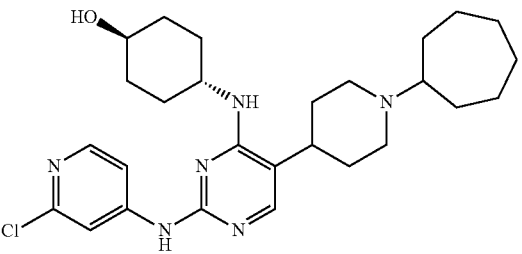 [SMILES: O[C@H]1CC[C@H](Nc2nc(Nc3ccnc(Cl)c3)ncc2C2CCN(C3CCCCCC3)CC2)CC1] | | | MS (ESI) for [M + H]$^+$ (C$_{27}$H$_{40}$ClN$_6$O$^+$): calcd. m/z 499.29; found m/z 499.20. |
| 64 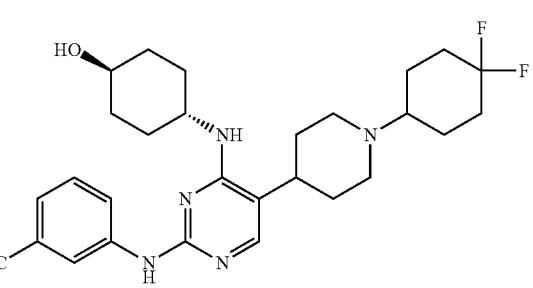 | | | MS (ESI) for [M + H]$^+$ (C$_{28}$H$_{37}$F$_5$N$_5$O$^+$): calcd. m/z 554.28; found m/z 554.30. |

TABLE 1-continued
| | Structure | Mer IC$_{50}$ | Tyro3 IC$_{50}$ | Physical Data MS m/z (M + 1) or/and $^1$H NMR |
|---|---|---|---|---|
| 65 | 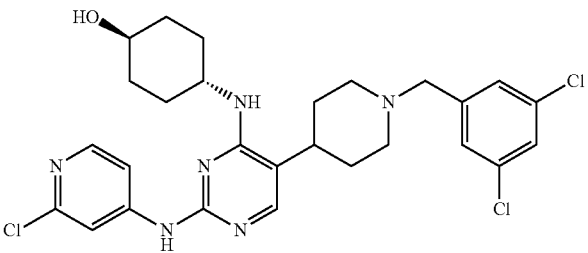 [SMILES: O[C@H]1CC[C@H](Nc2nc(Nc3ccnc(Cl)c3)ncc2C2CCN(Cc3cc(Cl)cc(Cl)c3)CC2)CC1] | | | |
| 66 | 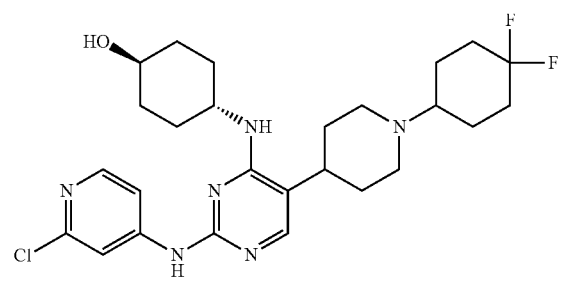 [SMILES: O[C@H]1CC[C@H](Nc2nc(Nc3ccnc(Cl)c3)ncc2C2CCN(C3CCC(F)(F)CC3)CC2)CC1] | | | |
| 67 | 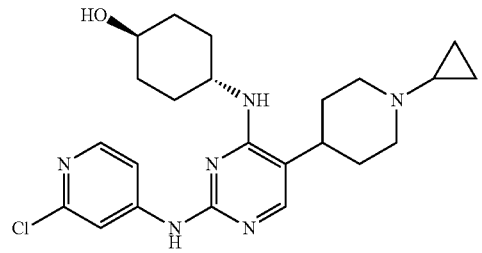 [SMILES: O[C@H]1CC[C@H](Nc2nc(Nc3ccnc(Cl)c3)ncc2C2CCN(C3CC3)CC2)CC1] | | | |
| 68 | 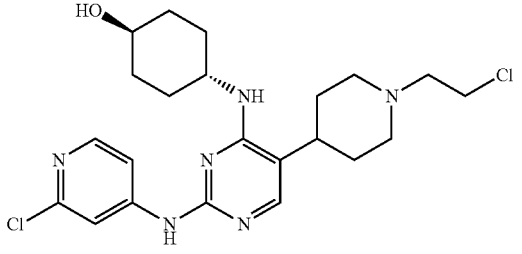 [SMILES: O[C@H]1CC[C@H](Nc2nc(Nc3ccnc(Cl)c3)ncc2C2CCN(CCCl)CC2)CC1] | | | |
| 69 | 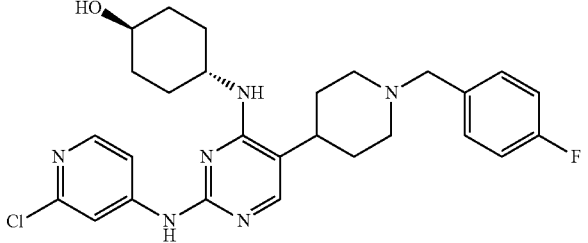 [SMILES: O[C@H]1CC[C@H](Nc2nc(Nc3ccnc(Cl)c3)ncc2C2CCN(Cc3ccc(F)cc3)CC2)CC1] | | | |
| 70 | 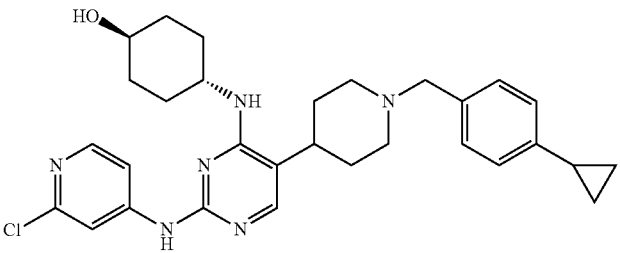 [SMILES: O[C@H]1CC[C@H](Nc2nc(Nc3ccnc(Cl)c3)ncc2C2CCN(Cc3ccc(C4CC4)cc3)CC2)CC1] | | | |

TABLE 1-continued

| | Structure | Mer IC$_{50}$ | Tyro3 IC$_{50}$ | Physical Data MS m/z (M + 1) or/and $^1$H NMR |
|---|---|---|---|---|
| 71 | | | | |
| 72 | | | | |
| 73 | | | | |
| 74 | | | | |
| 75 | | | | |
| 76 | | | | |

TABLE 1-continued

| | Structure | Mer IC$_{50}$ | Tyro3 IC$_{50}$ | Physical Data MS m/z (M + 1) or/and $^1$H NMR |
|---|---|---|---|---|
| 77 | | | | |
| 78 | | | | |
| 79 | | | | |
| 80 | | | | |
| 81 | | | | |
| 82 | | | | |

TABLE 1-continued

| | Structure | Mer IC$_{50}$ | Tyro3 IC$_{50}$ | Physical Data MS m/z (M + 1) or/and $^1$H NMR |
|---|---|---|---|---|
| 83 | | | | |
| 84 | | | | |
| 85 | | | | |
| 86 | | | | |
| 87 | | | | |
| 88 | | | | |

TABLE 1-continued

| Structure | Mer IC$_{50}$ | Tyro3 IC$_{50}$ | Physical Data MS m/z (M + 1) or/and $^1$H NMR |
|---|---|---|---|
| 89 | | | |
| 90 | | | |
| 91 | | | |
| 92 | | | |
| 93 | | | |
| 94 | | | |

Many modifications and other embodiments of the subject matter described herein will come to mind to one skilled in the art to which the subject matter pertains having the benefit of the teachings presented in the foregoing descriptions. Therefore, it is to be understood that the subject matter described herein is not to be limited to the specific embodiments disclosed and that modifications and other embodiments are intended to be included within the scope of the foregoing list of embodiments and appended claims. Although specific terms are employed herein, they are used in a generic and descriptive sense only and not for purposes of limitation.

What is claimed is:

1. A compound of Formula I:

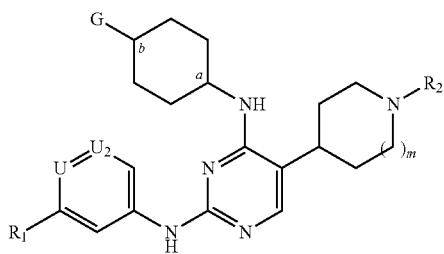

wherein,

"a" and "b" designate carbons that are at specific opposite positions in the cyclohexyl ring;

U and $U_2$ are each independently N or CX, provided that only one of U or $U_2$ can be N;

wherein,

X is H or C1-C8 alkyl;

$R_1$ is selected from the group consisting of C1-C4 alkoxy, halogen, C1-C8 alkyl, C1-C4 haloalkyl, C1-C4 hydroxyalkyl, C1-C4 alkylamino, nitrile, C3-C8 cycloalkyl, C2-C7 heterocycloalkyl, —C(O)$R_{10}$, and (C1-C4) (C1-C4) dialkylamino; wherein said cycloalkyl or heterocycloalkyl is independently substituted with 0, 1, 2, or 3 groups independently selected from the group consisting of halogen, C1-C4 alkyl, C1-C4 haloalkyl, and C1-C4 alkoxy;

wherein, $R_{10}$ is —NH$_2$, hydrogen, or C1-C4 alkyl;

G is —OH or —NR$^e$R$^f$, wherein,

R$^e$ and R$^f$ are each independently hydrogen, C1-C4 alkyl, or —C(O)$R_{50}$; wherein, $R_{50}$ is C1-C4 alkyl or hydrogen;

m is 0 or 1;

and, $R_2$ is selected from the group consisting of hydrogen, C1-C10 alkyl, C1-C4 haloalkyl, —C(O)$R_{20}$, and —(CH$_2$)$_n$Cy$_3$; wherein, n is 0, 1, 2, 3, or 4;

Cy$_3$ is selected from the group consisting of C3-C8 cycloalkyl, C2-C7 heterocycloalkyl, aryl, and C3-C5 heteroaryl, each independently substituted with 0, 1, 2, or 3 groups independently selected from the group consisting of halogen, C1-C4 alkyl, C1-C4 haloalkyl, C1-C4 alkoxy, C1-C4 hydroxyalkyl, C1-C4 alkylamino, C3-C8 cycloalkyl, and (C1-C4) (C1-C4) dialkylamino;

$R_{20}$ is selected from the group consisting of C1-C4 alkyl, —(CH$_2$)$_q$OR30, and —(CH$_2$)$_w$Cy$_4$;

wherein, q is 0, 1, 2, 3, or 4;

w is 0, 1, 2, 3, or 4;

$R_{30}$ is hydrogen or C1-C8 alkyl; and

Cy$_4$ is selected from the group consisting of C3-C8 cycloalkyl, C2-C7 heterocycloalkyl, aryl, and C3-C5 heteroaryl, each independently substituted with 0, 1, 2, or 3 groups independently selected from the group consisting of halogen, —NH$_2$, C1-C4 alkyl, C1-C4 haloalkyl, C1-C4 alkoxy, —C(O)—(C1-C4 alkyl), C1-C4 hydroxyalkyl, C1-C4 alkylamino, and (C1-C4) (C1-C4) dialkylamino;

or a pharmaceutically acceptable salt thereof.

2. The compound of claim 1, wherein m is 1.

3. The compound of claim 2, wherein G is —OH.

4. The compound of claim 3, wherein U is N and $U_2$ is CH.

5. The compound of claim 3, wherein U is CH and $U_2$ is CH.

6. The compound of claim 3, wherein U is N and $U_2$ is —C—CH$_3$.

7. The compound of claim 1, wherein $R_1$ is selected from the group consisting of methoxy, chloro, methyl, cyclopropyl, ethyl, —C(O) NH$_2$, difluoroethyl, difluoromethyl, fluoromethyl, and trifluoromethyl.

8. The compound of claim 7, wherein $R_1$ is trifluoromethyl or chloro.

9. The compound of claim 7, wherein $R_2$ is selected from the group consisting of hydrogen, methyl, ethyl, n-propyl, isopropyl, n-butyl, isobutyl, s-butyl, t-butyl, n-pentyl, isopentyl, s-pentyl, and neopentyl.

10. The compound of claim 7, wherein $R_2$ is —C(O)$R_{20}$, wherein $R_{20}$ is —(CH$_2$)$_q$OR$_{30}$, wherein q is 0 and $R_{30}$ is C1-C4 alkyl.

11. The compound of claim 7, wherein $R_2$ is —C(O)$R_{20}$, wherein $R_{20}$ is —(CH$_2$)$_w$Cy$_4$, wherein w is 0 and Cy$_4$ is cyclopentyl or cyclohexyl each independently substituted with 0, 1, 2, or 3 groups independently selected from C1-C4 alkyl.

12. The compound of claim 7, wherein $R_2$ is —(CH$_2$)$_n$Cy$_3$, wherein n is 0 or 1, and Cy$_3$ is selected from the group consisting of cyclopropyl, cyclobutyl, cyclopentyl, cyclohexyl, spiro[3.3]heptyl, cycloheptyl, phenyl, oxetanyl, isoxazolyl, piperidinyl, and tetrahydropyranyl, each independently substituted with 0, 1, 2, or 3 groups independently selected from the group consisting of methyl, fluoro, cyclopropyl, chloro, n-propyl, and isopropyl.

13. The compound of claim 12, wherein Cy$_3$ is cyclopentyl.

14. The compound of claim 1, wherein G is —NR$^e$R$^f$.

15. The compound of claim 14, wherein G is —NH$_2$, —NHCH$_3$, —N(CH$_3$)$_2$ or —NHC(O)CH$_3$.

16. The compound of claim 15, wherein U is N and $U_2$ is CH.

17. The compound of claim 16, wherein $R_1$ is methoxy.

18. The compound of claim 17, wherein $R_2$ is hydrogen or —C(O)$R_{20}$, wherein $R_{20}$ is —(CH$_2$)$_w$Cy$_4$, wherein w is 0 and Cy$_4$ is cyclopentyl.

19. The compound of claim 1, wherein the substituents on the carbons marked "a" and "b" are in a trans configuration.

20. The compound of claim 1, wherein the compound is selected from the group consisting of:
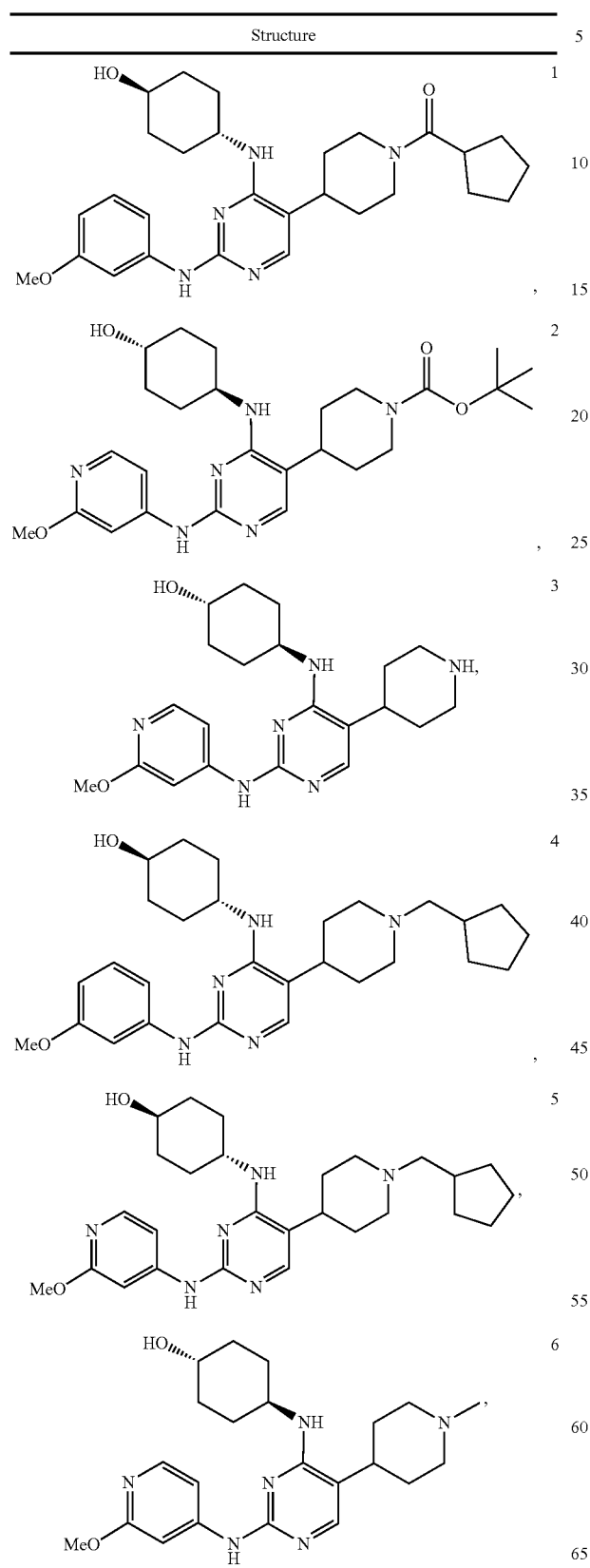
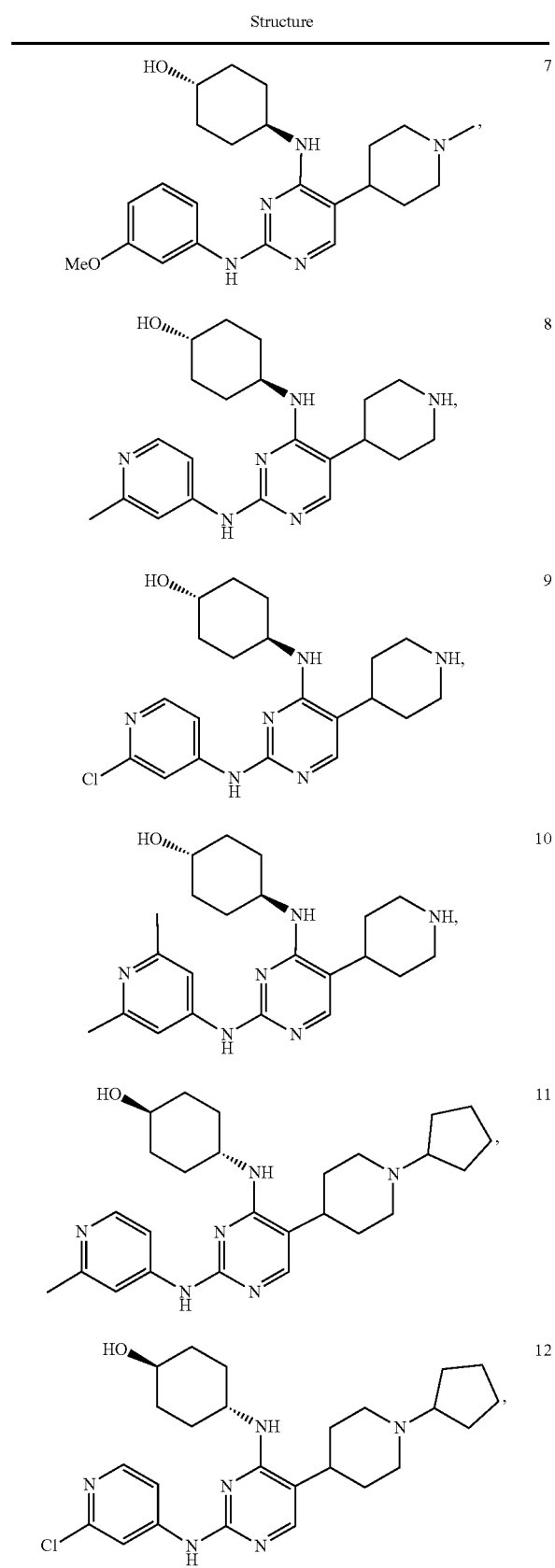

| 109 -continued | 110 -continued |
|---|---|
| Structure | Structure |
| 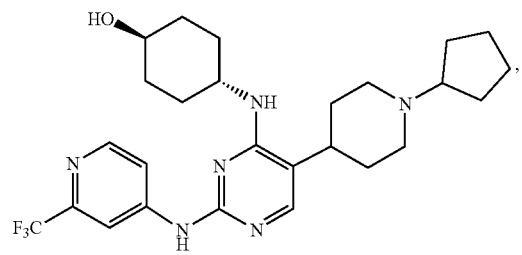 [SMILES: O[C@H]1CC[C@H](Nc2nc(Nc3ccnc(C(F)(F)F)c3)ncc2C2CCN(C3CCCC3)CC2)CC1] 13 | 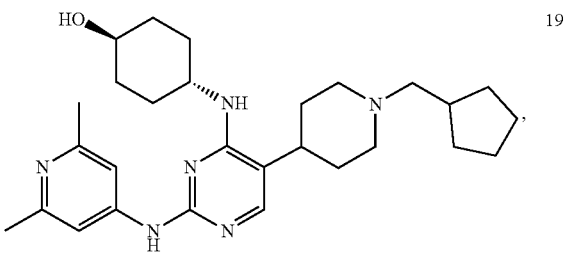 19 |
| 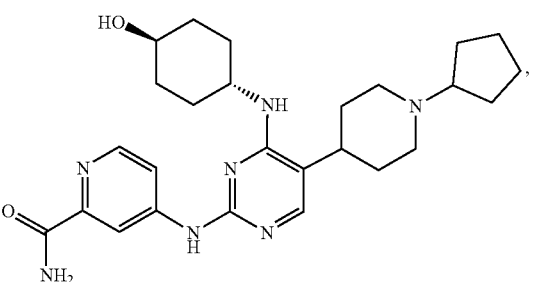 14 | 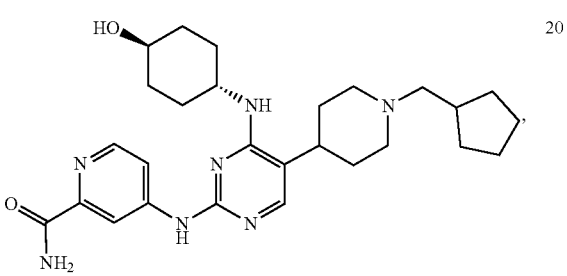 20 |
| 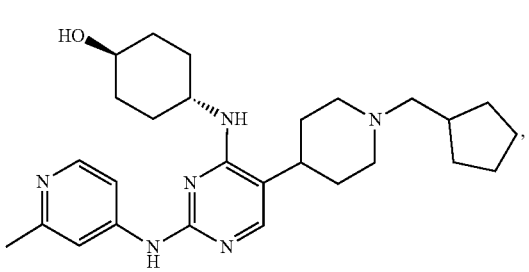 [SMILES: Cc1cc(Nc2ncc(C3CCN(CC4CCCC4)CC3)c(N[C@H]3CC[C@H](O)CC3)n2)ccn1] 15 | 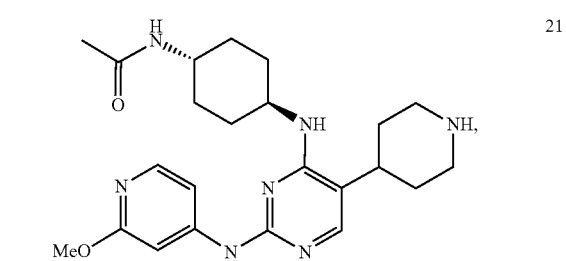 21 |
| 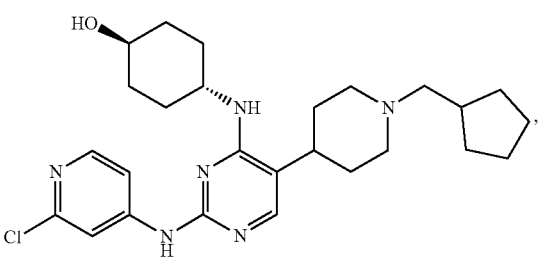 [SMILES: O[C@H]1CC[C@H](Nc2nc(Nc3ccnc(Cl)c3)ncc2C2CCN(CC3CCCC3)CC2)CC1] 16 | 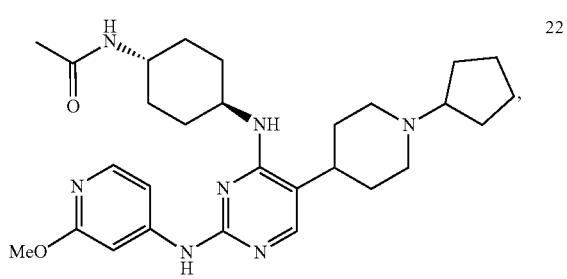 22 |
| 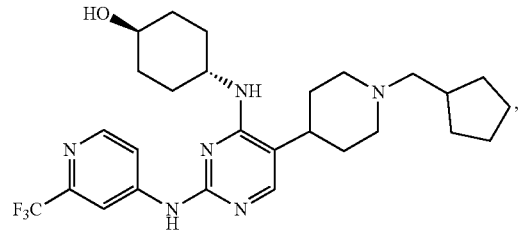 [SMILES: O[C@H]1CC[C@H](Nc2nc(Nc3ccnc(C(F)(F)F)c3)ncc2C2CCN(CC3CCCC3)CC2)CC1] 17 | 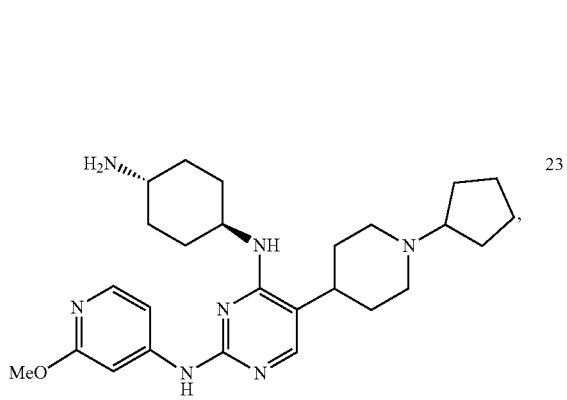 23 |
| 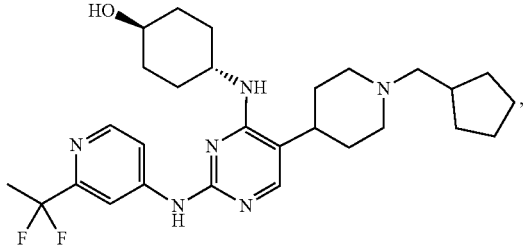 [SMILES: CC(F)(F)c1cc(Nc2ncc(C3CCN(CC4CCCC4)CC3)c(N[C@H]3CC[C@H](O)CC3)n2)ccn1] 18 | |

111
-continued
Structure
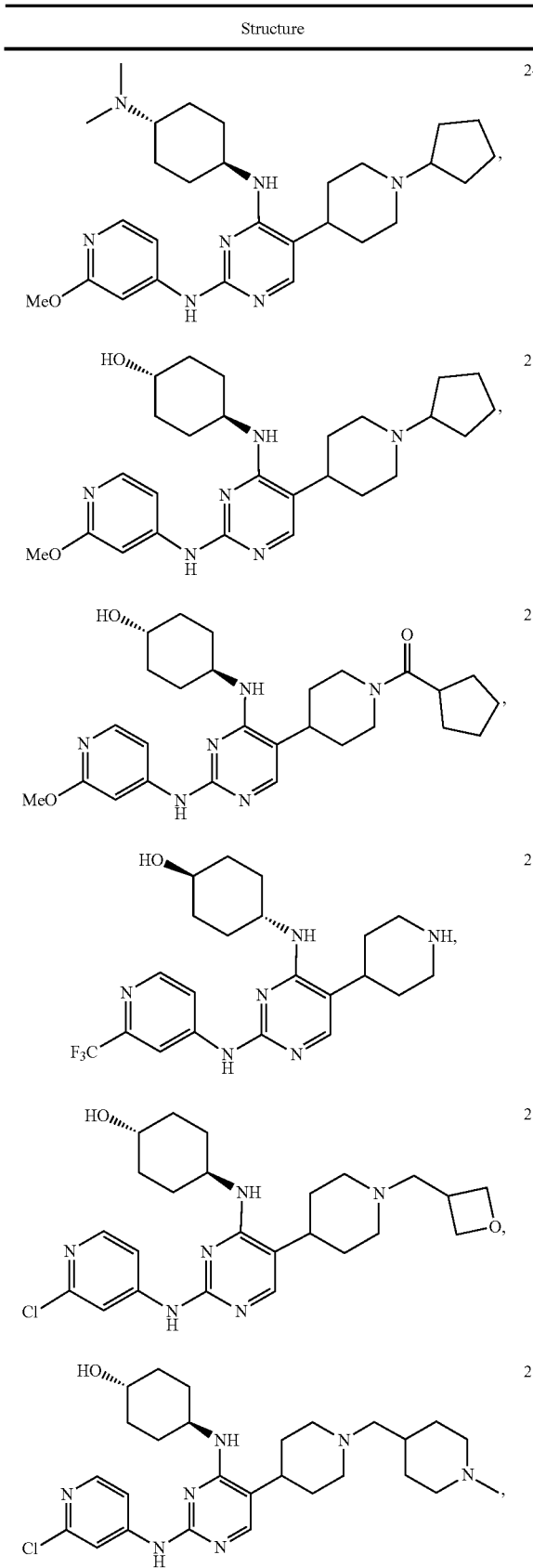
112
-continued
Structure
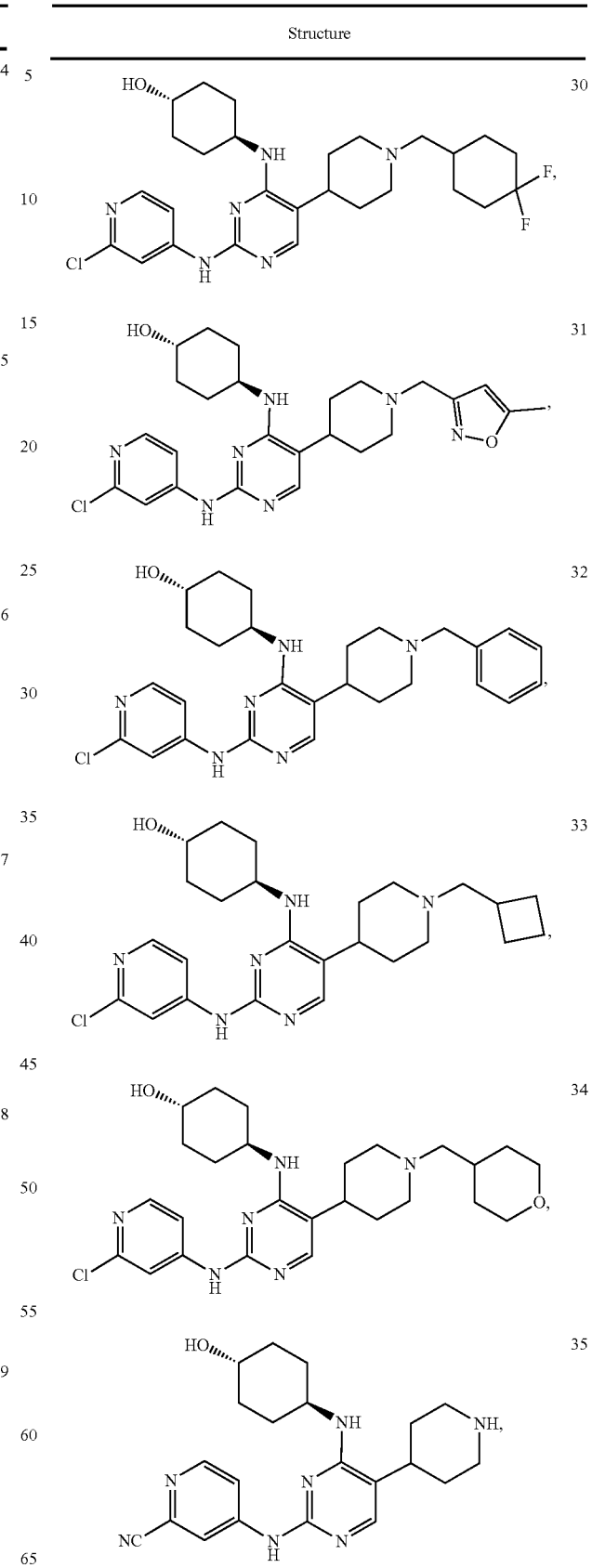

| 113 -continued | | 114 -continued | |
|---|---|---|---|
| Structure | | Structure | |
| 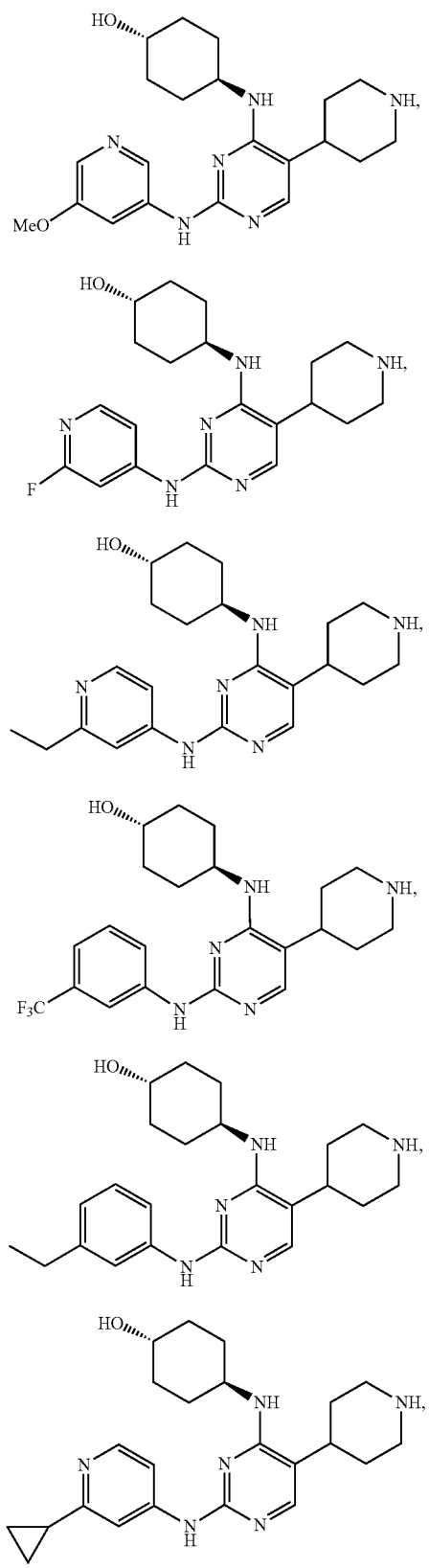 | 36 | 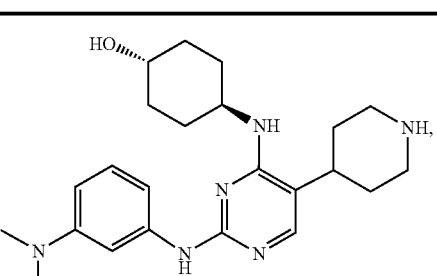 | 42 |
| | 37 | 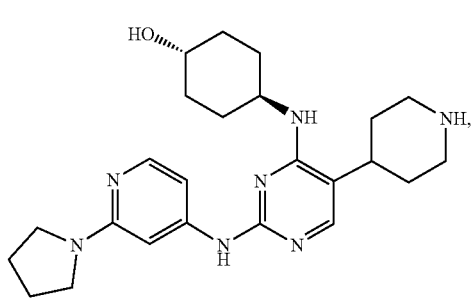 [SMILES: O[C@H]1CC[C@H](Nc2nc(Nc3ccnc(N4CCCC4)c3)ncc2C2CCNCC2)CC1] | 43 |
| | 38 | 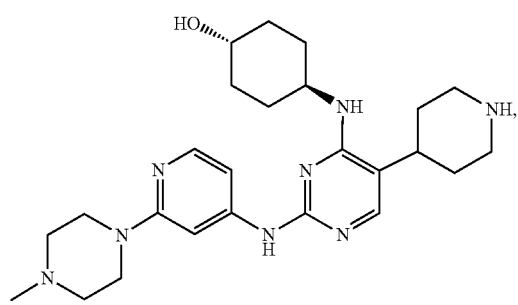 [SMILES: CN1CCN(c2cc(Nc3ncc(C4CCNCC4)c(N[C@H]4CC[C@H](O)CC4)n3)ccn2)CC1] | 44 |
| | 39 | 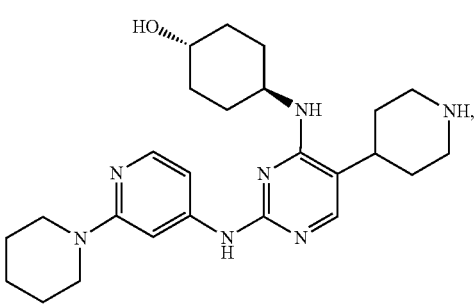 [SMILES: O[C@H]1CC[C@H](Nc2nc(Nc3ccnc(N4CCCCC4)c3)ncc2C2CCNCC2)CC1] | 45 |
| | 40 | | |
| | 41 | 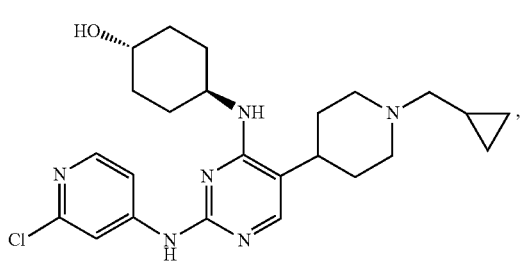 [SMILES: O[C@H]1CC[C@H](Nc2nc(Nc3ccnc(Cl)c3)ncc2C2CCN(CC3CC3)CC2)CC1] | 46 |

| | |
|---|---|
| 47 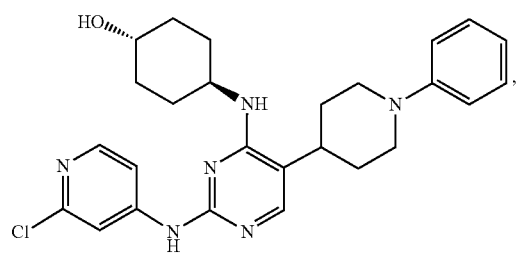 [SMILES: O[C@H]1CC[C@H](Nc2nc(Nc3ccnc(Cl)c3)ncc2C2CCN(c3ccccc3)CC2)CC1] | 53 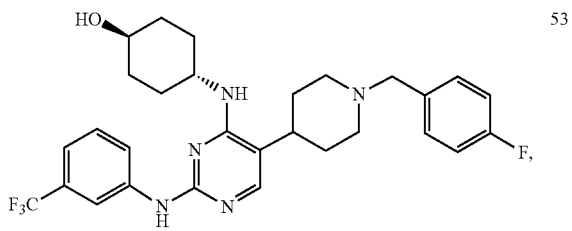 |
| 48 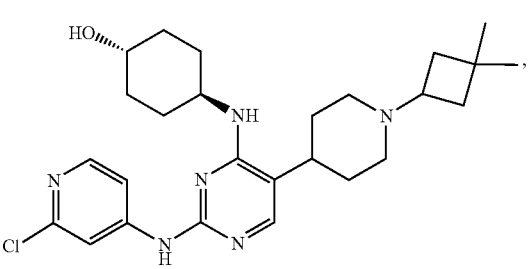 [SMILES: CC1(C)CC(N2CCC(c3cnc(Nc4ccnc(Cl)c4)nc3N[C@H]3CC[C@H](O)CC3)CC2)C1] | 54 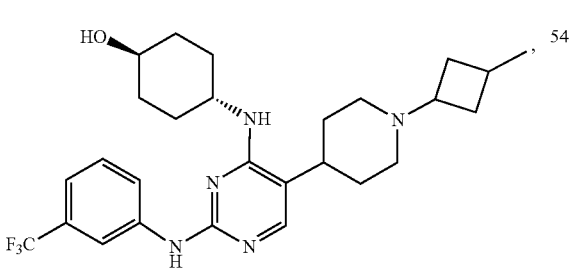 |
| 49 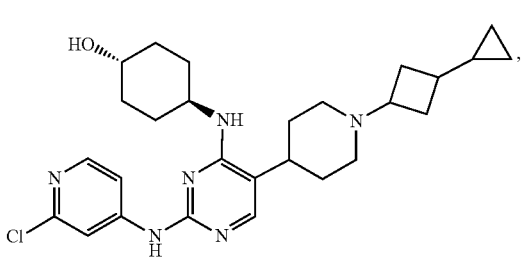 [SMILES: O[C@H]1CC[C@H](Nc2nc(Nc3ccnc(Cl)c3)ncc2C2CCN(C3CC(C4CC4)C3)CC2)CC1] | 55 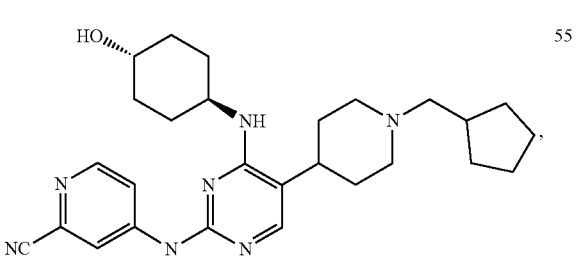 |
| 50 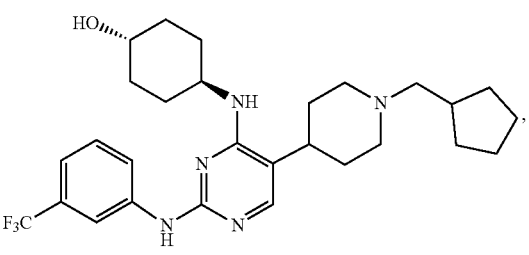 [SMILES: O[C@H]1CC[C@H](Nc2nc(Nc3cccc(C(F)(F)F)c3)ncc2C2CCN(CC3CCCC3)CC2)CC1] | 56 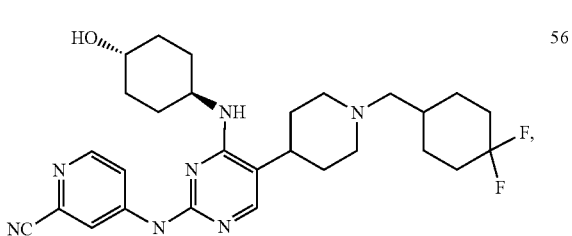 |
| 51 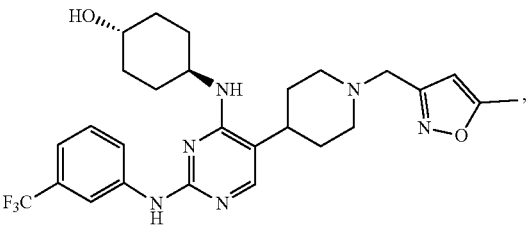 [SMILES: Cc1cc(CN2CCC(c3cnc(Nc4cccc(C(F)(F)F)c4)nc3N[C@H]3CC[C@H](O)CC3)CC2)no1] | 57 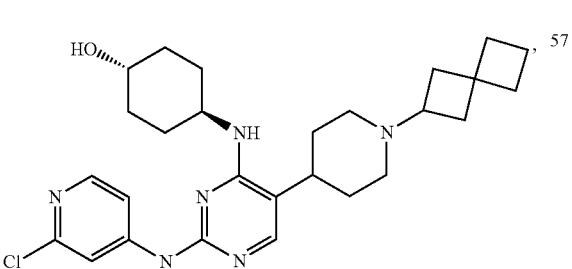 |
| 52 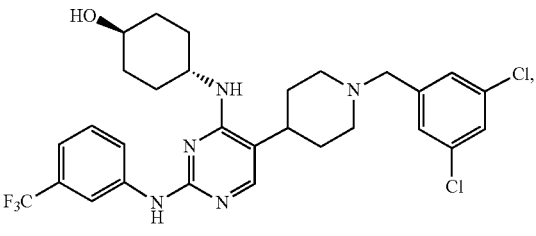 [SMILES: O[C@H]1CC[C@H](Nc2nc(Nc3cccc(C(F)(F)F)c3)ncc2C2CCN(Cc3cc(Cl)cc(Cl)c3)CC2)CC1] | 58 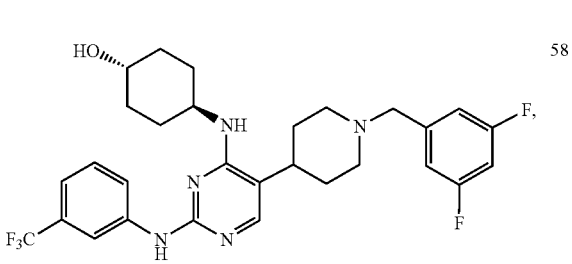 |

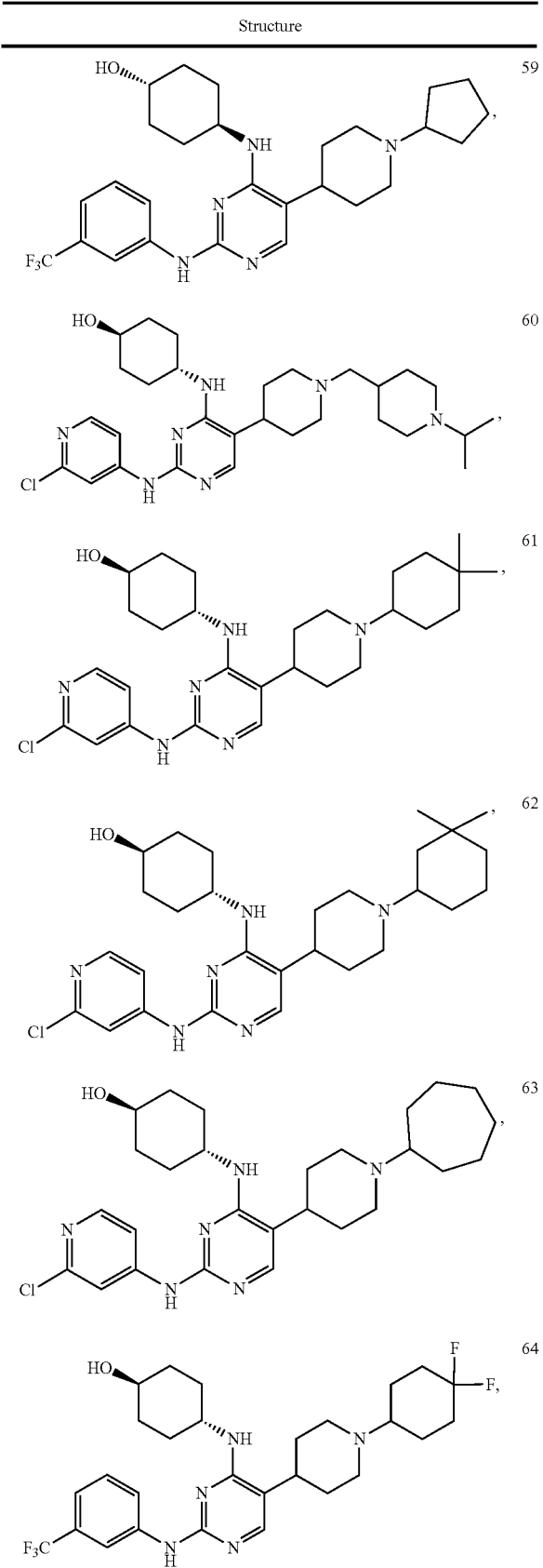
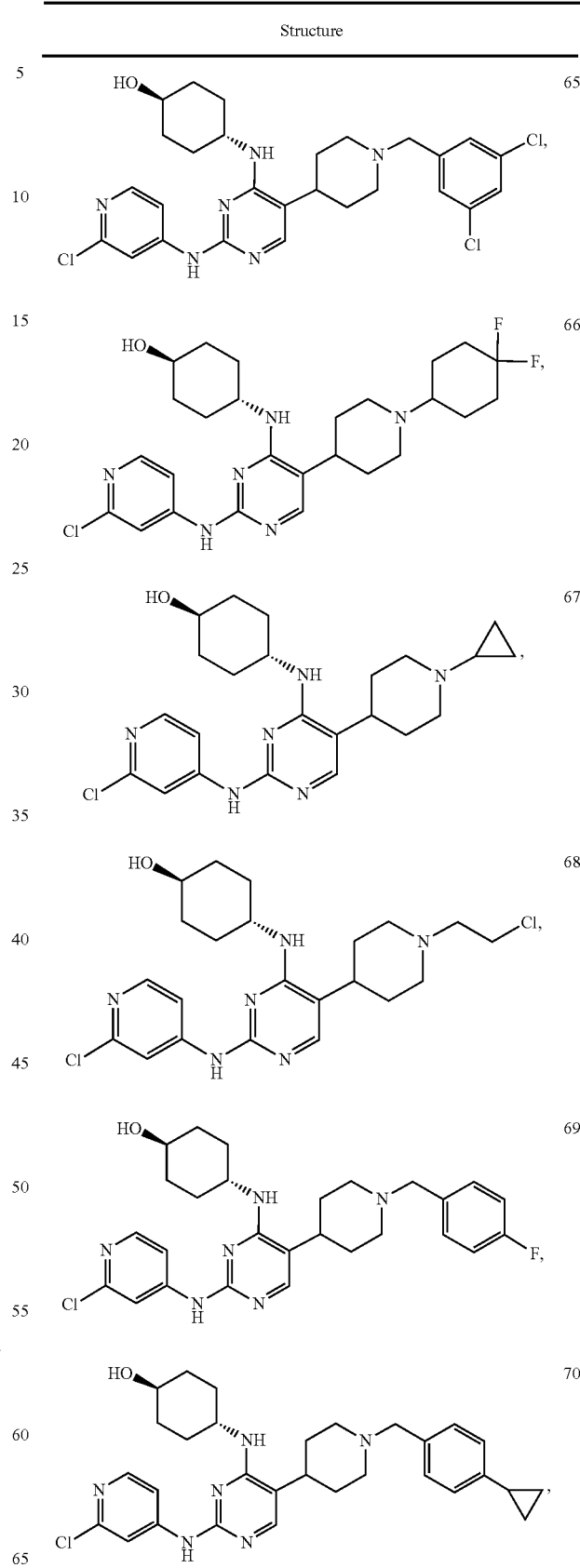

119
-continued
Structure
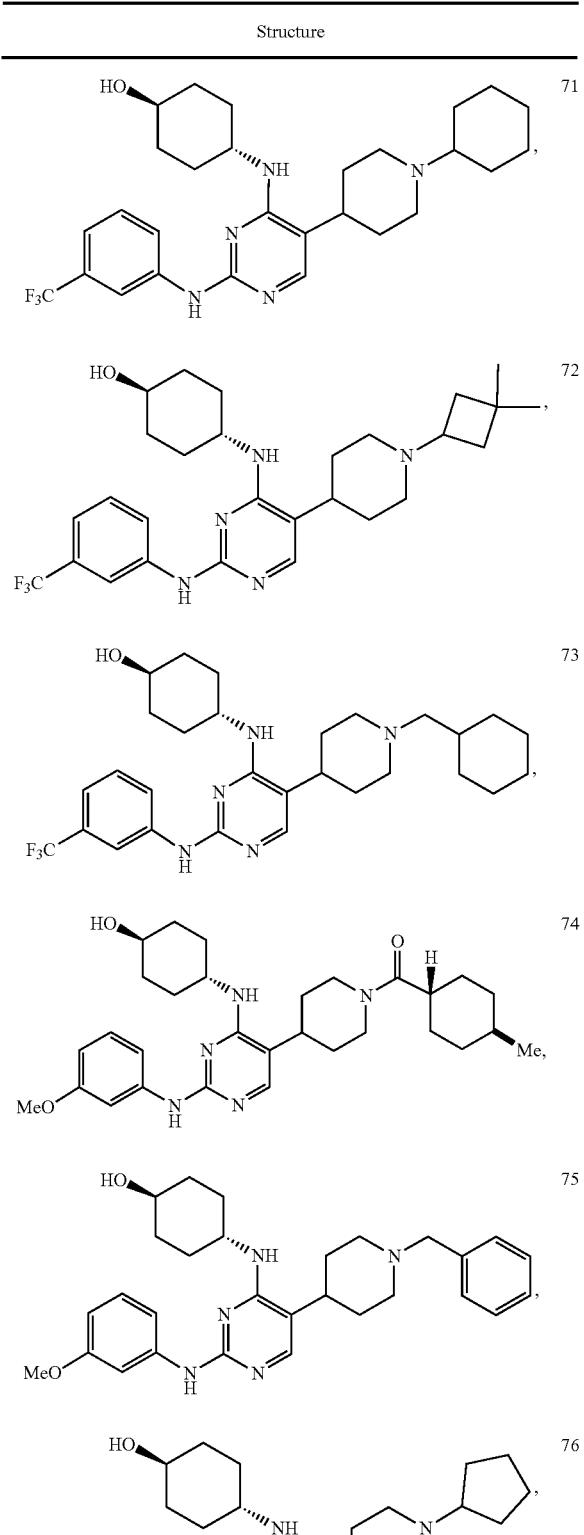
120
-continued
Structure
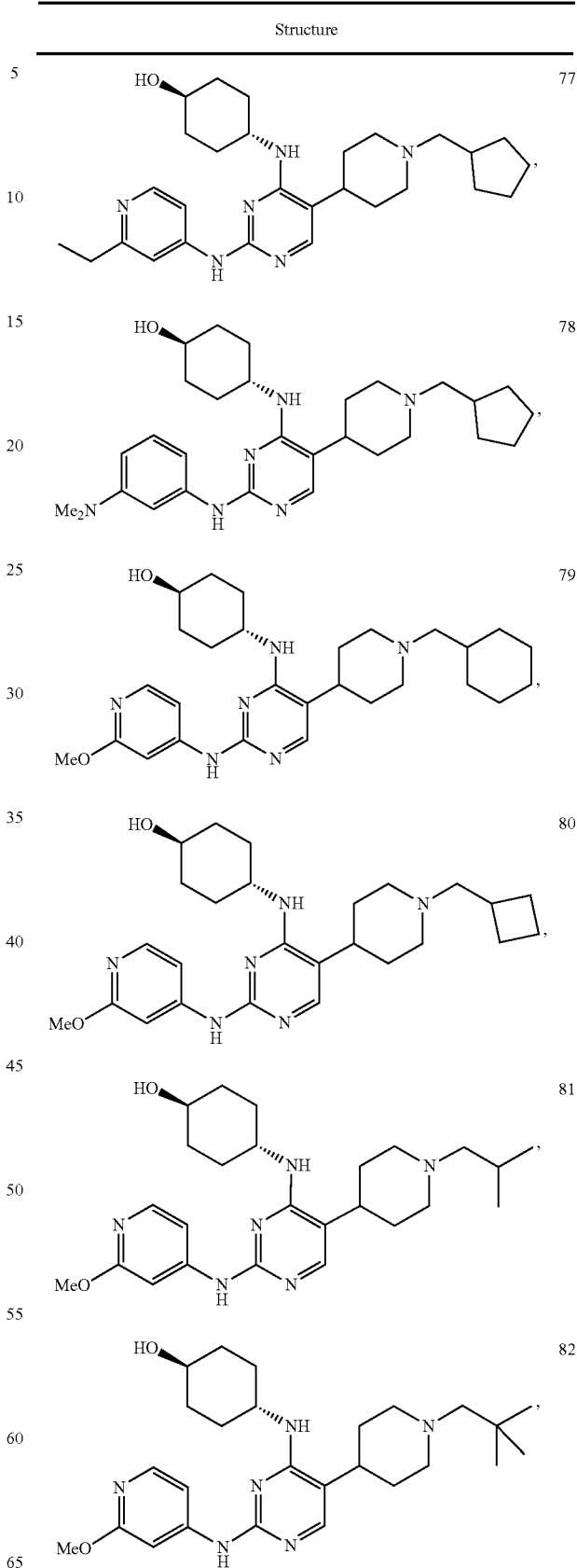

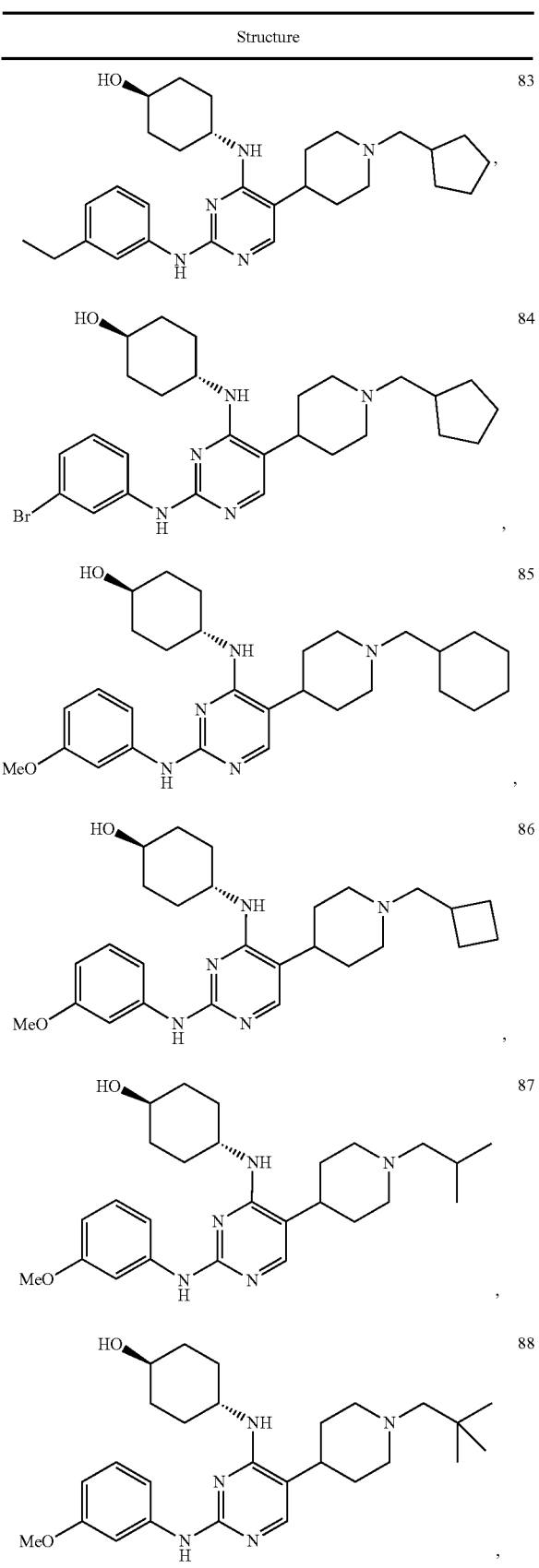
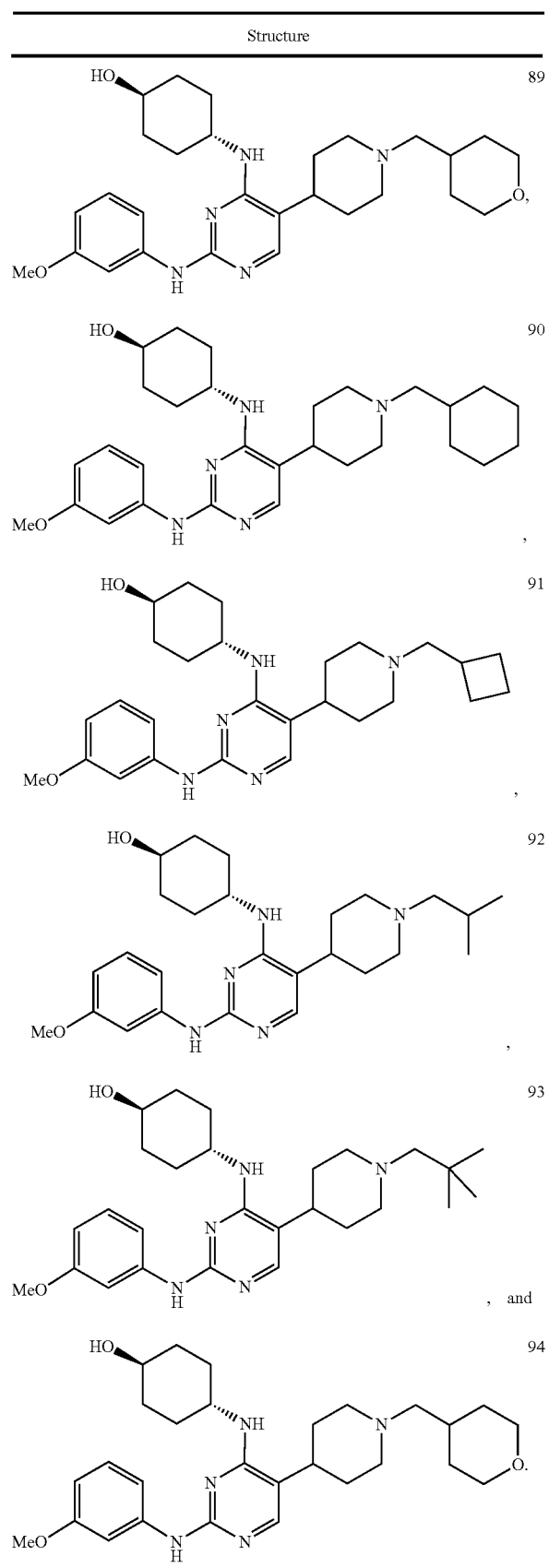

21. A pharmaceutical composition comprising a therapeutically effective amount of a compound of claim 1, and a pharmaceutically acceptable carrier.

22. A method for the treatment of a disorder associated with Mer and/or Tyro3 tyrosine kinase, the method comprising the step of administering to the subject an effective amount of a compound of claim 1.

23. The method of claim 22, wherein the disorder is a cancer, an infection, a fibrosis, a thrombotic disorder, a clotting disorder, or a disorder associated with an immunosuppressed microenvironment surrounding diseased tissue.

24. The compound of claim 1, wherein the substituents on carbons "a" and "b" are in a trans configuration.

\* \* \* \* \*